(12) United States Patent
Ohta et al.

(10) Patent No.: US 8,711,810 B2
(45) Date of Patent: *Apr. 29, 2014

(54) METHOD FOR DROPPING PACKET DATA, RADIO COMMUNICATION DEVICE, AND MOBILE COMMUNICATION SYSTEM

(75) Inventors: Yoshiaki Ohta, Kawasaki (JP);
Yoshiharu Tajima, Kawasaki (JP);
Kazuhisa Obuchi, Kawasaki (JP);
Ryuichi Takechi, Kawasaki (JP);
Naotoshi Watanabe, Kawasaki (JP);
Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,808

(22) Filed: Jul. 26, 2012

(65) Prior Publication Data

US 2012/0294151 A1   Nov. 22, 2012

Related U.S. Application Data

(63) Continuation of application No. 12/346,020, filed on Dec. 30, 2008, now Pat. No. 8,233,453.

(30) Foreign Application Priority Data

Jan. 7, 2008   (JP) .................................. 2008-000258

(51) Int. Cl.
*H04Q 7/00*   (2006.01)
(52) U.S. Cl.
USPC ............................ 370/331; 370/412; 455/437
(58) Field of Classification Search
USPC ............................ 370/331, 412; 455/436–438
See application file for complete search history.

(56) References Cited

U.S. PATENT DOCUMENTS

| | | | |
|---|---|---|---|
| 6,490,259 B1 | 12/2002 | Agrawal et al. | |
| 2006/0251130 A1* | 11/2006 | Greer et al. | 370/508 |
| 2007/0261082 A1 | 11/2007 | Ji et al. | |
| 2008/0161003 A1* | 7/2008 | Brueck et al. | 455/437 |
| 2010/0118890 A1* | 5/2010 | Chun et al. | 370/469 |

FOREIGN PATENT DOCUMENTS

| | | |
|---|---|---|
| WO | 2006080437 | 8/2006 |
| WO | 2006/109138 | 10/2006 |
| WO | 2006109138 | 10/2006 |
| WO | 2008001481 | 1/2008 |
| WO | 2009045945 | 4/2009 |

OTHER PUBLICATIONS

Ericsson: "Report from off-line discussions on SDU Discard functionality, Tdoc R2-075237", 3GPP TSG-RANn WG2 #60. Jeju, Korea, Nov. 5-9, 2007.

Qualcomm Europe 8: "LTE SDU Discard 9", 3GPP DRAFT; R2-075120, Jeju, Korea, Nov. 5-9, 2007.

(Continued)

*Primary Examiner* — Wanda Z Russell
(74) *Attorney, Agent, or Firm* — Myers Wolin, LLC

(57) ABSTRACT

A control method in a mobile communication system, that includes configuring a timer corresponding to packet data for discarding the packet data according to a value of the timer; maintaining the value of the timer corresponding to the packet data when a handover is performed without restarting or resetting the value of the timer; and discarding the corresponding packet data when the maintained value of the timer reaches a given value.

18 Claims, 38 Drawing Sheets

(56) References Cited

OTHER PUBLICATIONS

LG Electronics Inc: "Discussion on Discard Function", 3GPP DRAFT; R2-074988, Jeju, Korea, Nov. 5-9, 2007.

Partial European search report for corresponding EP application No. 08172051.8 dated Oct. 11, 2011.

3GPP TR 25.913 V7.3.0 (Mar. 2006); 3rd Generation Partnership Project; Technical Specification Group Radio Access Network; Requirements for Evolved UTRA (E-UTRA) and Evolved UTRAN (E-UTRAN) (Release 7). Mar. 2006.

3GPP TSG-RAN2 Meeting #60 Jeju, South Korea. Change Request "Clean up and update on security, scheduling, mobility, MBMS and DRX". Nov. 5-9, 2007.

Sally Floyd and Van Jacobson, Lawrence Berkeley Laboratory, University of California "Random Early Detection Gateways for Congestion Avoidance" IEEE/ACM Transactions on Networking. Aug. 1993.

3GPP TS 36.300 V8.2.0 (Sep. 2007); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). Sep. 2007.

3GPP TS 23.401 V8.0.0 (Dec. 2007); 3rd Generation Partnership Project; Technical Specification Group Services and System Aspects; General Packet Radio Service (GPRS) enhancements for Evolved Universal Terrestrial Radio Access Network (E-UTRAN) access (Release 8). Dec. 2007.

3GPP TS 29.060 V8.2.0 (Dec. 2007); 3rd Generation Partnership Project; Technical Specification Group Core Network and Terminals; General Packet Radio Service (GPRS); GPRS Tunnelling Protocol (GTP) across the Gn and Gp interface (Release 8). Dec. 2007.

The extended European search report includes the European search opinion issued for corresponding European Patent Application No. 08172051.8 issued Jan. 24, 2012.

Mitsubishi Electric; "Priorization of forwarded packet via X2 interface"; Agenda Item .3.1a; 3GPP TSG RAN WG3 #57bis; R3-071898; Sophia Antipolis, France; Oct. 8-11, 2007.

LG Electronics Inc.; Detailed DL handlover behaviour; Agenda Item 4.4.2; 3GPP TSG-RAN WG2 #59bis; R2-074217; Shanghai, China; Oct. 8-12, 2007.

Fujitsu; "Handling of PDCP SDU Discard Timer at HO"; Agenda Item 5.1.3.2 (Lossless Handovers); 3GPP TSG RAN WG2 Meeting #61; R2-081147; Sorrento, Italy; Feb. 11-15, 2008.

"Non-Final Office Action" issued by the USPTO for corresponding U.S. Appl. No. 12/346,020, dated May 13, 2011.

"Final Office Action" issued by the USPTO for corresponding U.S. Appl. No. 12/346,020, dated Sep. 19, 2011.

Extended European search report with search opinion issued for corresponding European Patent Application No. 08172051.8 dated Jan. 24, 2012.

Fujitsu; "Handling of PDCP SDU Discard Timer at HO"; Agenda Item: 5.1.3.2 (Lossless Handovers); 3GPP TSG RAN WG2 Meeting #61; R2-081147; Sorrento, Italy; Feb. 11-15, 2008.

LG Electronics Inc.; "Detailed DL handover behaviour"; Agenda Item: 4.4.2; 3GPP TSG-RAN WG2 #59bis; R2-074217; Shanghai, China; Oct. 8-12, 2007.

Mitsubishi Electric; "Prioritization of forwarded packet via X2 interface"; Agenda Item: 7.3.1a; 3GPP TSG RAN WG3 #57bis; R3-071898; Sophia Antipolis, France; Oct. 8-11, 2007.

Final Office Action issued by the United States Patent and Trademark Office for corresponding U.S. Appl. No. 13/558,788, electronically delivered May 9, 2013.

Final Office Action issued by the United States Patent and Trademark Office issued for corresponding U.S. Appl. No. 13/558,788 dated Jun. 11, 2013.

Office Action issued for corresponding European Patent Application No. 08 172 051.8, dated Jul. 8, 2013.

Texas Instruments, Inc.; "Data handling during Handovers"; Agenda Item: 4.4.2 and 4.4.3—LTE Active Mobility procedures: Data handling: "low loss/lossless bearers"/"more loss bearers"; Oct. 8-12, 2007, 3GPP TSG-RAN WG2 Meeting #59 bis, R2-074020, Shanghai, China.

Final Office Action issued by the United States Patent and Trademark Office for corresponding U.S. Appl. No. 13/558,798 dated Feb. 21, 2014.

\* cited by examiner

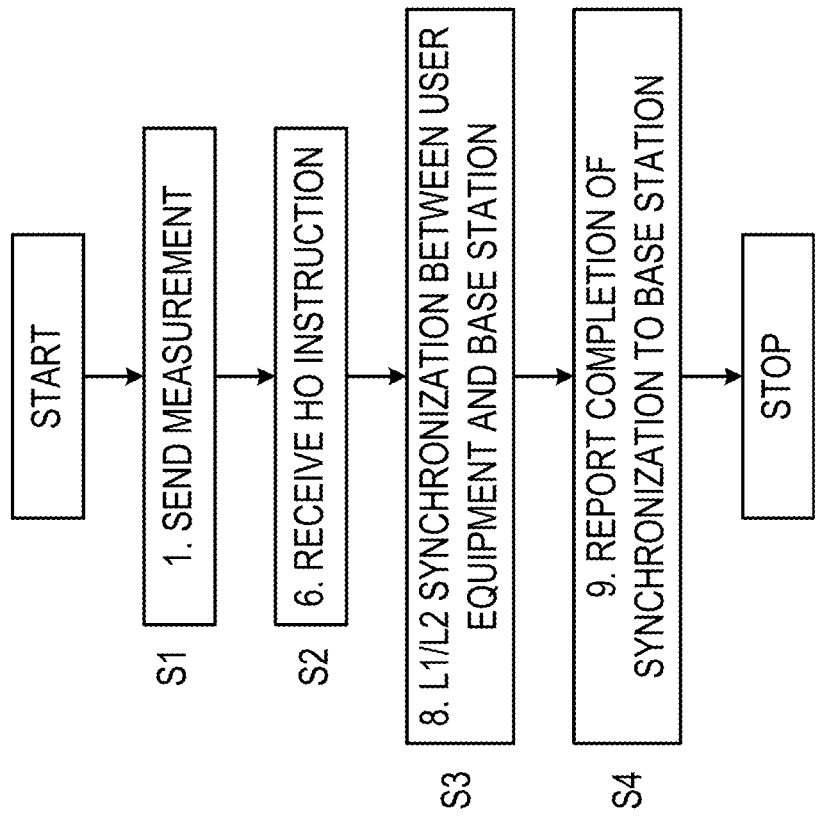

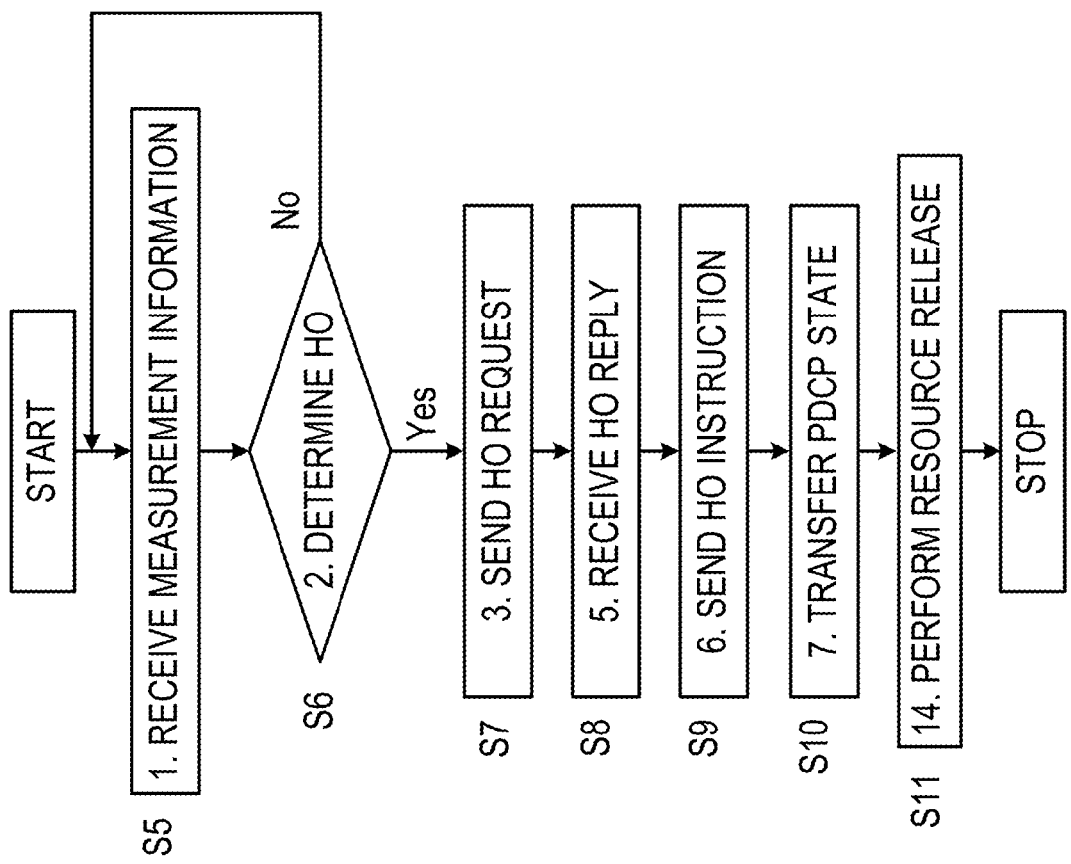

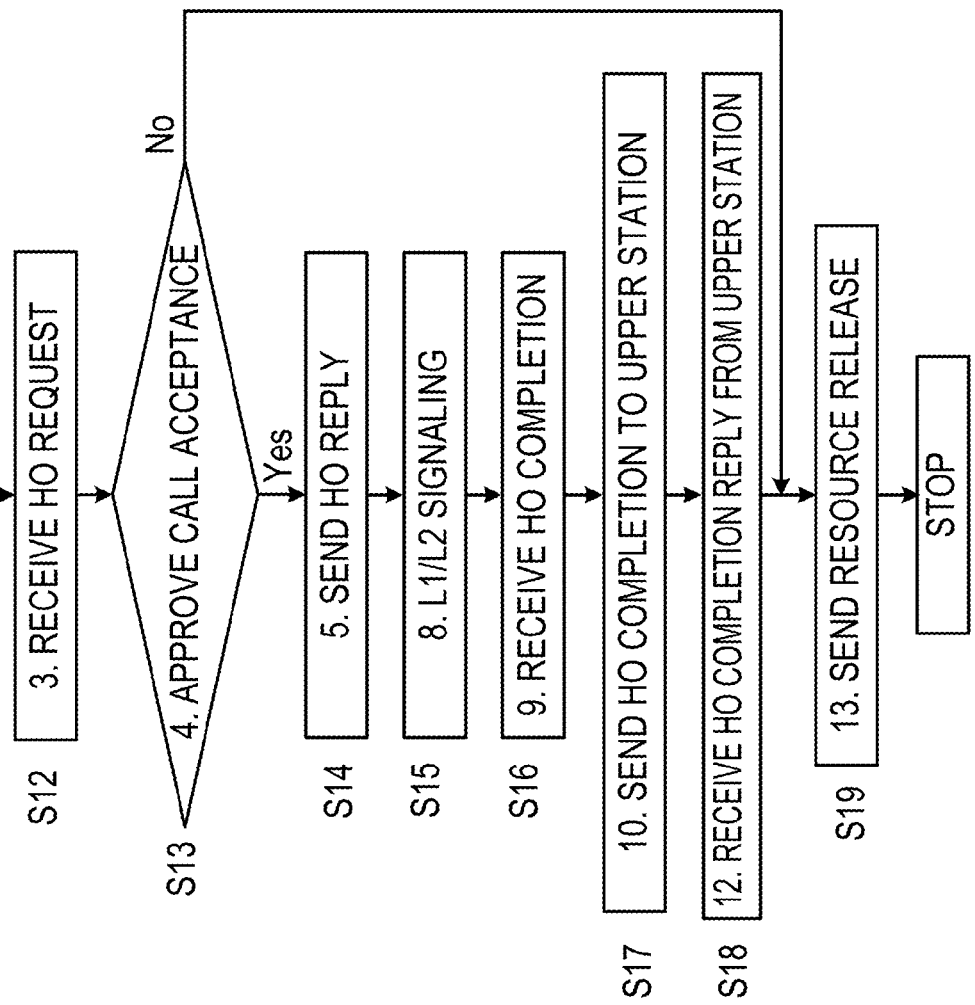

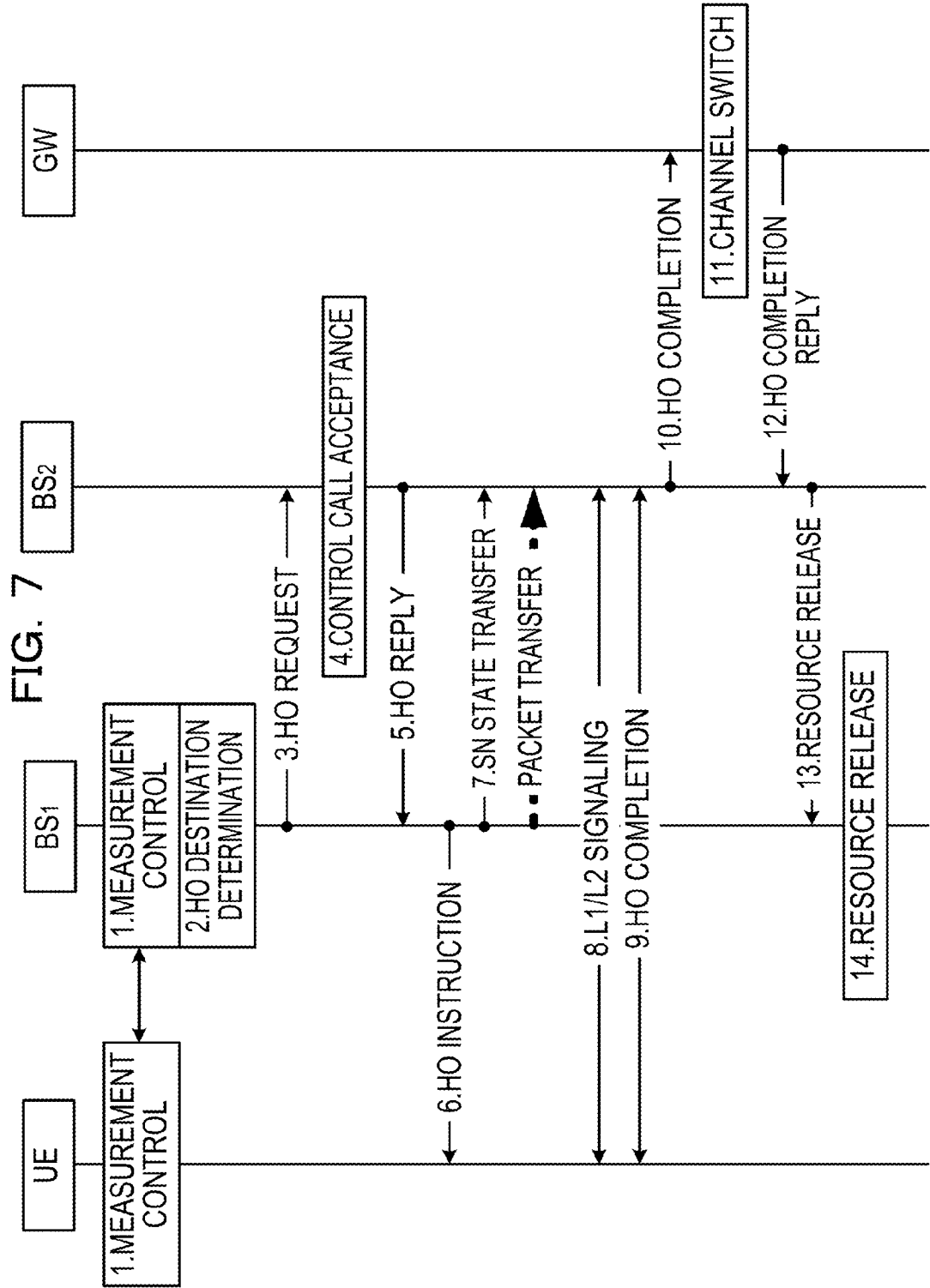

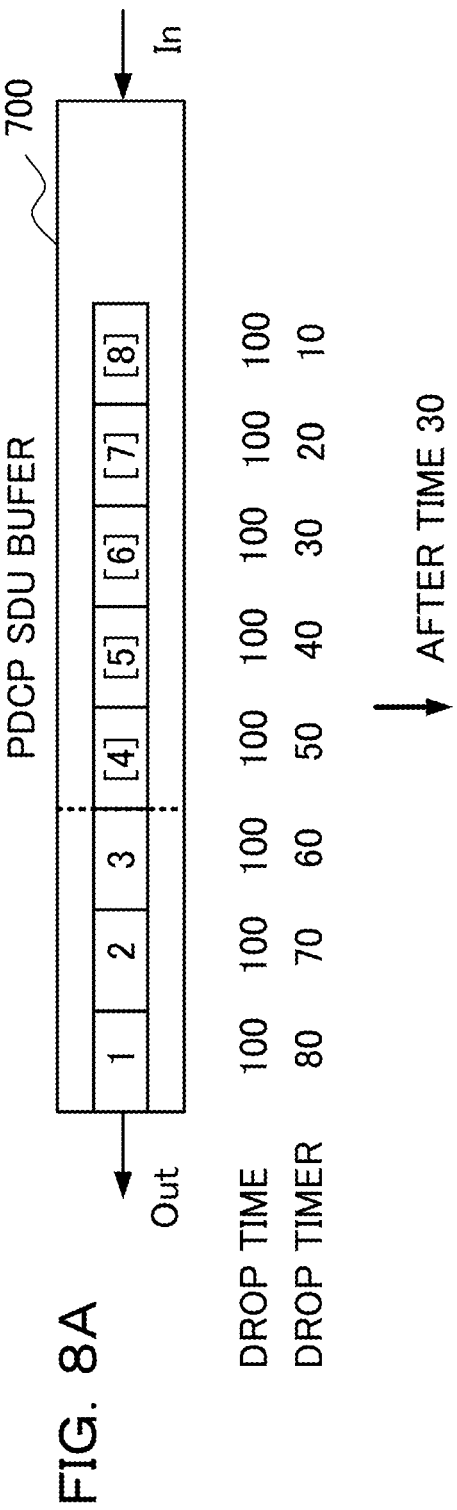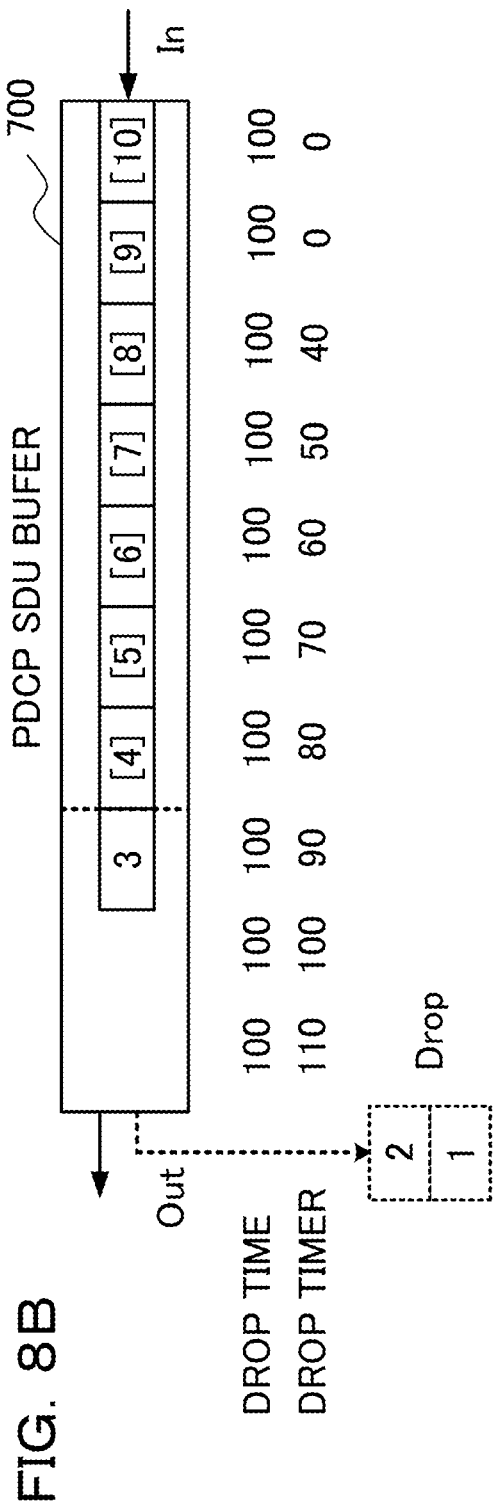

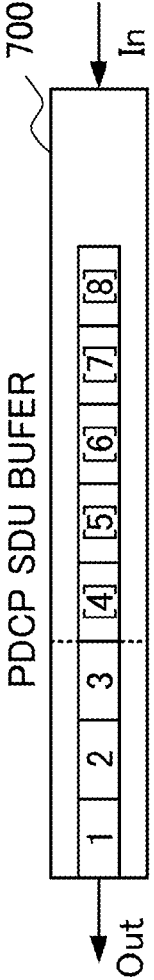
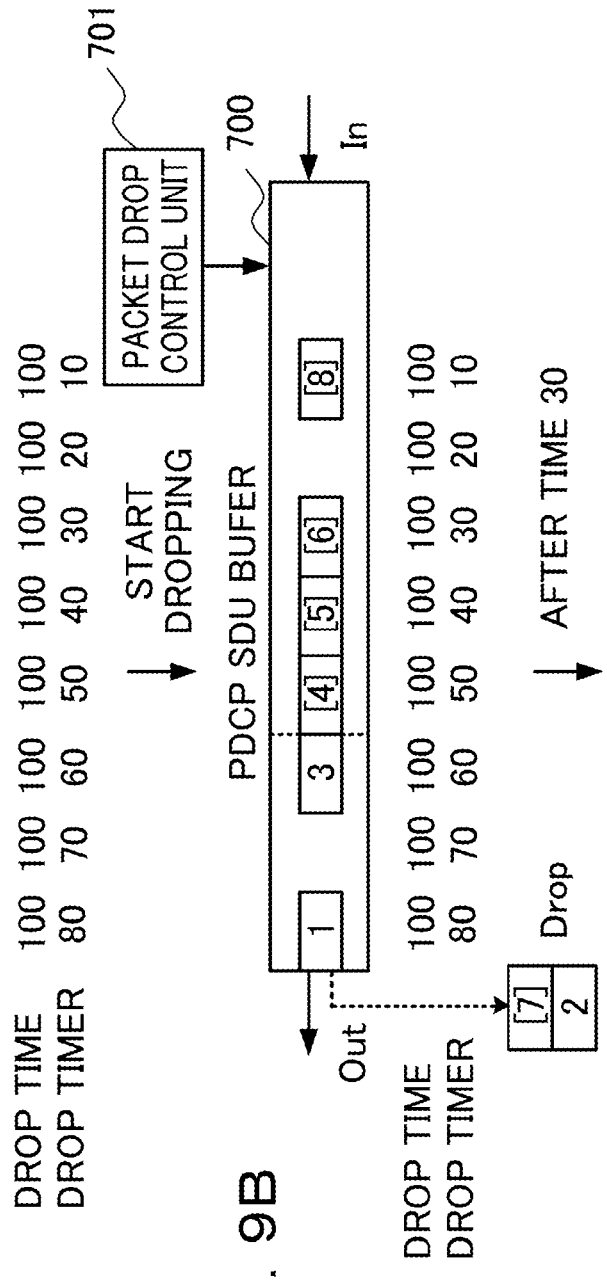
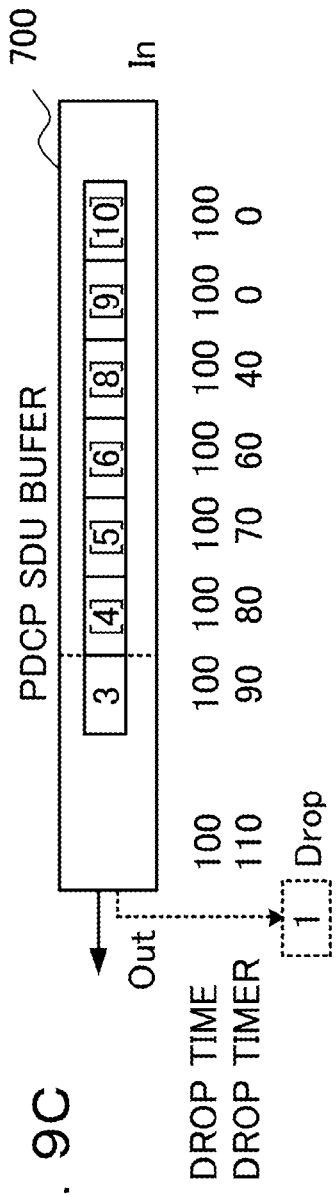

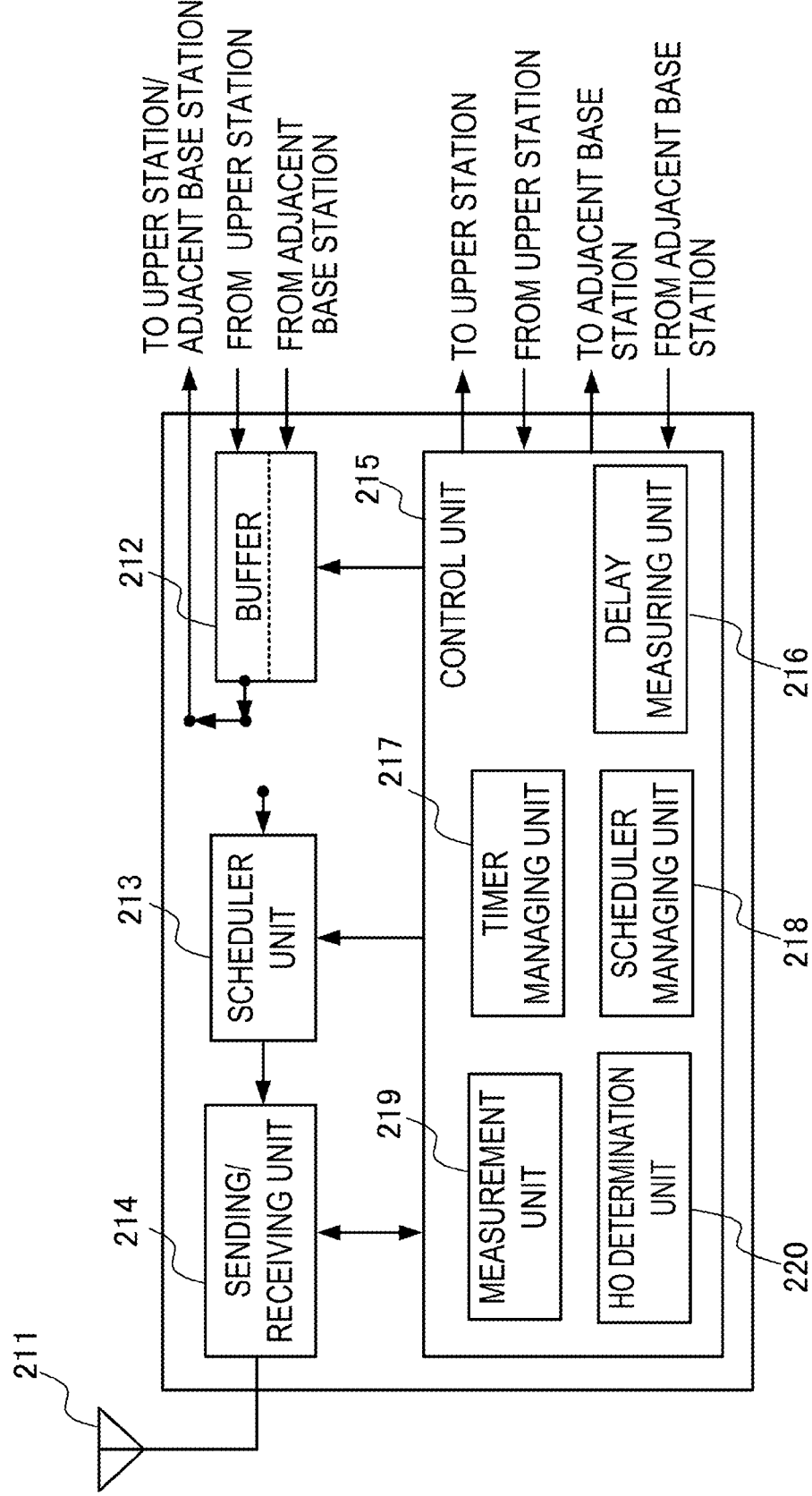

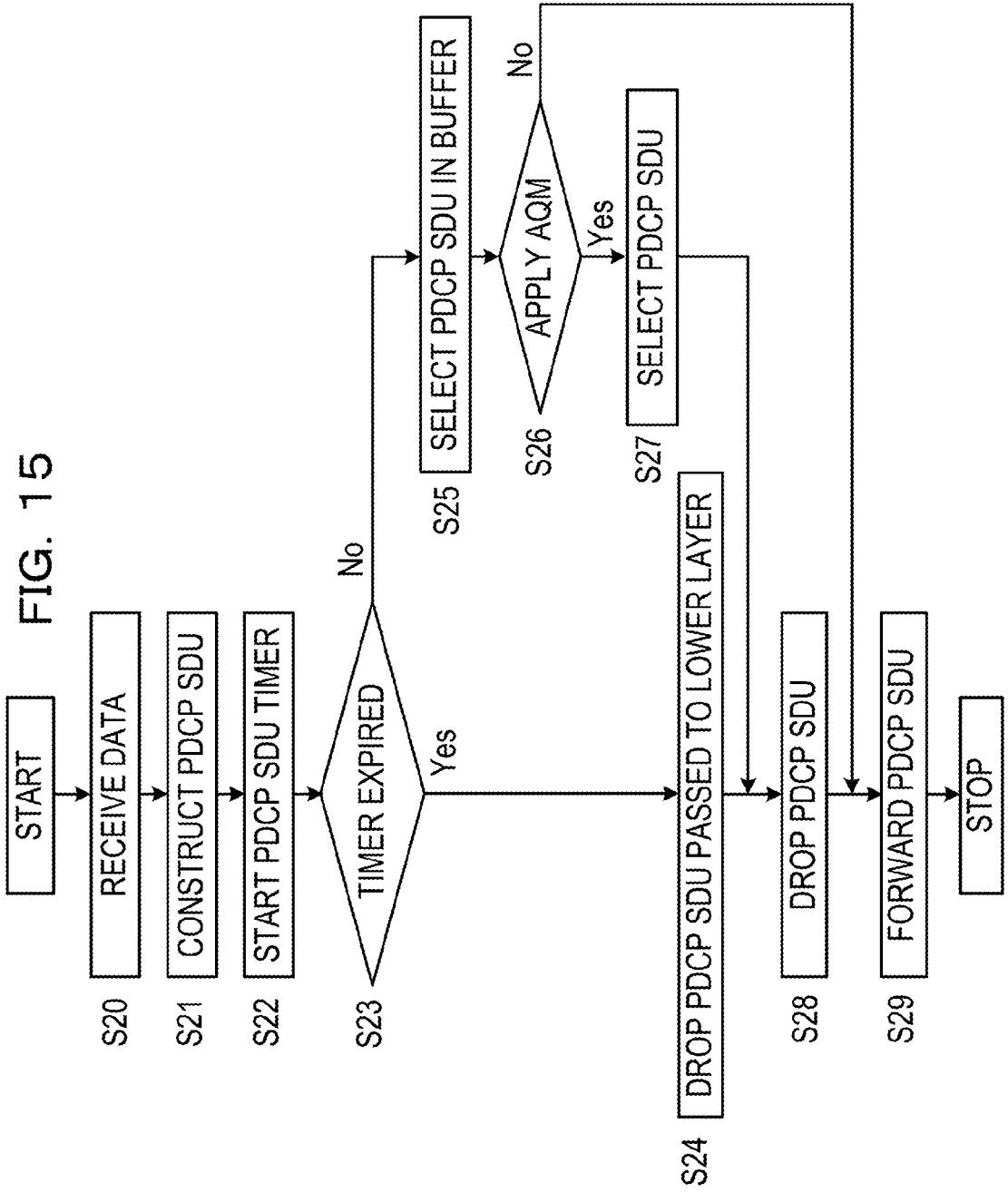

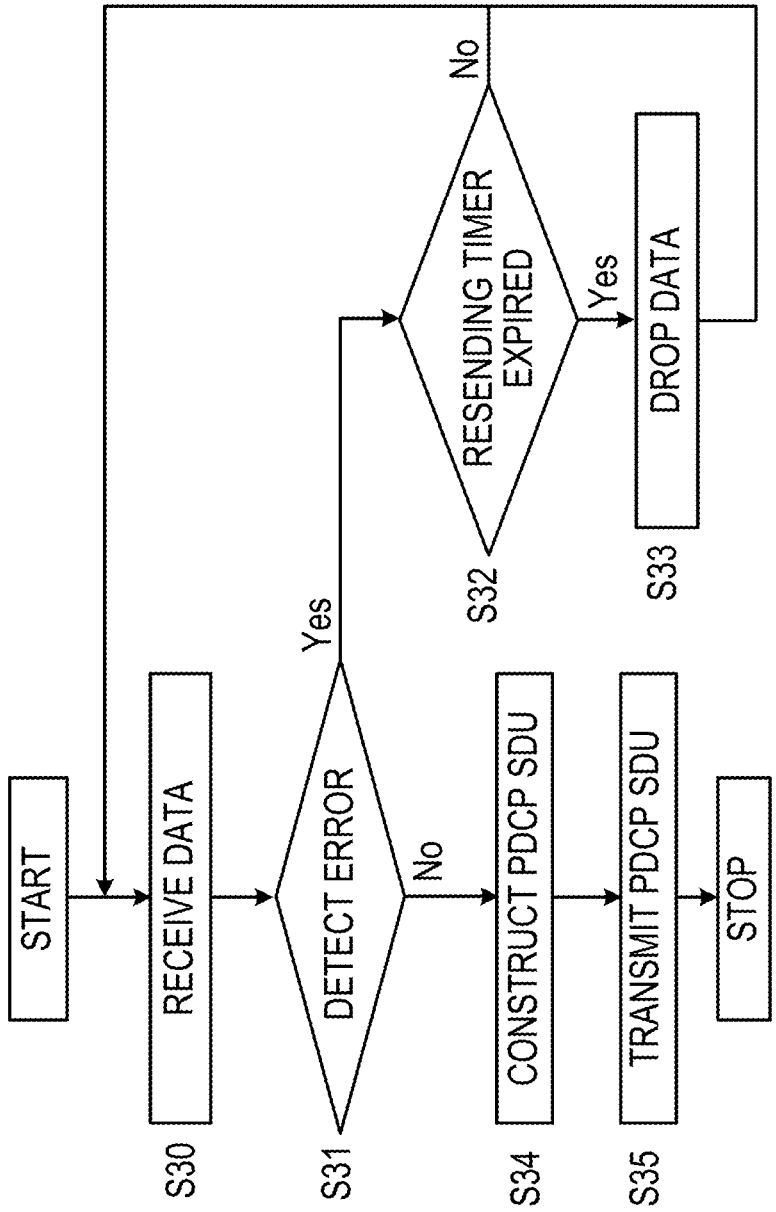

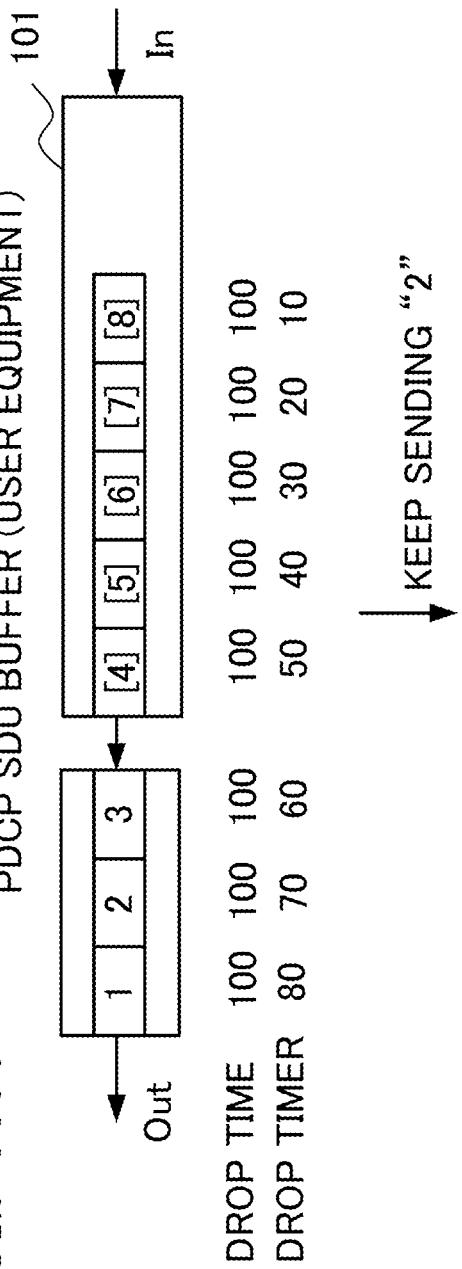

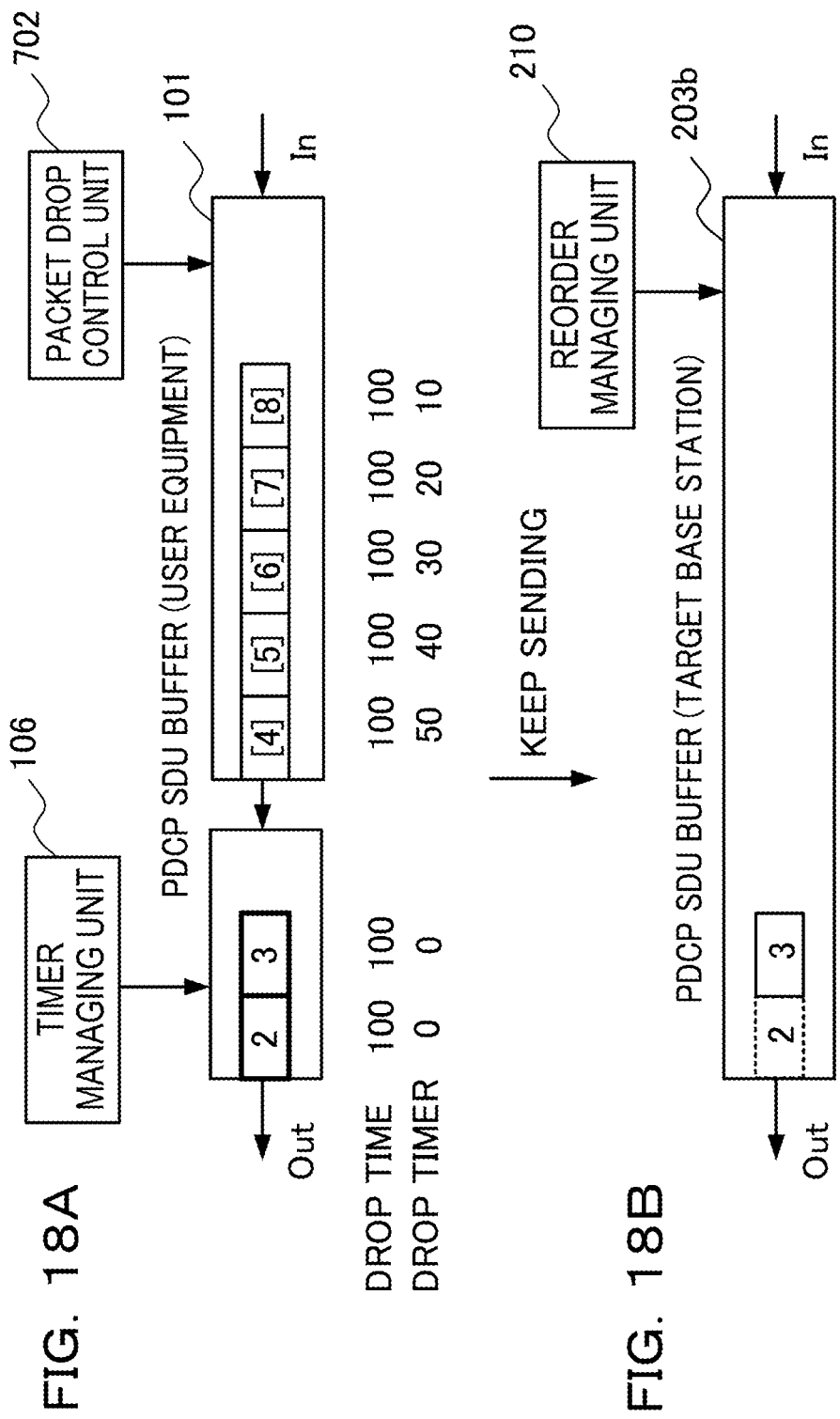

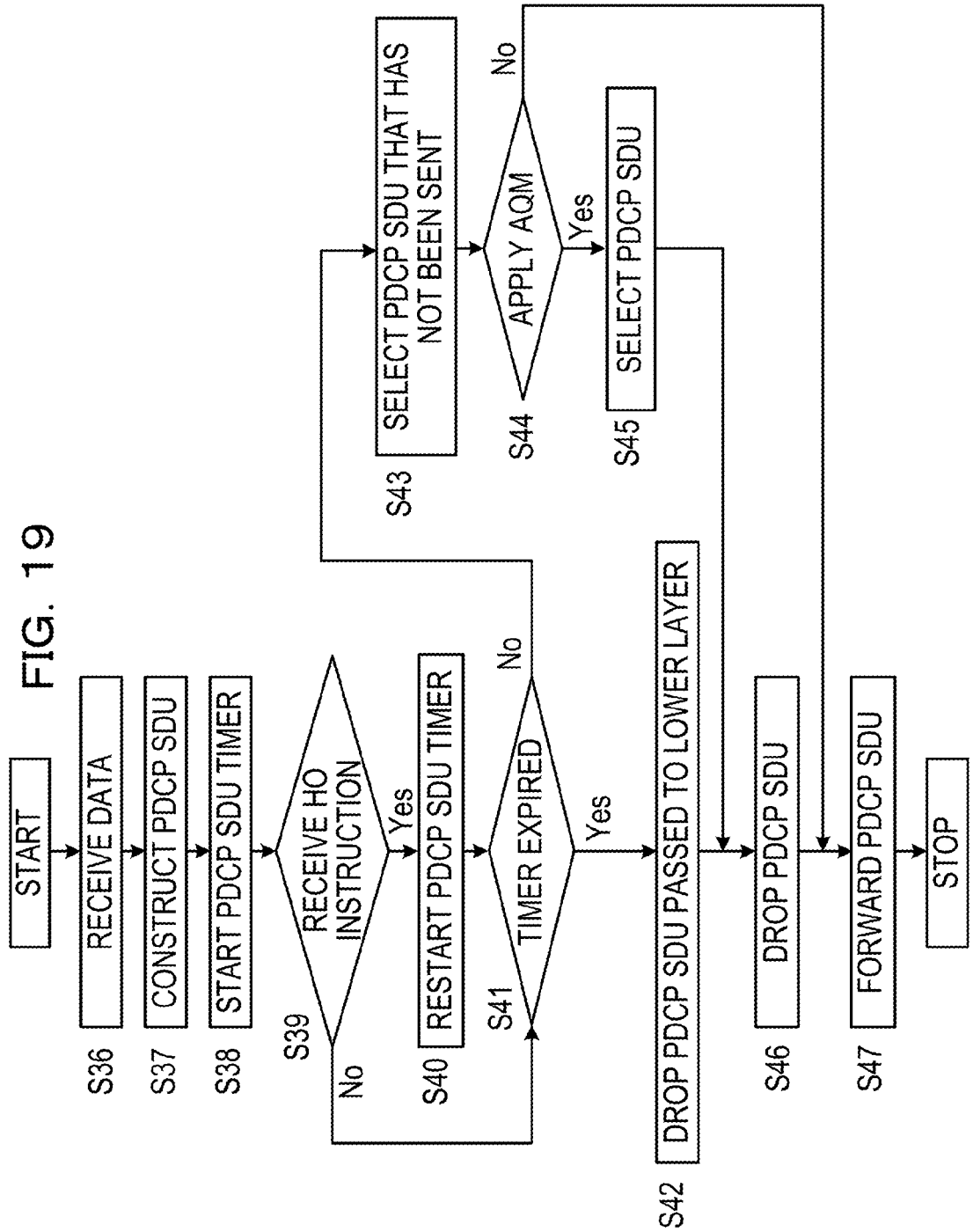

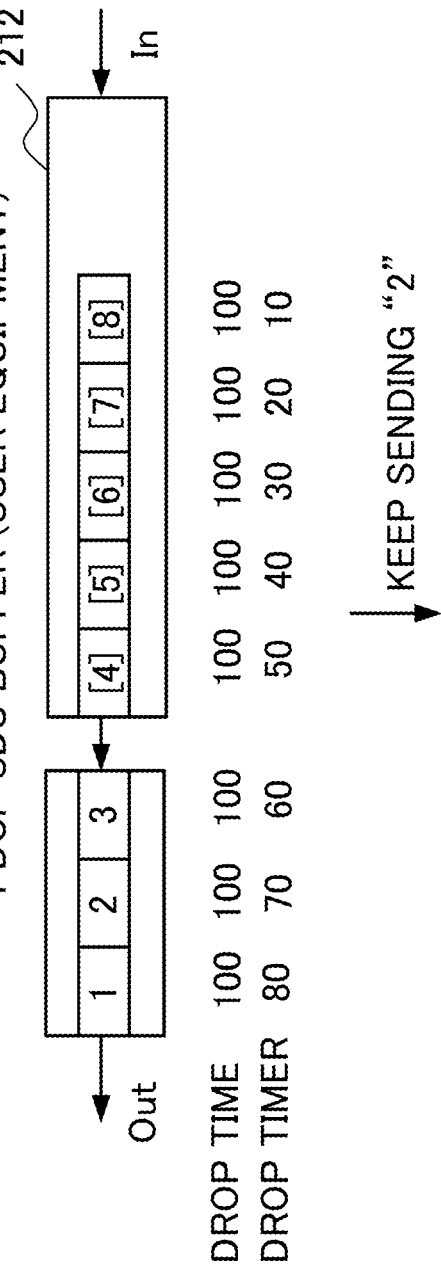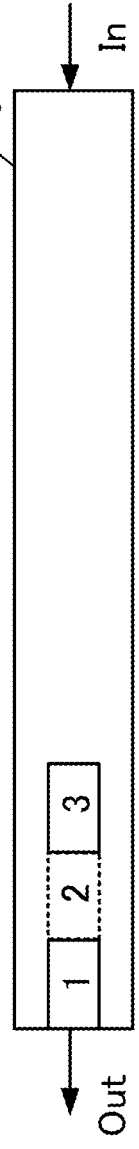

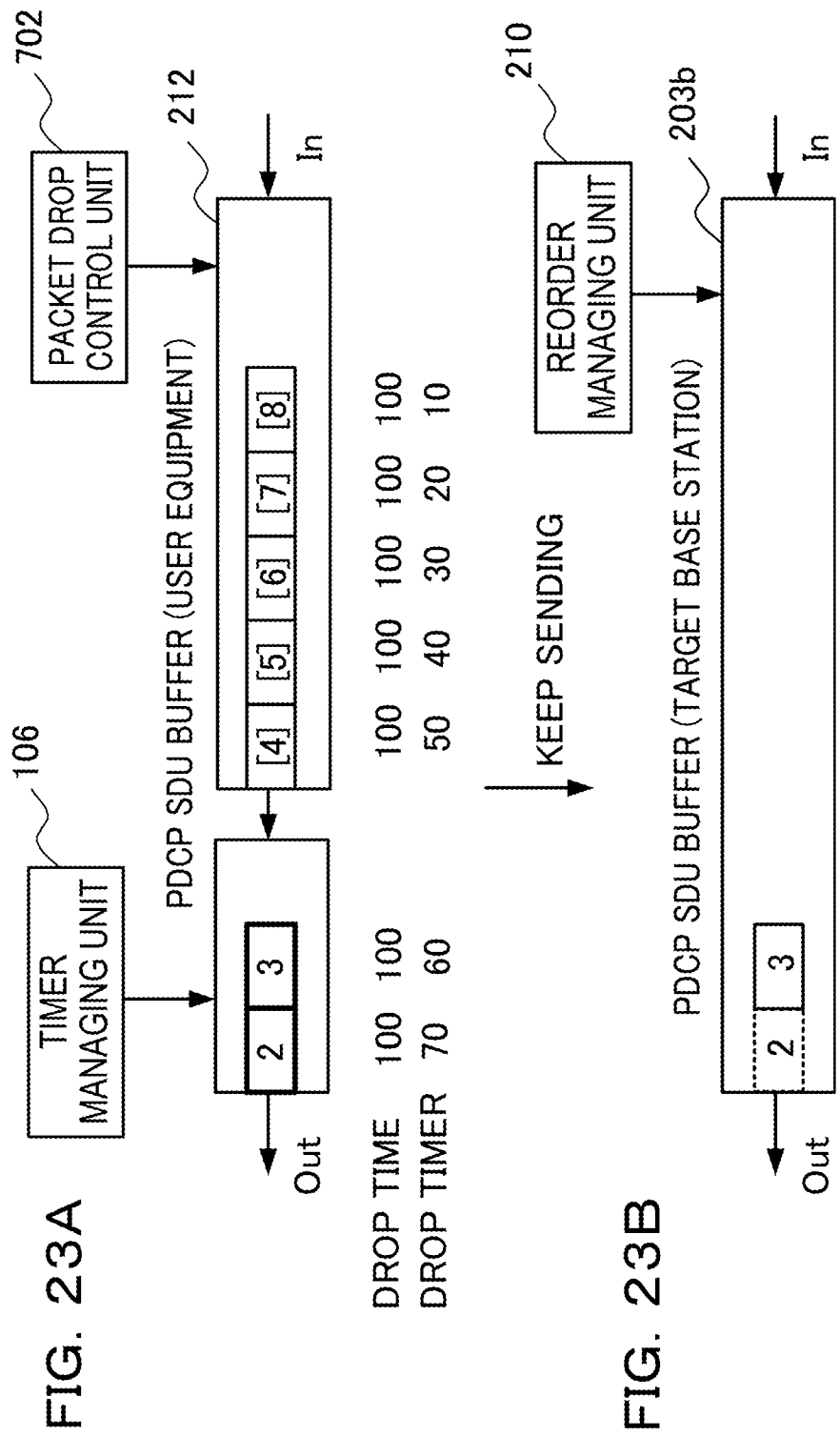

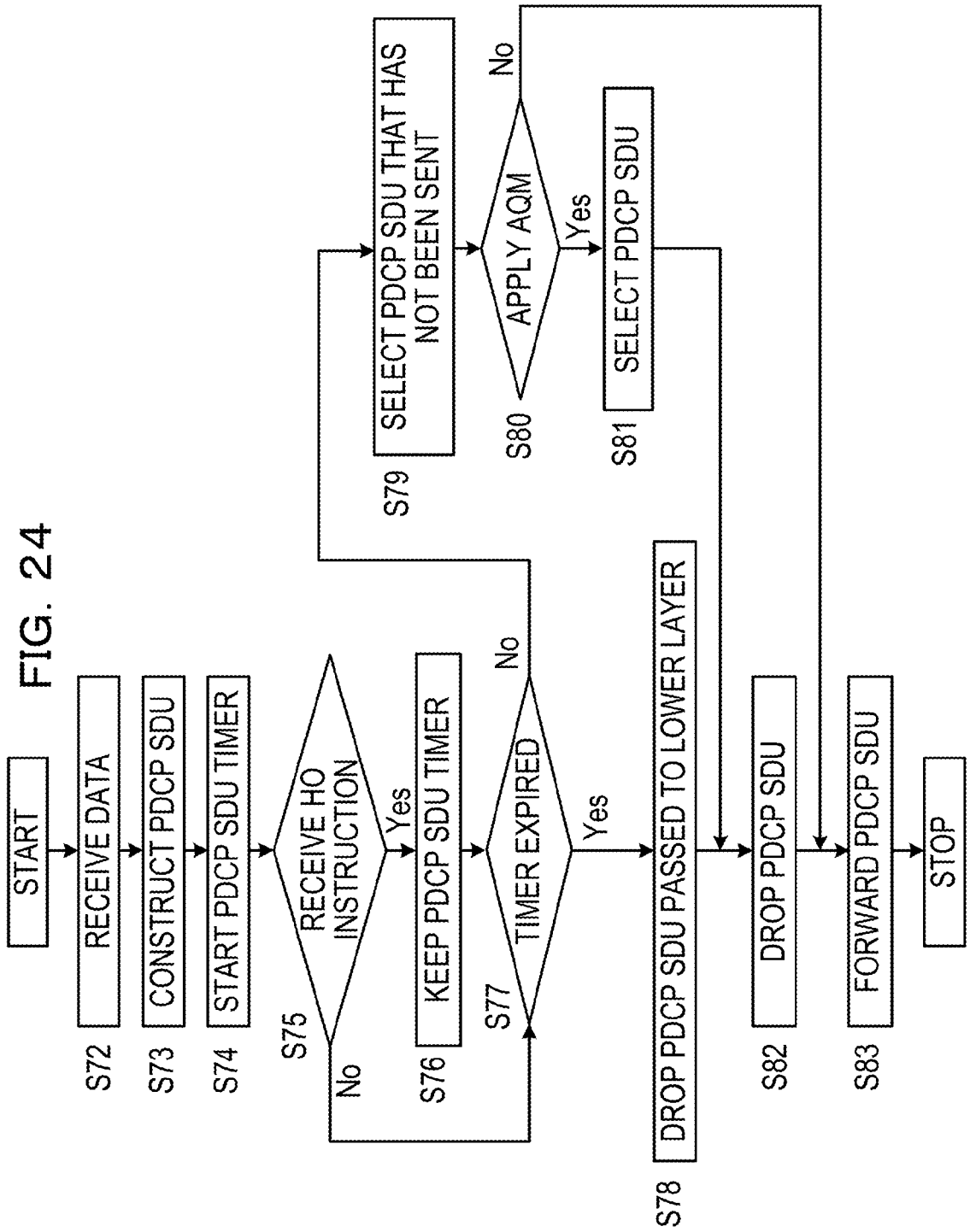

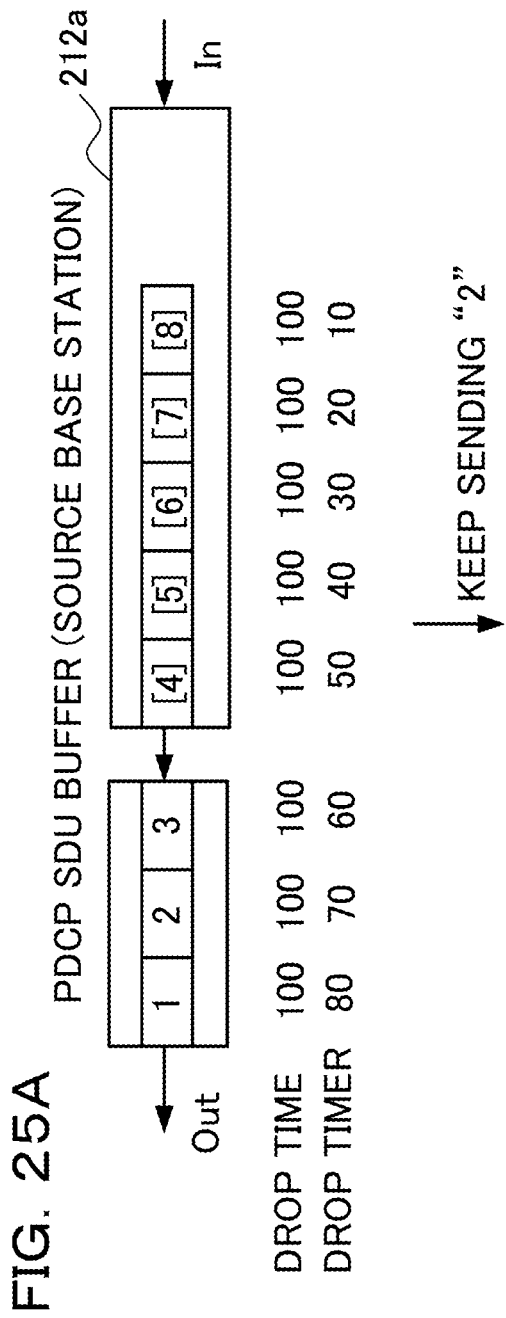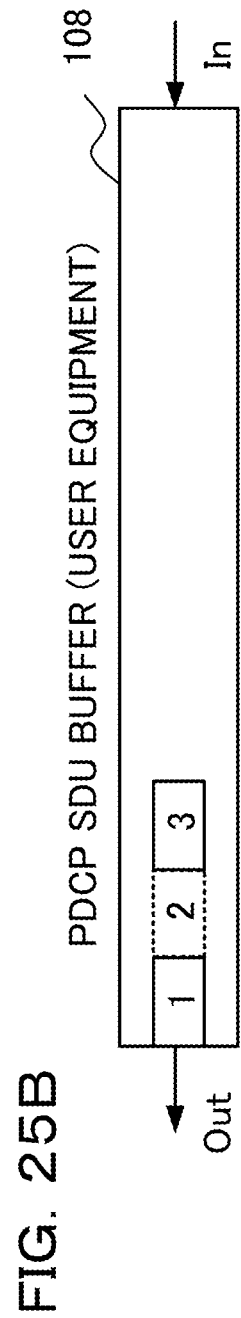

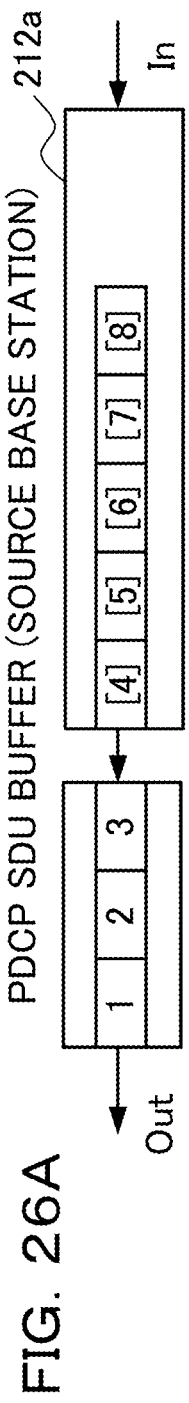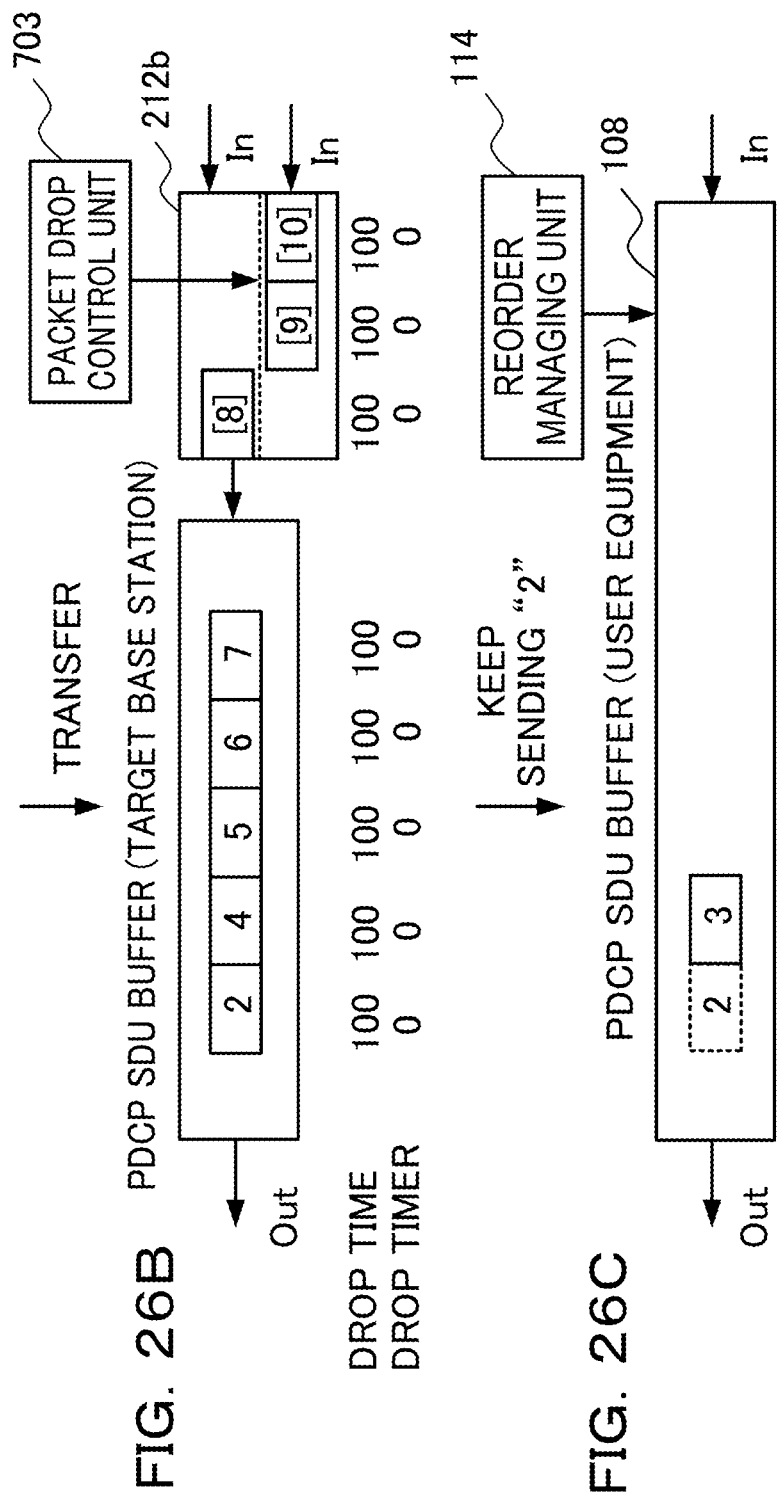
FIG. 26A FIG. 26B FIG. 26C

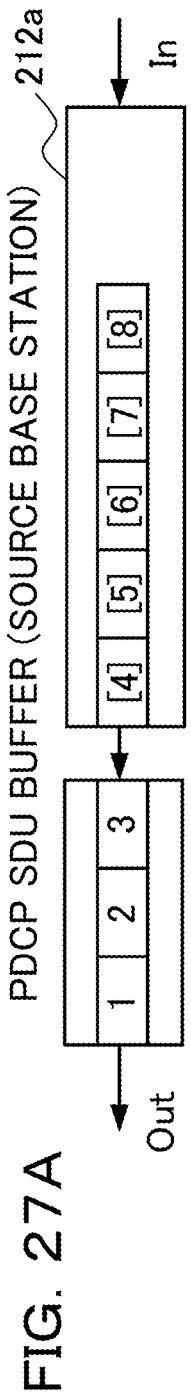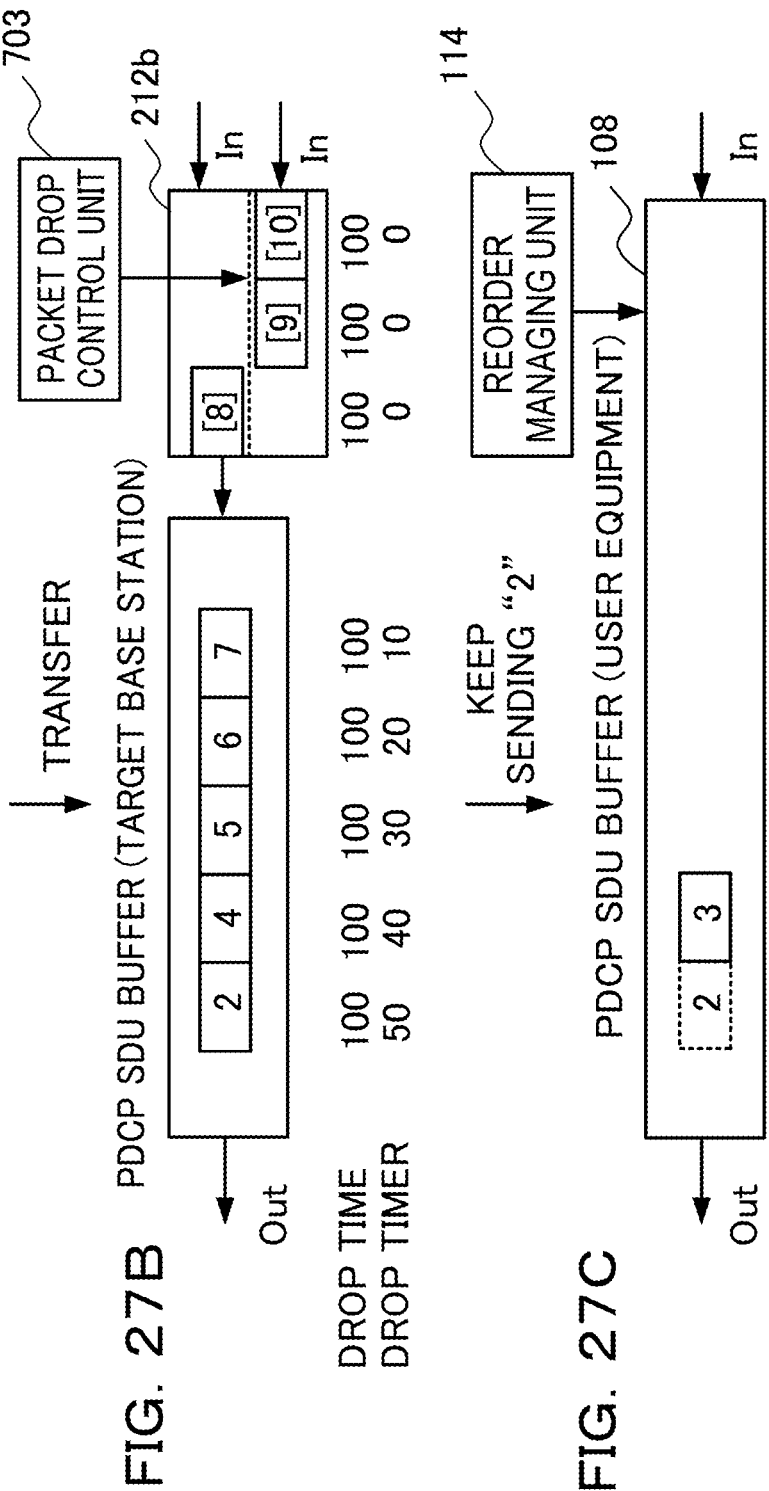
FIG. 27A  FIG. 27B  FIG. 27C

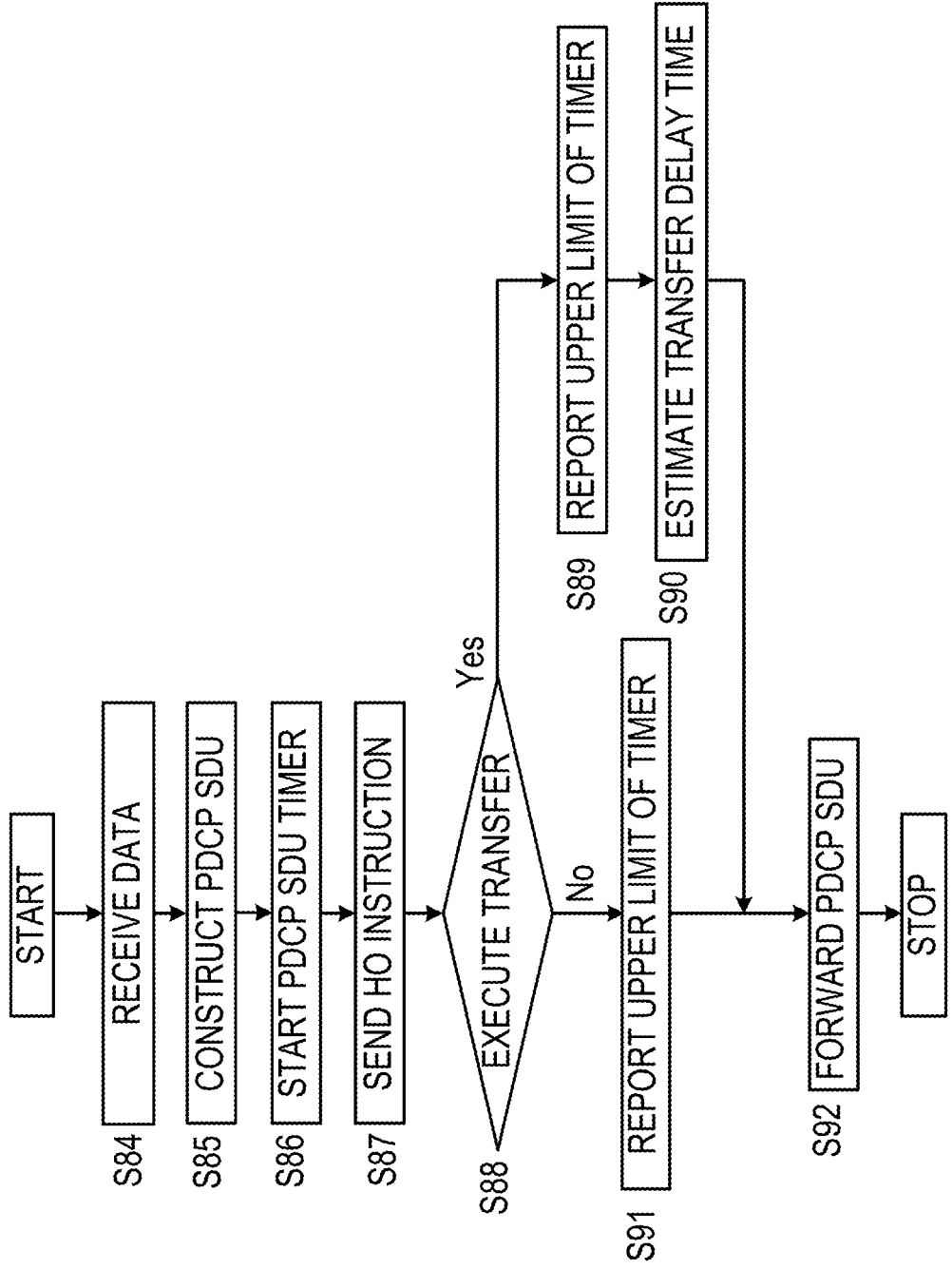

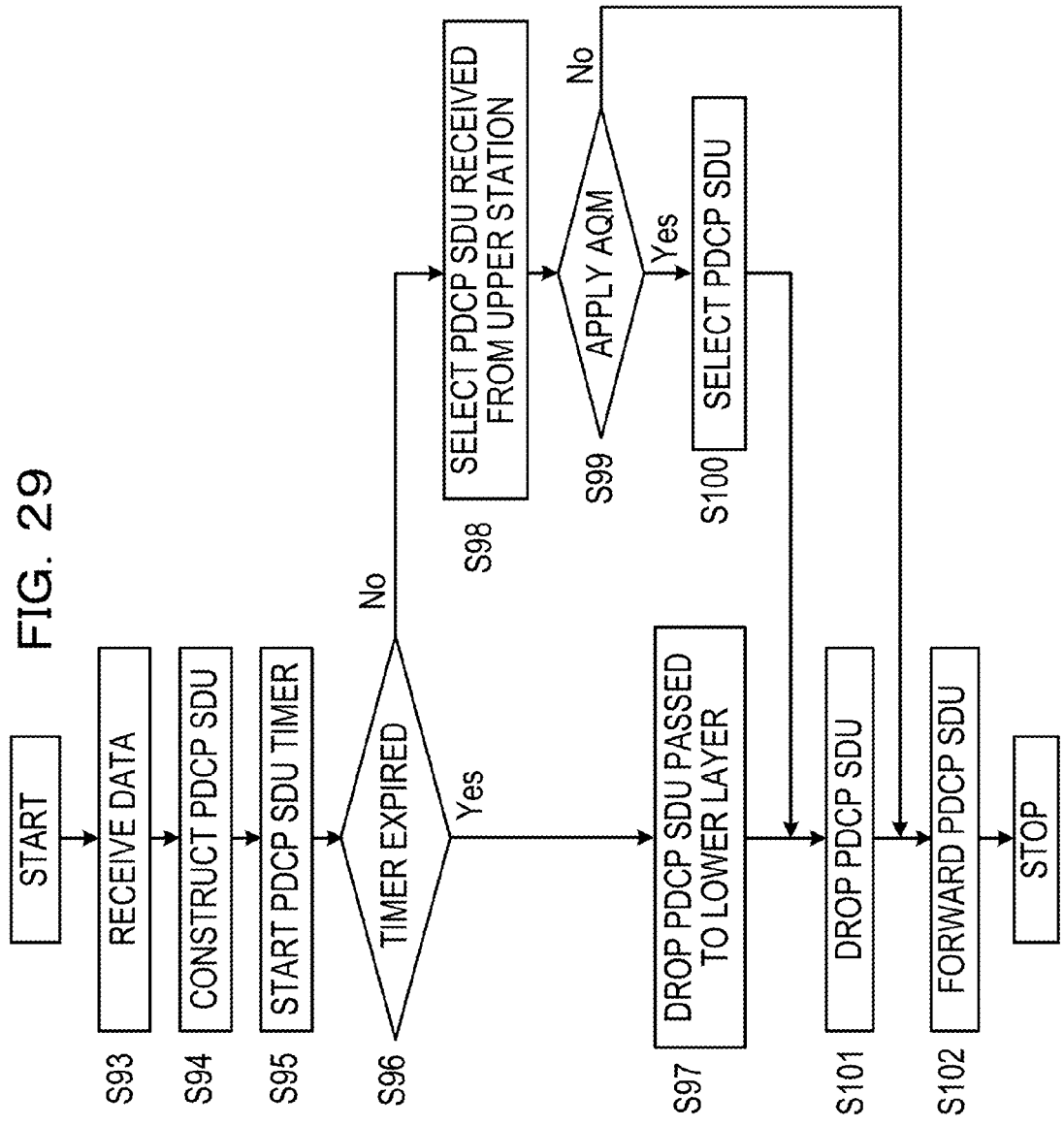

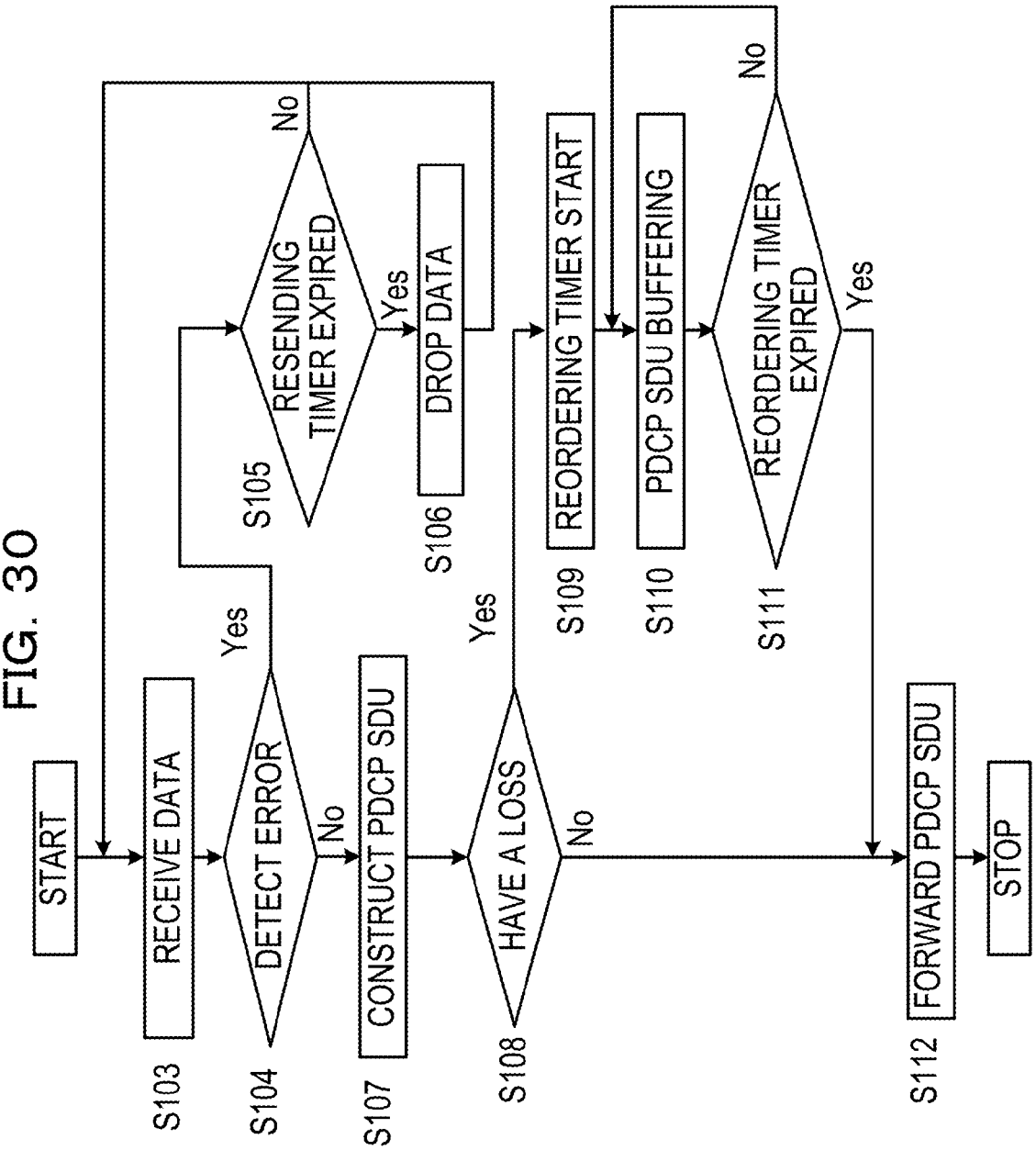

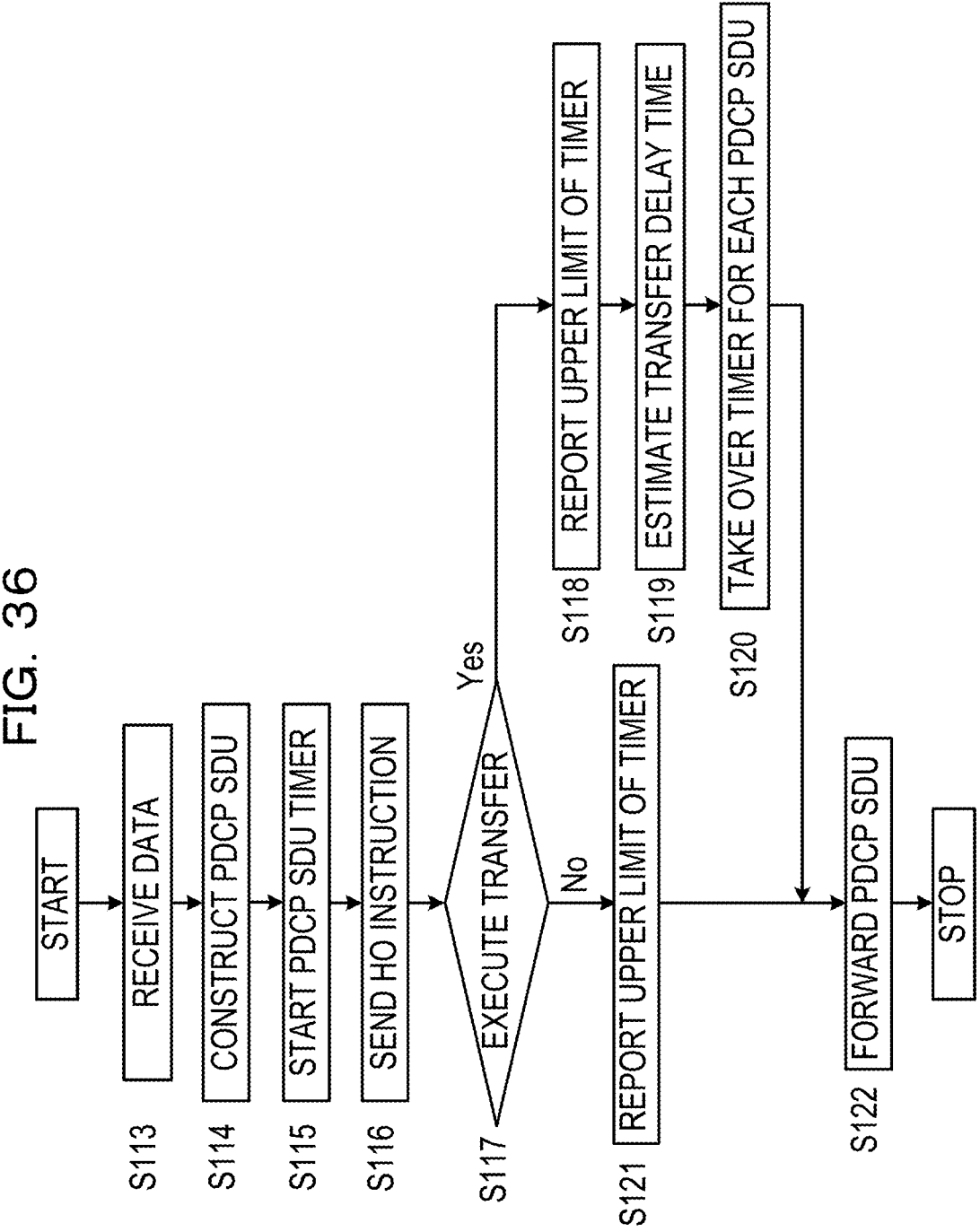

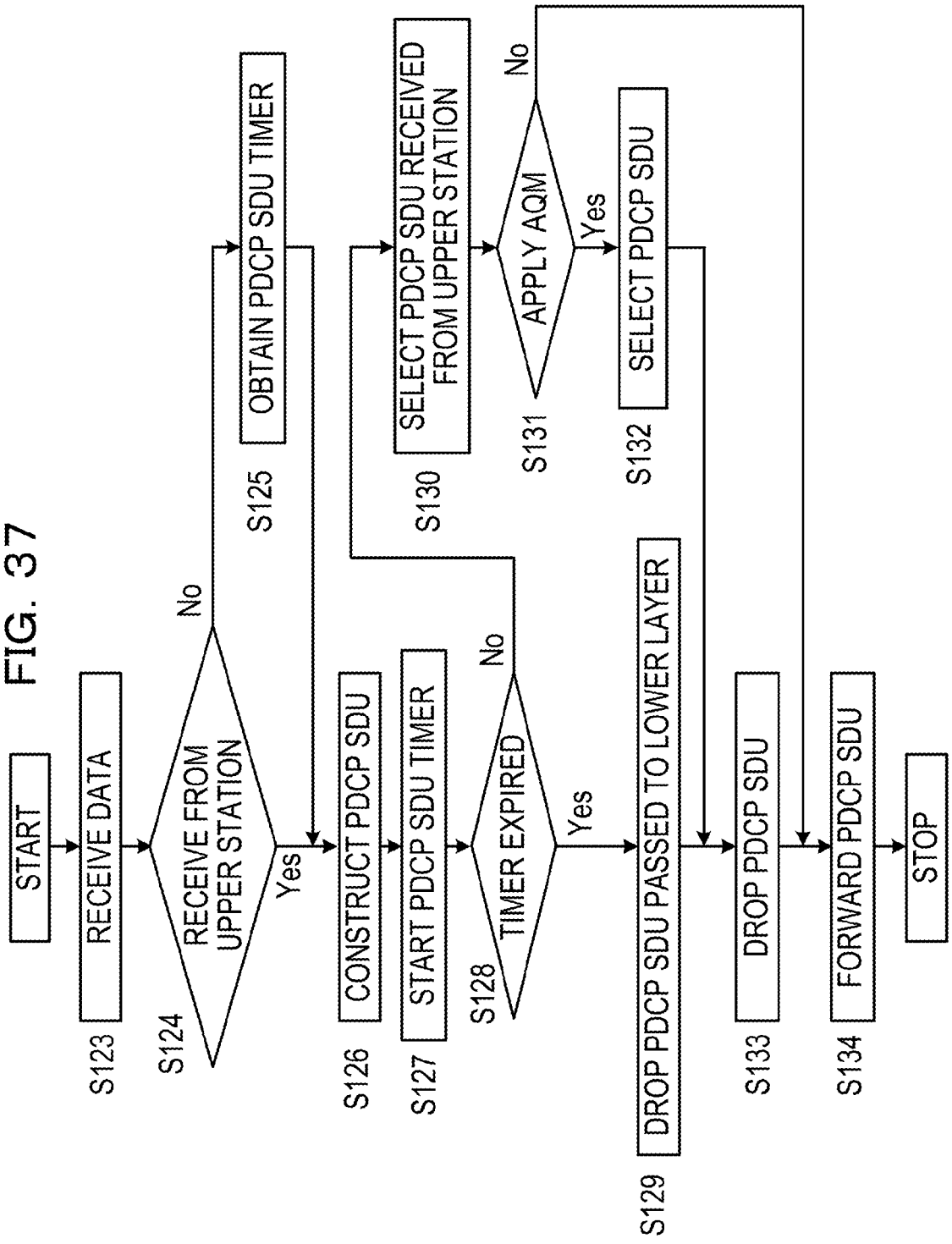

METHOD FOR DROPPING PACKET DATA, RADIO COMMUNICATION DEVICE, AND MOBILE COMMUNICATION SYSTEM

CROSS-REFERENCE TO RELATED APPLICATIONS

This application is a continuation of U.S. application Ser. No. 12/346,020, filed on Dec. 30, 2008, which is based upon and claims the benefit of priority of the prior Japanese Patent Application No. 2008-258, filed on Jan. 7, 2008, the entire contents of which are incorporated herein by reference.

FIELD

The present invention generally relates to a radio communication device, such as a user equipment and/or a base station, and a method for dropping packet data in the radio communication device. The present invention is preferably applied to a case where a method for dropping packet data based on an Active Queue Management (AQM) technology and a method for dropping packet data based on a timer are used together.

BACKGROUND

Services supported by third generation Code Division Multiple Access (CDMA) systems have been provided for mobile communication systems for cellular phones and so on. Under these circumstances, the $3^{rd}$ Generation Partnership Project (3GPP) is working on Long Term Evolution (LTE) that achieves a much higher data-rate. Now, 3GPP is confronted with hurdles of how to speed up transfer-rates and how to reduce transmission delays.

When a user equipment moves from one location to another location while in service, a base station that communicates with the user equipment performs a handover operation according to the reception condition at the user equipment. In a hard handover that is mainly applied to a packet switching system, a line between the user equipment and a source base station (handover source base station) communicates with the user equipment until the relocation is disconnected and a line between the user equipment and a target base station (handover target base station) that is to communicate with the user equipment is connected.

In the hard handover scenario, the user equipment obtains system information on the target base station immediately before the handover. Accordingly, the handover can be carried out in a short time.

On the other hand, an interruption of user data transmission during the handover causes a transmission delay. Moreover, packet data may be lost in the interruption. In such a case, the lost packet data has to be resent in an end-to-end manner and recovered. This may further increase the transmission delay.

It would be advantageous to reduce the transmission delay during handover in the mobile communication by shortening the transmission interruption time during handover and to prevent the packet data loss in the interruption.

SUMMARY

According to an aspect of the invention, a control method in a mobile communication system with a buffer unit for temporarily storing packet data to be sent, includes dropping the packet data stored in the buffer unit before sending when a drop timer corresponding to the packet data before sending reaches a given value or when a drop condition required by a drop mechanism accompanying the buffer unit is satisfied and dropping the packet data stored in the buffer unit after sending when a drop timer corresponding to the packet data after sending reaches a given value.

According to an aspect of the invention, a control method in a mobile communication system with a buffer unit for temporarily storing packet data to be sent, wherein the system drops the packet data stored in said buffer unit according to a value of a drop timer corresponding to the packet data, includes changing the value of the drop timer corresponding to the packet data stored in the buffer unit when a handover is performed, setting the changed value of the drop timer as a new value of the drop timer for the packet data stored in the buffer unit, and dropping the corresponding packet data when the new value of the drop timer reaches a given value.

According to an aspect of the invention, a control method in a mobile communication system with a buffer unit for temporarily storing packet data to be sent, wherein the system drops the packet data stored in said buffer unit according to a value of a drop timer corresponding to the packet data, includes taking over the value of the drop timer corresponding to the packet data stored in the buffer unit when a handover is performed, and dropping the corresponding packet data when the taken over value of the drop timer reaches a given value.

According to an aspect of the invention, a control method in a mobile communication system with a buffer unit for temporarily storing packet data to be sent, wherein the system drops the packet data stored in said buffer unit according to a value of a drop timer corresponding to the packet data, includes transferring the packet data from a source base station to a target base station and transferring the value of the drop timer corresponding to the packet data to be transferred when a handover is performed, wherein the target base station sets a new value of the drop timer for the transferred packet data with the transferred value of the drop timer or the transferred value of the drop timer corrected with a transfer delay time, and when the new value of the drop timer reaches a given value, drops the corresponding packet data.

According to an aspect of the invention, a control method in a mobile communication system with a buffer unit for temporarily storing packet data to be sent, wherein the system drops the packet data stored in said buffer unit according to a value of a drop timer corresponding to the packet data, includes transferring the packet data from a source base station to a target base station, and correcting the value of the drop timer corresponding to the packet data to be transferred with a transfer delay time and then transferring the value of the drop timer when a handover is performed, wherein the target base station sets a new value of the drop timer for the corresponding packet data with the corrected value of the drop timer transferred thereof and when the new value of the drop timer reaches a given value, drops the corresponding packet data.

According to an aspect of the invention, a radio communication device in a mobile communication system with a buffer unit for temporarily storing packet data to be sent, includes a control unit configured to drop the packet data stored in said buffer unit before sending when a drop timer corresponding to the packet data before sending reaches a given value or when a drop condition required by a drop mechanism accompanying the buffer unit is satisfied, and to drop the packet data stored in said buffer unit after sending when a drop timer corresponding to the packet data after sending reaches a given value.

According to an aspect of the invention, a radio communication device in a mobile communication system with a buffer unit for temporarily storing packet data to be sent, wherein the system drops the packet data stored in the buffer unit according to a value of a drop timer corresponding to the packet data, includes a control unit configured to change the value of the drop timer corresponding to the packet data stored in the buffer unit when a handover is performed, set the changed value of the drop timer as a new value of the drop timer for the packet data stored in the buffer unit, and to drop the corresponding packet data when the new value of the drop timer reaches a given value.

According to an aspect of the invention, a radio communication device in a mobile communication system with a buffer unit for temporarily storing packet data to be sent, wherein the system drops the packet data stored in the buffer unit according to a value of a drop timer corresponding to the packet data, includes a control unit configured to take over the value of the drop timer corresponding to the packet data stored in the buffer unit when a handover is performed, and to drop the corresponding packet data when the taken over value of the drop timer reaches a given value.

According to an aspect of the invention, a mobile communication system with a buffer unit for temporarily storing packet data to be sent, wherein the system drops the packet data stored in the buffer unit according to a value of a drop timer corresponding to the packet data, includes transferring means for transferring the packet data from a source base station to a target base station and transferring the value of the drop timer corresponding to the packet data to be transferred when a handover is performed, wherein the target base station includes a control unit configured to set a new value of the drop timer for the transferred packet data with the transferred value of the drop timer or the transferred value of the drop timer corrected with a transfer delay time, and to drop the corresponding packet data when the new value of the drop timer reaches a given value.

According to an aspect of the invention, a mobile communication system with a buffer unit for temporarily storing packet data to be sent, wherein the system drops the packet data stored in the buffer unit according to a value of a drop timer corresponding to the packet data, includes a transferring unit for transferring the packet data from a source base station to a target base station, and correcting the value of the drop timer corresponding to the packet data to be transferred with a transfer delay time and then transferring the value of the drop timer when a handover is performed. The target base station includes a control unit configured to set a new value of the drop timer for the corresponding packet data with the corrected value of the drop timer transferred thereof and drops the corresponding packet data when the new value of the drop timer reaches a given value.

Accordingly, it is an object in one aspect of the invention to reduce the transmission delay in the handover for the user equipment and the base station.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an exemplary flowchart for operations of units in the user equipment upon handover;

FIG. 5 depicts an exemplary flowchart for operations of units in a source base station upon handover;

FIG. 6 depicts an exemplary flowchart for operations of units in a target base station upon handover;

FIG. 7 depicts an exemplary handover sequence;

FIG. 8A depicts an example of timer-based packet data drop;

FIG. 8B depicts an example of timer-based packet data drop (time 30 has elapsed);

FIG. 9A depicts an example of a case where the timer-based packet data drop and AQM-based packet data drop are used together;

FIG. 9B depicts an example of a case where the timer-based packet data drop and the AQM-based packet data drop are used together (at the beginning of drop);

FIG. 9C depicts an example of a case where the timer-based packet data drop and the AQM-based packet data drop are used together (time 30 has elapsed);

FIG. 13 depicts an example of the configuration of the units in the base station (DL);

FIG. 15 depicts a flowchart of packet data processing at the user equipment (UL) or the base station (DL) according to the first embodiment;

FIG. 16 depicts a flowchart of packet data processing at the user equipment (DL) or the base station (UL) according to the first embodiment;

FIG. 17A depicts outlining operations of the user equipment before handover (HO) according to a second described embodiment;

FIG. 17B depicts outlining operations of the source base station before HO according to the second embodiment;

FIG. 18A depicts outlining operations of the user equipment after HO according to the second embodiment;

FIG. 18B depicts outlining operations of the target base station after HO according to the second embodiment;

FIG. 19 depicts a flowchart of packet data processing at the user equipment (UL) according to the second embodiment (AQM is applied to an un-transmitted PDCP SDU);

FIG. 22A depicts outlining operations of the user equipment before HO according to a third described embodiment;

FIG. 22B depicts outlining operations of the source base station before HO according to the third embodiment;

FIG. 23A depicts outlining operations of the user equipment after HO according to the third embodiment;

FIG. 23B depicts outlining operations of the target base station after HO according to the third embodiment;

FIG. 24 depicts a flowchart of packet data processing at the user equipment (UL) according to the third embodiment;

FIG. 25A depicts operations of the source base station before HO according to a fourth described embodiment;

FIG. 25B depicts operations of the user equipment before HO according to the fourth embodiment;

FIG. 26A depicts an example of operations of the source base station after HO according to the fourth embodiment;

FIG. 26B depicts an example of operations of the target base station after HO according to the fourth embodiment;

FIG. 26C depicts an example of operations of the user equipment after HO according to the fourth embodiment;

FIG. 27A depicts another example of operations of the source base station after HO according to the fourth embodiment;

FIG. 27B depicts another example of operations of the target base station after HO according to the fourth embodiment;

FIG. 27C depicts another example of operations of the user equipment after HO according to the fourth embodiment;

FIG. 28 depicts a flowchart of packet data processing at the source base station (DL) according to the fourth embodiment;

FIG. 29 depicts a flowchart of packet data processing at the target base station (DL) according to the fourth embodiment;

FIG. 30 depicts a flowchart of packet data processing at the user equipment (DL) according to the fourth embodiment;

FIG. 36 depicts a flowchart of packet data processing at the source base station (DL) according to the fifth embodiment;

FIG. 37 depicts a flowchart of packet data processing at the target base station (DL) according to the fifth embodiment;

BRIEF DESCRIPTION OF EMBODIMENTS

Embodiments of the present invention are described below with reference to the figures.

(1) Communication System Configuration

Figure 1:
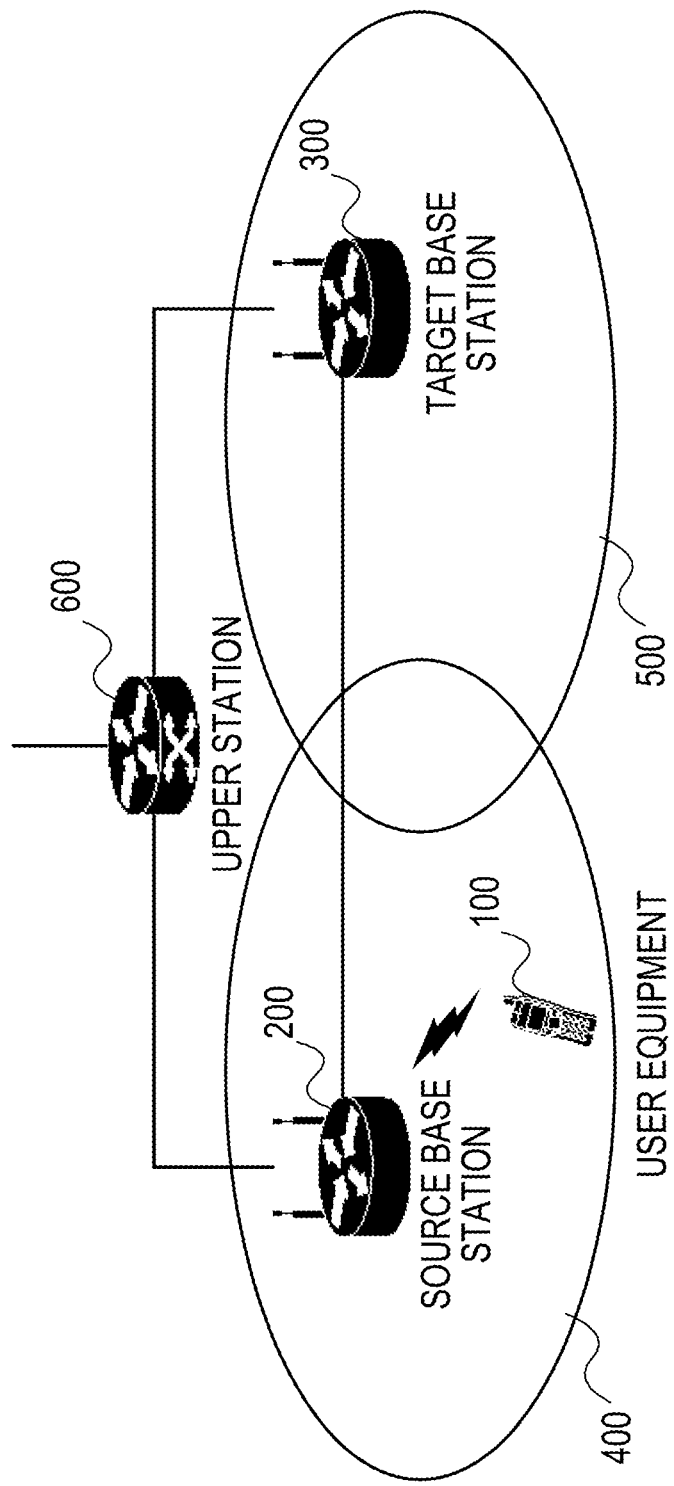
FIG. 1 depicts an example of a mobile communication system configuration.

FIG. 1 is a diagram illustrating an example of a mobile communication system configuration according to an embodiment of the present invention.

In FIG. 1, reference numeral 100 designates a user equipment, 200 and 300 designate base stations, 400 and 500 designate cells (communication areas) covered by the base station 200 and the base station 300, respectively, and 600 designates an upper station.

This embodiment is described below as an example of a case where the user equipment 100 is moving from the communication area of the base station 200, that communicated with the user equipment, to the communication area of the base station 300.

The base station 200 will be referred to as a source base station, and the base station 300 will be referred to as a target base station.

(2) PDCP

Figure 2:
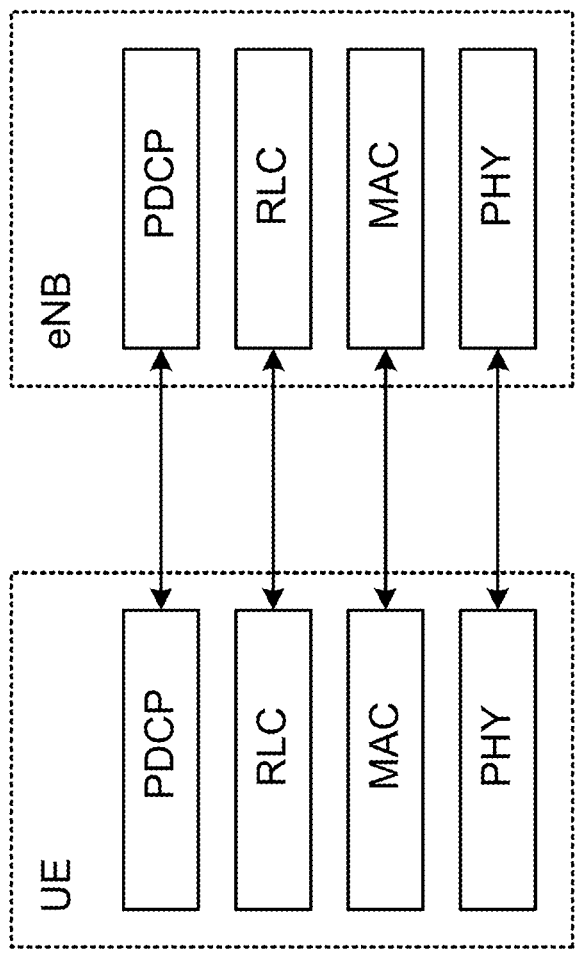
FIG. 2 depicts a user plane protocol stack between a base station and a user equipment.

FIG. 2 is a diagram illustrating a user plane protocol stack between the user equipment and the base station according to the 3GPP specification.

In FIG. 2, PHY designates a Physical Layer, MAC designates a Medium Access Control (MAC) Layer, RLC designates an Radio Link Control (RLC)) Layer, and PDCP designates a Packet Data Convergence Protocol (PDCP) Layer.

The MAC Layer and the Physical Layer perform radio transmission by applying modulation/demodulation techniques appropriate for the radio propagation condition to packet data received from the RLC Layer. The RLC Layer is a layer for controlling radio transmission. The RLC Layer performs disassembly/assembly appropriate for the radio transmission condition on the packet data received from the PDCP Layer and sequence control on the packet data received from the Physical Layer. The PDCP Layer performs processing including header compression and encryption on the data received from an upper layer.

(3) Handover

Figure 3:
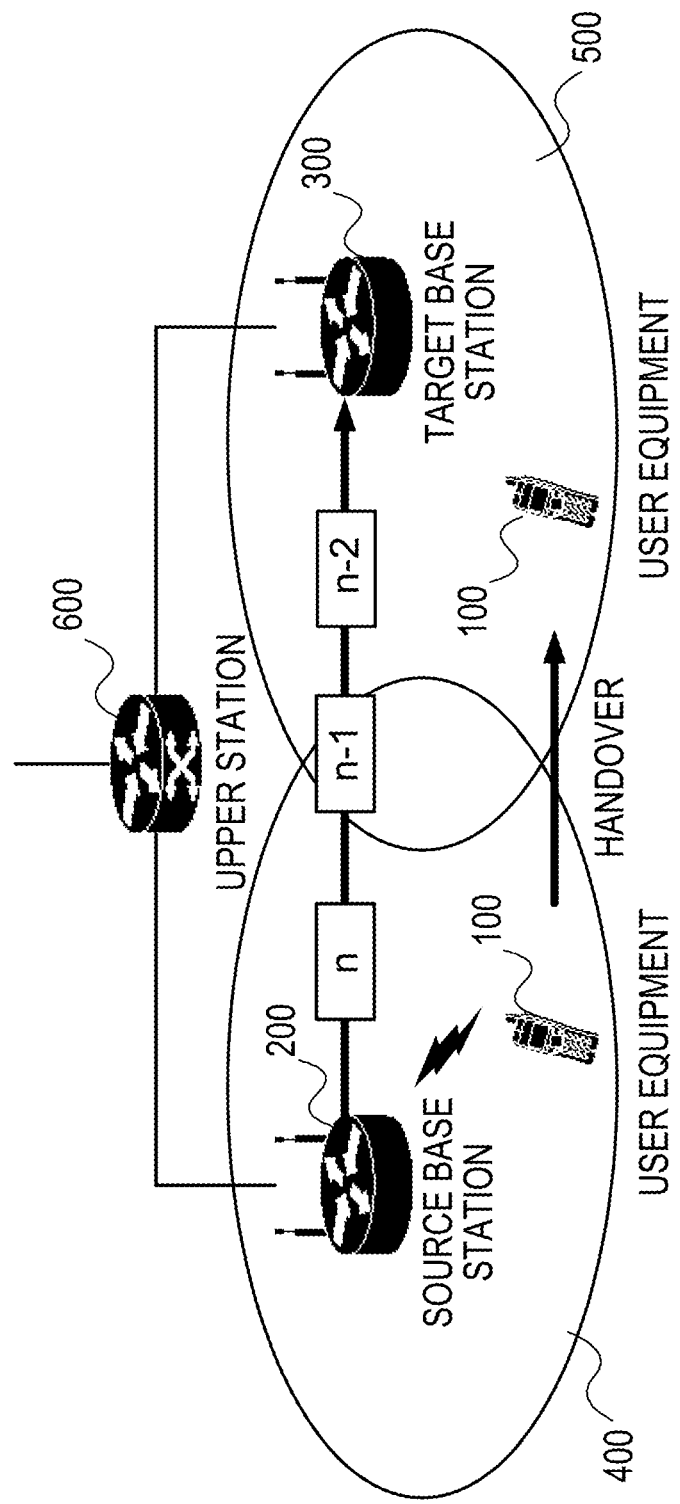
FIG. 3 depicts packet data transfer performed in accordance with a handover operation.

FIG. 3 is a diagram outlining packet data transfer performed in accordance with a handover operation when the user equipment is moving between the base stations.

In FIG. 3, the same components as those illustrated in FIG. 1 are designated by the same reference numerals.

While the user equipment 100 is moving from the communication area 400 to the communication area 500, the user equipment 100 performs handover to switch the base station to communicate with from the base station 200 to the base station 300.

In the handover, the packet data that has been received by the base station 200 before the handover is transferred from the base station 200 to the base station 300. If the base station 200 receives data destined to the user equipment 100 from the upper station before the transfer process ends, that received data may be directly transferred to the base station 300.

In FIG. 3, n, n−1, and n−2 are PDCP SDU Sequence Numbers (PDCP SDU SNs). The packet data is transferred by the unit of PDCP SDU. Although the figure illustrates a case where a wired link directly connects the base station 200 and the base station 300, the base stations may be logically linked over the upper station instead of directly connected by a wired link.

FIG. 7 is depicts an exemplary sequence of the handover illustrated in FIG. 3.

In FIG. 7, UE designates the user equipment which corresponds to the user equipment 100, BS1 designates the source base station which corresponds to the base station 200, BS2 designates the target base station which corresponds to the base station 300, and GW designates the upper station which corresponds to the upper station 600.

The user equipment 100 sends a Measurement Report signal that contains information on the measurement of the reception level of a signal received from the target base station 300 to the source base station 200 ("1. Measurement Control").

The source base station 200 determines whether or not to perform a handover to the target base station 300 whose signal reception level is the highest at the user equipment based on the information included in the received Measurement Report signal ("2. handover (HO) Target Determination").

The source base station 200 sends a Handover Request signal to the target base station 300 ("3. HO Request"). The source base station 200 also sends information on the user equipment 100, which may include, for example, the user equipment ID and Quality of Service (QoS) with the Handover Request signal. The target base station 300 performs a call accept control based on the received information (4. "Call Accept Control").

When the target base station 300 approves the communication with the user equipment 100, the target base station 300 sends a Handover Reply signal to the source base station 200 ("5. HO Reply").

The source base station 200 sends a Handover Instruction signal to the user equipment 100 ("6. HO Instruction") and sends information on the state of the PDCP SN to the target base station 300 ("7. SN State Transfer") and then starts to transfer packet data to the target base station 300.

When the user equipment 100 receives the Handover Instruction signal, the user equipment establishes synchronization with the target base station 300 by L1/L2 signaling ("8. L1/L2 signaling"). When the synchronization is established, the user equipment 100 sends a Handover Completion signal that indicates the completion of the handover to the target base station 300 ("9. HO Completion").

When the target base station 300 receives the Handover Completion signal from the user equipment 100, the target base station 300 sends the Handover Completion signal that indicates the completion of the handover to the upper station 600 ("10. HO Completion").

When the upper station 600 receives the Handover Completion signal, the upper station 600 switches the packet data transmission channel from the source base station 200 to the user equipment 100 to the channel from the target base station 300 to the user equipment 100 ("11. Channel Switch"). Then, the upper station 600 sends a Handover Completion Reply signal to the target base station 300 ("12. HO Completion Reply").

When the target base station 300 receives the Handover Completion Reply signal from the upper station 600, the target base station 300 sends a Resource Release signal that indicates the completion of the handover to the source base station 200 ("13. Resource Release").

When the source base station 200 receives the Resource Release signal, the radio resource between the source base station 200 and the user equipment 100 is released ("14. Resource Release").

FIG. 4 is an exemplary flowchart illustrating operations of the units in the user equipment upon handover.

At S1, the user equipment sends the measurement of the signal reception level to the source base station.

At S2, the user equipment receives the Handover Instruction signal sent from the source base station.

After receiving the Handover Instruction signal at S2, the user equipment establishes synchronization with the target base station by L1/L2 signaling at S3.

After confirming that synchronization with the target base station is established at S3, the user equipment reports the completion of synchronization, that is, completion of the handover, to the target base station at S4.

FIG. 5 is an exemplary flowchart illustrating operations of the units in the source base station upon handover.

At S5, the source base station receives Measurement Report signal, information on the measurement of the reception level of the signal that is received by the user equipment from the base station.

At S6, the source base station determines whether to perform a handover to the target base station based on the information included in the Measurement Report signal received at S5. If the source base station determines to perform the handover, the operation proceeds to S7. If the source base station determines not to perform the handover, the operation returns to S5.

After determining to perform the handover at S6, the source base station sends the Handover Request signal to the target base station at S7.

At S8, the source base station receives the Handover Reply signal that is sent from the target base station.

After receiving the Handover Reply signal at S8, the source base station sends the Handover Instruction signal to the user equipment at S9.

At S10, the source base station sends information on the state of the PDCP SN to the target base station. The source base station transfers the SN that is to be given next by the target base station or reports the SN of the PDCP SDU that has not been sent from the source base station, for example.

At S11, the source base station receives the Resource Release signal from the target base station, and releases the communication connection with the user equipment.

FIG. 6 is an exemplary flowchart illustrating operations of the units in the target base station upon handover.

At S12, the target base station receives the Handover Request signal sent from the source base station.

At S13, the target base station determines whether to approve the call acceptance of the communication with the user equipment. If the target base station approves the call acceptance, the operation proceeds to S14. If the target base station does not approve the call acceptance, the operation jumps to S19.

At S14, the target base station sends the Handover Reply signal to the source base station.

At S15, the target base station establishes synchronization with the user equipment by L1/L2 signaling.

After establishing synchronization with the user equipment at S15, the target base station receives the Handover Completion signal sent from the user equipment at S16.

After receiving the Handover Completion signal at S16, the target base station sends the Handover Completion signal that indicates the completion of the handover to the upper station at S17.

At S18, the target base station receives the Handover Completion Reply signal sent from the upper station.

After receiving the Handover Completion Reply signal at S18, the target base station sends the Resource Release signal to the source base station at S19.

(4) Packet Data Drop (a) PDCP Data Drop

One of the ways to speed up the transfer-rate of mobile communication is to reduce the transmission delay. This is achieved by means of a PDCP SDU Drop mechanism implemented at the PDCP layer of each of the user equipment and the base station.

At the PDCP layer, data sent out from an upper layer is made into packet data as a PDCP SDU.

The packet data is dropped by the unit of PDCP SDU in a timer-based dropping method or an AQM-based dropping method.

(b) Timer-Based Packet Data Dropping Method

FIGS. 8A & 8B are a diagrams illustrating an example of outlined operations of a timer-based packet data dropping method.

In FIGS. 8A & 8B, reference numeral 700 designates a PDCP SDU buffer, a memory in the radio communication device, the user equipment or the base station. In the timer-based PDCP SDU dropping method, a residing time for each PDCP SDU is counted down, and the PDCP SDU buffer drops the PDCP SDU whose timer is expired.

The digits 1 to 10 stored in the PDCP SDU buffer 700 indicates PDCP SDUs. Hereinafter, the PDCP SDUs are referred to as packet data. 1 to 3 are packet data that have been subjected to processing including header compression and data encryption. 1 to 3 have the SNs given and forwarded to lower layers. 4 to 10 are packet data that do not have SNs yet. Hereinafter, SNs in that state will be enclosed by square brackets [ ] in the drawings.

Packet data yet to be given the SN may be undergoing processing including header encryption or data encryption. The packet data yet to be given the SN may be data received from an upper station and temporarily stored without the SN given, or data just received from an upper station. Although those kinds of packet data yet to be given the SN may be kept in a memory other than the PDCP SDU buffer, it is assumed that the packet data is unconditionally stored in the PDCP SDU buffer in the description below.

"Drop Time" is the upper limit, which is given a value, set to a Drop Timer (hereinafter, referred to as drop timer) that covers the entire PDCP layer. Drop Time indicates a time left for the PDCP SDU buffer to drop the packet data. In this embodiment, the upper limit of the drop timer is 100.

The value may be individually set to the drop timer according to the application or radio bearer. In the case of a Guaranteed Bit Rate (GBR) application, the drop timer values may be individually set to services such as Realtime, Gaming, VoIMS, Streaming and the like. In the case of a non GBR application, the drop timer values may also be individually set to services such as IMS Signaling, Interactive Gaming, TCP Interactive, Preferred TCP bulk data, Best Effort TCP Data and so on. LTE labels the packet data available for those applications a QoS Class Identifier (QCI) so that the base station determines the application type based on the QCI.

The upper limit of the drop timer is variable. The value is reported to the target base station at "3. HO Request", "7. SN State Transfer", and "9. HO Completion" in FIG. 7, for example.

In the case where the upper limit of the drop timer is reported from the source base station at "3. HO Request", the target base station can determine whether to accept the request by taking into account the drop timer value.

In the case where the upper limit of the drop timer is reported from the source base station at "7. SN State Transfer", the target base station receives the upper limit after accepting the call control. That can reduce signaling overhead.

In the case where the upper limit of the drop timer is reported to the target base station at "9. HO Completion", the upper limit is reported by signaling from the upper station. In this case, unlike the abovementioned two cases, the upper station performs signaling only to the target base station if the source base station and the target base station are not directly linked. That can reduce signaling overhead.

The "drop timer" indicates the drop timer value for the packet data that is stored in the PDCP SDU buffer 700, i.e., a time elapsed since the drop timer started.

FIG. 8A and FIG. 8B are diagrams illustrating a case in which the packet data 1 to 8 is stored in the PDCP SDU buffer 700. In the PDCP SDU buffer 700 (FIG. 8A), the drop timers for the packet data 1 to 8 indicate 80, 70, . . . , 20, and 10, respectively. That is, the drop timers for all the packet data have not exceeded the upper limit 100. In other words, as the drop timers have not expired, the packet data is still stored in the PDCP SDU buffer 700.

In the PDCP SDU buffer 700 after the time 30 elapsed (FIG. 8B), the drop timers for the packet data 1 to 10 indicate 110, 100, . . . , 50, and 40, respectively. The drop timer values for the newly transferred packet data 9 and 10 indicate 0.

The drop timers for the packet data 1 and 2 indicate 110 and 100, reaching and exceeding the upper limit thereof, respectively. As the drop timer has expired, the packet data is dropped.

As mentioned above, this embodiment is adapted to set the upper limit for a time the PDCP SDU buffer 700 is allowed to store the packet data and drop the packet data that has exceeded the upper limit. That enables the data transmission to meet the minimum guaranteed delay for the application even under a poor radio condition.

(c) AQM-Based Packet Data Dropping Method

Active Queue Management (AQM) is a buffer managing technique used in a router, or a drop mechanism accompanying a buffer, to enable efficient congestion control of Transport Control Protocol (TCP) to provide reliable communication mainly on an end-to-end basis. The AQM technique deliberately drops a TCP segment before a buffer overflowing event forces the TCP segment to be dropped at a node on a network. In this manner, the AQM technique prevents packet data from being sequentially dropped to avoid TCP time out. That means the AQM technique can adjust the throughput of TCP before the network enters a serial congestion state, i.e., while the network is in a light congestion state. Accordingly, the AQM technique can provide congestion control while efficiently using the network resource and maintaining high TCP throughput.

FIG. 9A, FIG. 9B and FIG. 9C are diagrams outlining examples of a packet data drop operation method in a case where the timer-based packet data drop and the AQM-based packet data drop are used together.

In FIG. 9A, FIG. 9B and FIG. 9C, reference numeral 701 designates a packet drop control unit that controls over packet drop. The same components as those illustrated in FIG. 8A or FIG. 8B are designated by the same reference numerals.

In the PDCP SDU buffer 700 in FIG. 9A, the drop timers for the packet data 1 to 8 indicate 80, 70, . . . , 20, and 10, respectively. That is, as the drop timers (upper limit 100) for all the packet data have not expired, the packet data is still stored in the PDCP SDU buffer 700.

When the AQM-based packet data drop starts, as illustrated in FIG. 9B, the packet drop control unit 701 controls selection and drop of packet data. The packet data to drop may be selected at random.

When the time 30 elapsed for example, as illustrated in FIG. 9C, the packet data whose drop timer has expired is dropped in the same manner as that described in FIG. 8B. FIG. 9C indicates that the packet data 1 is being dropped.

Figure 10:
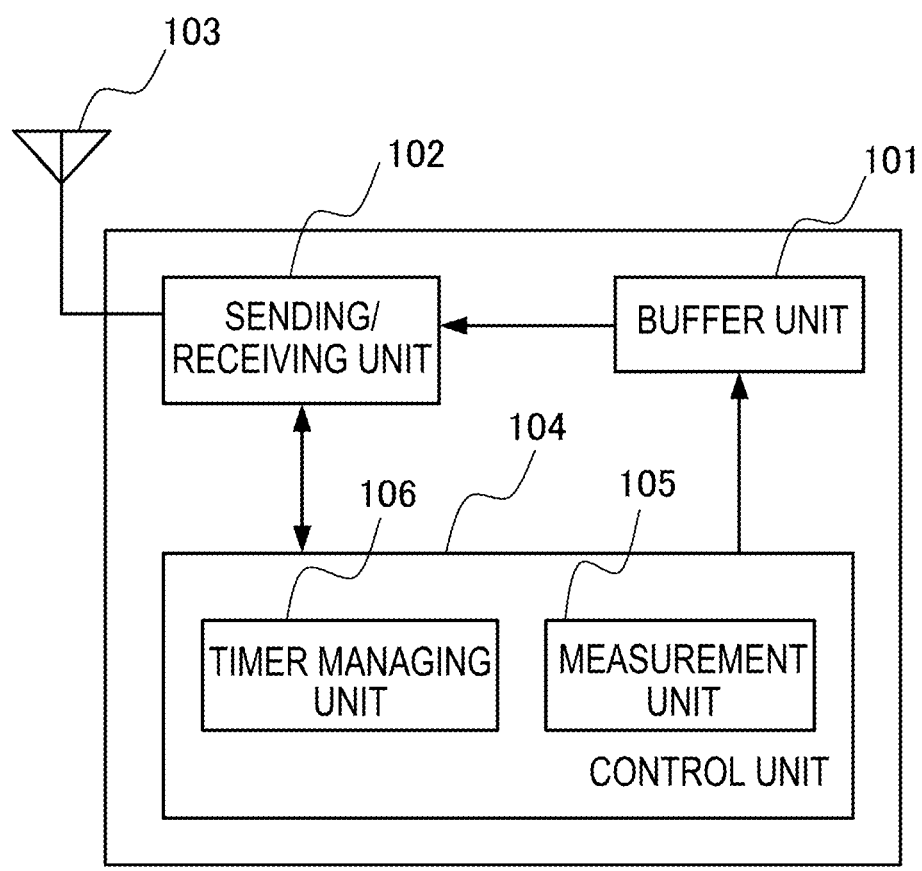
FIG. 10 depicts an example of the configuration of the units in the user equipment (UL)

(5) Configurations and Operations of the Units used for the Embodiment (a) User Equipment FIG. 10 is a diagram illustrating an example of the configuration of the units in the user equipment and the units' configuration for Uplink (UL) communication.

In FIG. 10, reference numeral 101 designates a buffer unit, 102 designates a sending/receiving unit, 103 designates an antenna, 104 designates a control unit, 105 designates a measurement unit, and 106 designates a timer managing unit.

The buffer unit 101 represents a buffer for the MAC layer, a buffer for the RLC layer, and a buffer for the PDCP layer as a single buffer; though, the buffers may be arranged in a physically separated design.

In the buffer for the PDCP layer, data received from an upper layer is made into packet data as a PDCP SDU, an SN is given to the packet data, and header compression and encryption are performed on the packet data.

In the buffer for the RLC layer, disassembly/assembly is performed on the data forwarded from the PDCP layer.

In the buffer for the MAC layer, modulation/demodulation techniques appropriate for the radio propagation condition are performed.

The sending/receiving unit 102 performs error correction and modulation such as encoding on the data forwarded from the buffer, and sends out the processed data to the antenna 103.

Also, the sending/receiving unit 102 receives various types of control information for performing UL data transmission. Here, the control information includes but is not limited to available radio resources information, such as frequency information, time information, and so on, and transmission power information.

The control unit 104 performs various types of control in the user equipment such as scheduling request for UL data, reporting the base station on the amount of data arrived at buffers, reporting on Channel Quality Information (CQI), sending the Sounding Reference Signal (RS), and designation of an intermittent transmission mode.

Also, the control unit 104 controls the AQM-based packet data drop.

The measurement unit 105 measures radio qualities from the base stations in preparation for the handover. The measurement unit 105 may also measure the signal intensity and the quality of a pilot signal, and the signal intensity for a carrier frequency.

The timer managing unit 106 manages the drop timer for the packet data.

As various timers are used in lower layers such as the RLC layer, the timer managing unit 106 may also control the timers. The timer managing unit 106 manages the upper limit time for resending packet data in such a case where the packet data forwarded from the PDCP layer is disassembled/assembled as required at the RLC layer and treated as the packet data in the RLC layer.

The measurement unit 105 or the timer managing unit 106 may be included in or provided separately from the control unit 104.

Figure 11:
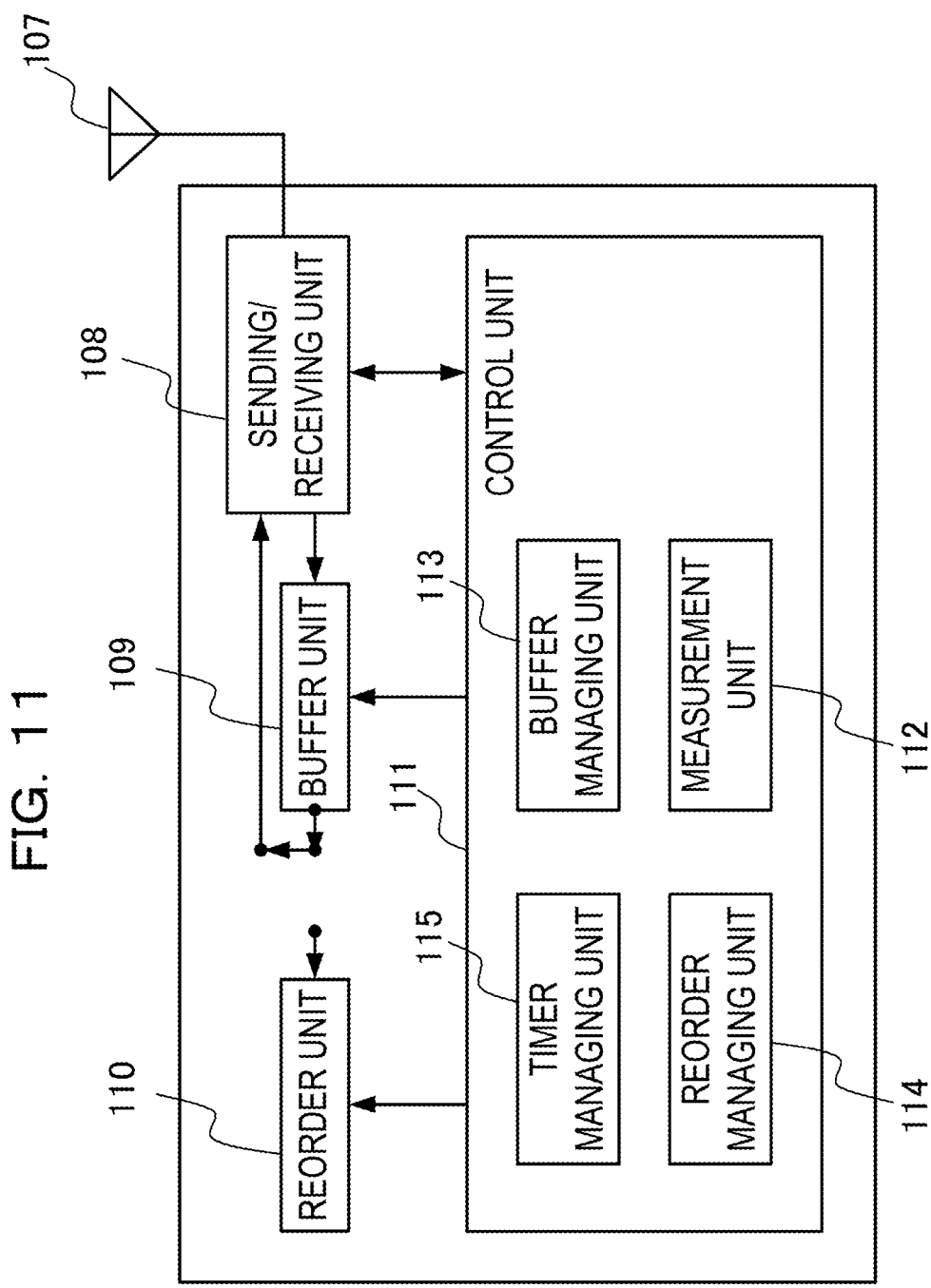
FIG. 11 depicts an example of the configuration of the units in the user equipment (DL)

FIG. 11 is a diagram illustrating an example of the configuration of the user equipment units and the configuration of units for Downlink (DL) communication.

In FIG. 11, reference numeral 107 designates the antenna, 108 designates the sending/receiving unit, 109 designates the buffer unit, 110 designates a reorder unit, 111 designates the control unit, or the control unit, 112 designates the measurement unit, 113 designates a buffer managing unit, 114 designates a reorder managing unit, and 115 designates the timer managing unit.

The sending/receiving unit 108 performs demodulation on the data that is sent from the base station and received by the antenna 107, and sends the demodulated data to the buffer unit 109. Also, the sending/receiving unit 108 receives various types of control information for performing DL data transmission. Here, the control information includes, for example, radio resource information used for the data transmission.

The buffer unit 109 temporarily stores the data sent from the sending/receiving unit 108 in order to forward the data to an upper layer.

In this embodiment, a buffer for the MAC layer, a buffer for the RLC layer, and a buffer for the PDCP layer are represented as a single buffer; though, the buffers may be arranged in a physically separated design.

At the MAC layer, bit error detection is performed on the data forwarded from the sending/receiving unit. If a bit error is detected, NACK is returned to the base station and resending is performed. If no bit error is detected, ACK is returned to the base station and the data is forwarded to the RLC layer.

At the RLC layer, whether the received data are in the correct order or not is determined. If the data are not in the correct order, data yet to be received is waited for. If the data is in the correct order, the data is forwarded to the PDCP layer.

At the PDCP layer, decryption and header expansion are performed on the received data and the PDCP SDU is reconstructed.

The reorder unit 110 sorts the data, or packet data, sent from the buffer unit 109 in the order they are sent, or in the order of PDCP SNs, and forwards the data to an upper layer. If a PDCP SN is lost, that is if there are packet data lost in a transmission failure, a PDCP SN yet to be received is waited for and forwarded.

The control unit 111 performs various types of control in the user equipment such as scheduling request for the UL data, reporting the base station on the amount of data arrived at buffers, reporting on CQI, sending the Sounding RS, and designation of the intermittent transmission mode.

Also, the control unit 111 controls the AQM-based packet data drop.

The measurement unit 112 measures radio qualities for signals received from the base stations in preparation for the handover. The measurement unit 112 may also measure the signal intensity and the quality of a pilot signal, and the signal intensity for a carrier frequency.

The buffer managing unit 113 controls the data stored in the buffer unit 109.

The buffer managing unit 113 performs bit error detection/resending control on the data at the MAC layer, order control/resending control on the data at the RLC layer, and decryption/header expansion control on the data at the PDCP layer, for example.

The buffer managing unit 113 forwards the data of a reconstructed PDCP SDU to the reorder unit 110.

When a bit error is detected by the buffer managing unit 113, data is to be resent. For that purpose, Hybrid Automatic Repeat Request (HARQ) is applied at the MAC layer. If the data block for which the bit error is detected at the MAC layer cannot be recovered, all of the data blocks including the erroneous data block will be resent, or forwarded to the MAC layer again, until a given time clocked by the timer at the RLC layer.

HARQ is an ARQ technique using a combination of Automatic Repeat Request and Forward Error Correction (FEC).

Specifically, error correction encoding is performed on the data blocks of the information bit by adding a parity bit for error detection to the data block at the sending side, and all or a part of the data blocks are sent. If resending is required, all or a part of the encoded bit corresponding to the current data block is resent. At receiving side, data is composed of each bit corresponding to each existing data block among the resent data blocks. Then, by using the composed blocks, the error correction and the error detection are performed again. At the receiving side, a decoding trial performed by replying ACK/NACK and resending data to the sending side is repeated in the described manner until no erroneous data block is left within the number of times of a given upper limit.

The reorder managing unit 114 manages reordering of the packet data. The reorder managing unit 114 determines packet data lost in a transfer failure, and also detects packet data whose drop timer has expired. Then, the reorder managing unit 114 drops that packet data.

The timer managing unit 115 manages the drop timer for the packet data and reordering timer which is the timer for reordering the packet data.

The value set to the reordering timer at the timer managing unit 115 may be the reordering timer value that is decided at the initialization of various parameters for the PDCP. The value selected by the base station from a set of given reordering timer values may also be used. The base station may select the value by taking account of an average reception delay due to the DL radio condition, a delay time for received packet data, the QCI that accompanies the application or radio bearer.

The measurement unit 112, the buffer managing unit 113, the reorder managing unit 114, and the timer managing unit 115 may be included in or provided separately from the control unit 111.

The user equipment includes all or a part of the units illustrated in FIG. 10 and FIG. 11; though, the user equipment may have the antenna 103 and the antenna 107, the control unit 104 and the control unit 111, the measurement unit 105 and the measurement unit 112, and the timer managing unit 106 and the timer managing unit 115 in common.

(b) Base Station

Figure 12:
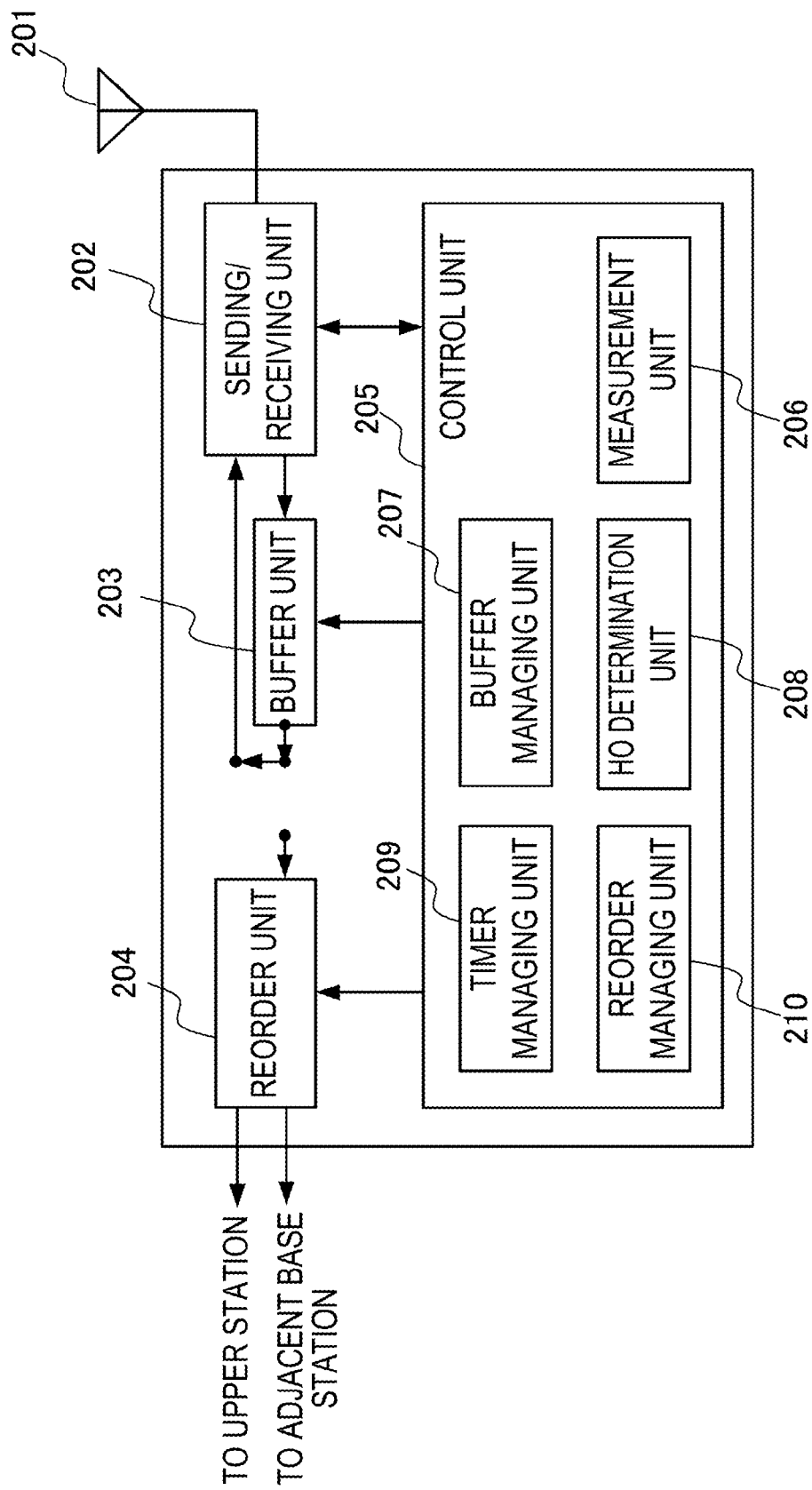
FIG. 12 depicts an example of the configuration of the units in the base station (UL)

FIG. 12 is a diagram illustrating an example of the configuration of the base station units and operations of the units for the UL communication.

In FIG. 12, reference numeral 201 designates the antenna, 202 designates the sending/receiving unit, 203 designates the buffer unit, 204 designates the reorder unit, 205 designates the control unit, 206 designates the measurement unit, 207 designates the buffer managing unit, 208 designates an handover determination unit, and 209 designates the timer managing unit.

The sending/receiving unit 202 performs demodulation on the data that is sent from the user equipment and received by the antenna 201, and sends the demodulated data to the buffer unit 203. Also, the sending/receiving unit 202 receives various types of control information for performing the UL data transmission. Here, the control information includes Sounding RS, for example.

The buffer unit 203 temporarily stores the packet data sent from the sending/receiving unit 202 to forward the data to an upper layer.

The reorder unit 204 sorts the data, or packet data, sent from the buffer unit 203 in the order they are sent, or in the order of PDCP SNs, and forwards the data to an upper layer. In LTE, the reorder unit 204 transmits data received in the correct order to an upper layer. If the reorder unit 204 detects data yet to be received, the reorder unit 204 transfers data thereafter to the target base station.

The control unit 205 performs various types of control in the base station such as scheduling approval for the UL data, resource allocation according to the amount of data, the Quality of Service (QoS) and the like, and designation of the intermittent receiving mode.

The measurement unit 206 measures the DL radio quality based on the CQI reported from the user equipment and the UL radio quality based on the Sounding RS.

Also, the control unit 205 controls the AQM-based packet data drop.

The buffer managing unit 207 controls the data stored in the buffer unit 203.

The buffer managing unit 207 performs bit error detection/resending control on the data at the MAC layer, order control/resending control on the data at the RLC layer, and decryption/header expansion control on the data at the PDCP layer, for example. The buffer managing unit 207 forwards the data of a reconstructed PDCP SDU to the reorder unit 204.

The HO determination unit 208 determines whether to perform the handover based on the measurement of the radio signal quality from the measurement unit 206.

The timer managing unit 209 manages the drop timer for the packet data and the reordering timer for reordering the packet data.

The value set to the reordering timer at the timer managing unit 209 is set in the same manner as that taken for the reordering timer at the user equipment.

The reorder managing unit 210 manages reordering of the packet data. The reorder managing unit 210 determines packet data lost in a transfer failure, and also detects packet data whose drop timer has expired. Then, the reorder managing unit 210 drops that packet data.

The measurement unit 206, the buffer unit 207, the HO determination unit 208, the timer managing unit 209, and the reorder managing unit 210 may be included in or provided separately from the control unit 205.

FIG. 13 is a diagram illustrating an example of the configuration of the units in the base station and operations of the units for the DL communication.

In FIG. 13, reference numeral 211 designates the antenna, 212 designates the buffer unit, 213 designates a scheduler unit, 214 designates the sending/receiving unit, 215 designates the control unit, 216 designates a delay measuring unit, 217 designates the timer managing unit, 218 designates a scheduler managing unit, 219 designates the measurement unit, and 220 designates the HO determination unit.

The buffer unit 212 represents a buffer for the MAC layer, a buffer for the RLC layer, and a buffer for the PDCP layer as a single buffer in this embodiment; though, the buffers may be arranged in a physically separated design.

In the buffer for the PDCP layer, data received from an upper layer is made into packet data as a PDCP SDU, an SN is given to the packet data, and header compression and encryption are performed on the packet data.

In the buffer for the RLC layer, disassembly/assembly is performed on the data forwarded from the PDCP layer. In the buffer for the MAC layer, modulation/demodulation techniques appropriate for the radio propagation condition are performed on the data forwarded from the RLC layer.

When the handover is carried out, the data forwarded to the RLC layer and the MAC layer can be transmitted until the radio link is disconnected. The data forwarded after the disconnection is dropped.

The source base station transfers data at the PDCP layer to the target base station by the unit of PDCP SDU. On the other hand, the upper station can transfer the packet data to the target base station without giving the PDCP SN.

If pieces of data destined to the user equipment are stored in the buffer unit 212, the scheduler unit 213 selects a piece of data to send from the stored pieces of data and sends out the selected piece of data to the sending/receiving unit 214.

The sending/receiving unit 214 performs the error correction and modulation such as encoding of the data sent from the scheduler unit 213, and sends out the processed data to the antenna 211. Also, the sending/receiving unit 214 receives various types of control information for performing the DL data transmission. Here, the control information includes radio resource information, for example.

The control unit 215 performs various types of control in the base station such as scheduling approval for the UL data, resource allocation according to the amount of data, the QoS and so on, designation of the intermittent receiving mode, and designation of HO. The control unit 215 also controls the AQM-based packet data drop.

The delay measuring unit 216 measures/estimates a delay time, for instance, that occur upon transmission of the data to the user equipment, the upper station, another base station and so on.

The timer managing unit 217 manages the drop timer.

As various timers are used in lower layers such as the RLC layer, the timer managing unit 217 may also control the timers. The timer managing unit 217 manages the limit for resending packet data in such a case where the packet data forwarded from the PDCP layer is disassembled/assembled as required at the RLC layer and treated as the packet data in the RLC layer.

The scheduler managing unit 218 manages the scheduler unit 213 by sending out a signal that indicates the user equipment to be authorized to transmit to the scheduler unit 213 based on the control information from the user equipment received by the sending/receiving unit 214.

The measurement unit 219 measures the DL radio quality based on the CQI reported from the user equipment and the UL radio quality based on the Sounding RS.

The HO determination unit 220 determines whether to perform the handover based on the measurement of the radio quality from the measurement unit 219.

The base station includes all or a part of the units illustrated in FIG. 12 and FIG. 13; though, the base station may have the antenna 201 and the antenna 211, the control unit 205 and the control unit 215, the measurement unit 206 and the measurement unit 219, the HO determination unit 208 and the HO determination unit 220, and the timer managing unit 209 and the timer managing unit 217 in common.

(6) First Embodiment (a) Overview

According to the first embodiment, the PDCP SDU, hereinafter, referred to as packet data, stored in a PDCP SDU buffer, hereinafter, referred to as buffer unit, is dropped by the same operations as those shown in FIG. 9B in the radio communication device, the user equipment or the base station, but the packet data forwarded to a lower layer is excluded from the packet data drop candidates.

Figure 14A:
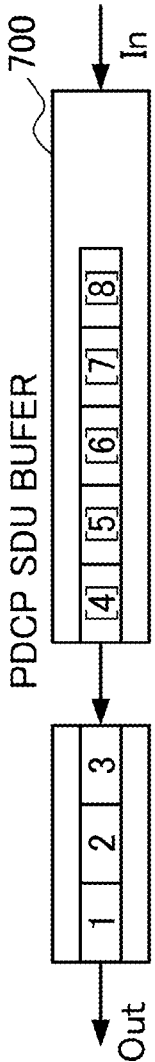
FIG. 14A depicts outlining operations of a first described embodiment.
Figure 14B:
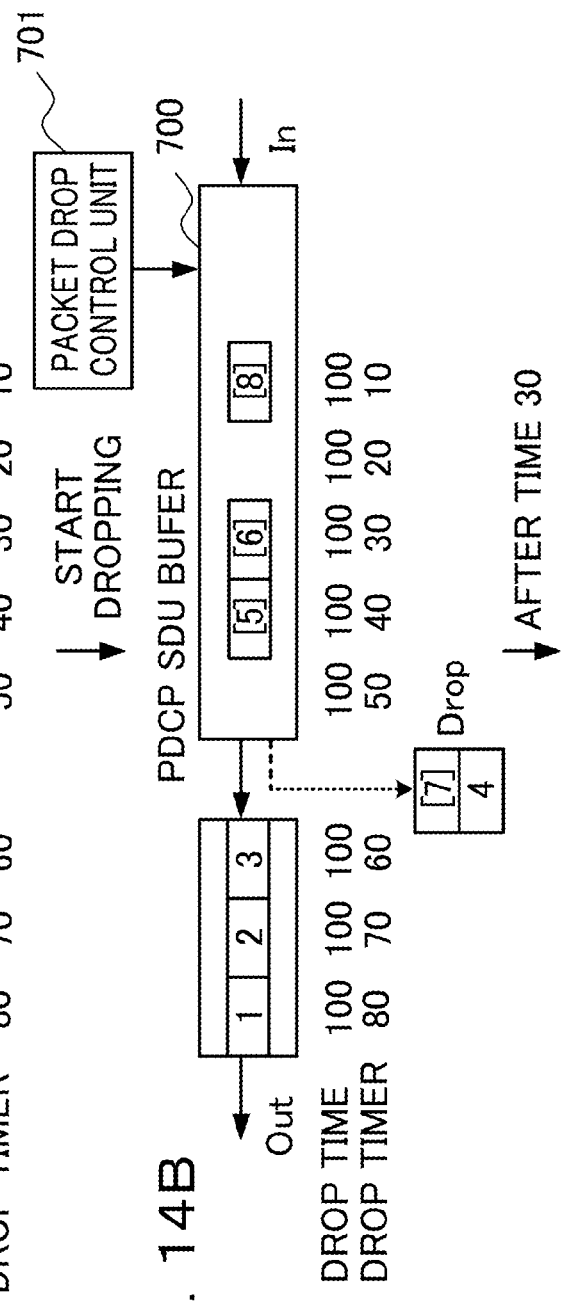
FIG. 14B depicts outlining operations of the first embodiment (at the beginning of drop)
Figure 14C:
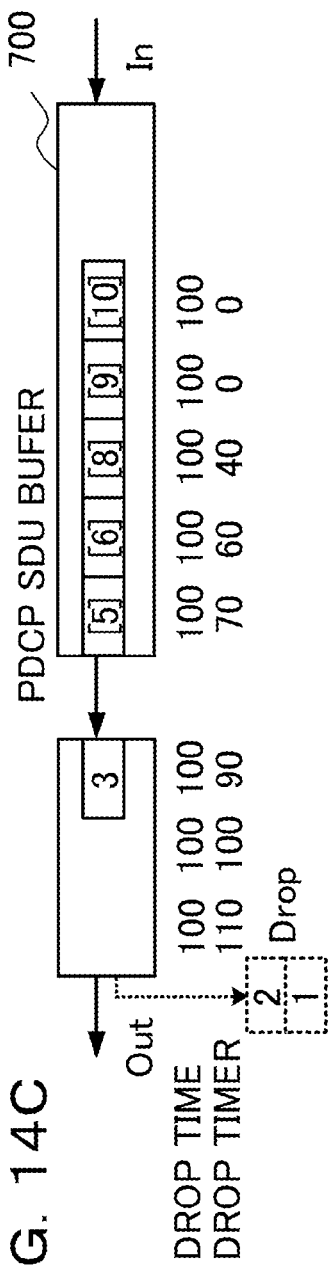
FIG. 14C depicts outlining operations of the first embodiment (time 30 has elapsed)

FIG. 14A, FIG. 14B and FIG. 14C are diagrams outlining operations of a first embodiment according to the present invention.

In FIG. 14A, FIG. 14B and FIG. 14C, the same components as those illustrated in FIG. 9A and FIG. 9B are designated by the same reference numerals.

Among the packet data that are stored in the buffer unit, the packet data 1 to 3 that have been forwarded to a lower layer are excluded from the packet data drop candidates before the drop timer is expired.

That is, when the AQM-based packet data drop is applied to the packet data whose drop timers have not expired, the packet data to be dropped is selected from the packet data 4 to 8.

At the stage illustrated in FIG. 14B in which all the packet data has the drop timers unexpired, the packet data 4 and 7 is dropped by the AQM-based packet data dropping method. At the later stage illustrated in FIG. 14C, the packet data 1 and 2 whose drop timers have expired are dropped.

(b) Processing flow

FIG. 15 is a flowchart of packet data processing at the user equipment for UL or packet data processing at the base station for DL according to the first embodiment, i.e., where the user equipment or the base station operates as a transmitter.

At S20, the buffer unit in the user equipment or the base station receives data sent from an upper layer.

At S21, the user equipment or the base station makes the data received by the buffer unit at S20 into packet data as a PDCP SDU (PDCP SDU construction).

At S22, the user equipment or the base station starts the drop timer for each packet data constructed at S21.

At S23, the user equipment or the base station determines whether the drop timer that is started at S22 have expired for each packet data. If the drop timer has expired, the operation proceeds to S24. If the drop timer has not expired, the operation proceeds to S25.

If the drop timer has expired at S23, the packet data that has been forwarded to a lower layer is dropped at S24.

If the drop timer has not expired at S23, the user equipment or the base station selects the packet data that has not been forwarded to a lower layer from the packet data that is stored in the buffer unit at S25.

At S26, the user equipment or the base station determines whether the AQM-based packet data drop is to be applied to the packet data selected at S25. If the AQM-based packet data drop is to be applied, the operation proceeds to S27. Otherwise, the operation jumps to S29.

If it is determined that the AQM-based packet data drop is to be applied at S26, the user equipment or the base station selects the packet data to drop at S27.

At S28, the user equipment or the base station drops the packet data selected at S27.

At S29, the buffer unit in the user equipment or the base station forwards the packet data to a lower layer.

FIG. 16 is a flowchart of packet data processing at the user equipment for DL or packet data processing at the base station for UL according to the first embodiment, i.e., where the user equipment or the base station operates as a receiver.

At S30, the buffer unit at the MAC layer of the user equipment or the base station receives the radio transmitted data.

At S31, the user equipment or the base station performs bit error detection on the received data. If an error is detected, the operation proceeds to S32. Otherwise, the operation proceeds to S34.

At S32, the user equipment or the base station waits for reception of the data yet to be received at the RLC layer with a timer counting down. If the timer has not expired, the operation returns to S30. Otherwise, the operation proceeds to S33.

As the resending timer at the RLC layer has expired, the user equipment or the base station drops the data concerned at S32.

At S34, the user equipment or the base station reconstructs the PDCP SDU with the data from which no error has been detected.

At S35, the user equipment or the base station transmits the PDCP SDUs to the upper station in the order they were received. The user equipment or the base station may perform reordering here and transmit the PDCP SDUs to the upper station in the order of SNs.

(7) Second Embodiment (a) Overview

In the second embodiment, an example of packet drop operations in the case where a part of data, or packet data, is not successfully sent in the UL communication from the user equipment to the source base station due to a radio error before the handover is described.

FIG. 17A, FIG. 17B, and FIG. 18A, FIG. 18B are diagrams outlining operations of the second embodiment before the handover and after the handover, respectively.

In FIG. 18A, reference numeral 702 designates the packet drop control unit that is assumed to be included in the control unit 104 illustrated in FIG. 10.

FIG. 17A and FIG. 17B illustrate a case before the handover where, among the packet data stored in the buffer unit 101 in the user equipment, the packet data 1 and the packet data 3 have been sent from the user equipment to the source base station but the packet data 2 has not sent until the radio link is switched due to a bit error. In the buffer unit 203a in the source base station, the packet data 1 and the packet data 3 are stored.

Upon the handover, as the data up to the packet data 1 has been received in the order of SNs, the source base station transmits the data to the upper station. As the packet data 2 has not been received yet, the packet data 3 is transferred to the target base station.

FIG. 18A and FIG. 18B illustrate a case after the handover, where the user equipment sends the packet data to the target base station. Here, the user equipment sends or resends the packet data in the order of SNs starting from the packet data 2 that the user equipment failed to send before the handover.

In this embodiment, once the handover is performed, the drop timer values are reset for the packet data that has been forwarded to a lower layer and needs to be resent to the target base station, among the packet data stored in the buffer unit 101 in the user equipment. Specifically, the user equipment controls to make the drop timer values 0 for the packet data 2 and the packet data 3.

As the reordering timer values are appropriately set at the PDCP layer of the target base station, the user equipment can determine that the PDCP SDU that has not been received yet when the timer expired is lost even if the user equipment has reset the drop timer values. Accordingly, the user equipment need not wait for the arrival of the lost PDCP SDU. The user equipment can forward the PDCP SDUs thereafter to the upper station in order. Thus, the application quality is not affected in this case.

If the packet data 2 and the packet data 3 have been forwarded to a lower layer, the user equipment can exclude the packet data 2 and the packet data 3 from the AQM-based packet data drop candidates. Otherwise, the user equipment can include them in the packet data drop candidates. The user equipment can also exclude only the packet data 2 that underwent a transmission error from the AQM-based packet data drop candidates.

The target base station stores the packet data received from the user equipment or via the source base station in the buffer unit 203b, and performs reordering to sort the already received packet data and newly received packet data in the order of SNs.

(b) Processing Flow

FIG. 19 is a flowchart of packet data processing in the UL communication at the user equipment.

At S36, the buffer unit in the user equipment receives data sent from an upper layer.

At S37, the user equipment makes the data received by the buffer unit at S36 into packet data as a PDCP SDU (PDCP SDU construction).

At S38, the user equipment starts the drop timer for each packet data constructed at S37.

At S39, if the user equipment receives the Handover (HO) Instruction signal sent from the source base station, the operation proceeds to S40. Otherwise, the operation jumps to S41.

If the user equipment receives the HO Instruction signal at S39, the user equipment resets the drop timers that is started at S38 and freshly starts the drop timers at S40.

At S41, the user equipment determines whether the drop timer that is started at S38 or S40 has expired for each packet data. If the drop timer has expired, the operation proceeds to S42. Otherwise, the operation proceeds to S43.

If the drop timer has expired at S41, the packet data that has been forwarded to a lower layer is dropped at S42.

If the drop timer has not expired at S41, the user equipment selects the packet data that has not been forwarded to a lower layer from the packet data that is stored in the buffer unit at S43.

At S44, the user equipment determines whether the AQM-based packet data drop is to be applied to the packet data selected at S43. If the AQM-based packet data drop is to be applied, the operation proceeds to S45. Otherwise, the operation jumps to S47.

If it is determined that the AQM-based packet data drop is to be applied at S44, the user equipment selects the packet data to drop at S45.

At S46, the packet data selected at S45 is dropped.

At S47, the buffer unit in the user equipment forwards the packet data to a lower layer.

Figure 20:
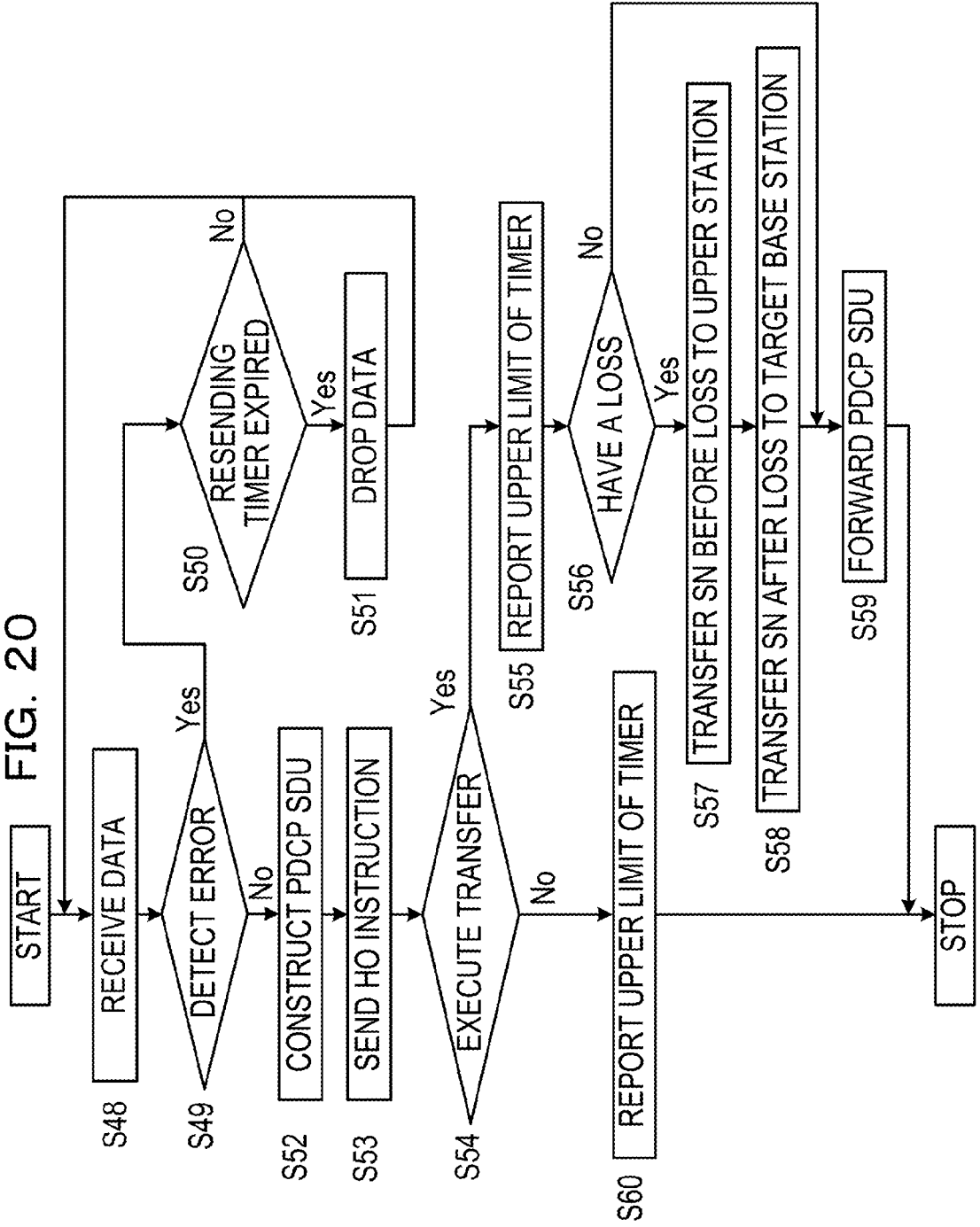
FIG. 20 depicts a flowchart of packet data processing at the source base station (UL) according to the second embodiment.

FIG. 20 is a flowchart of packet data processing in the UL communication at the source base station.

At S48, the buffer unit at the MAC layer of the source base station receives the radio transmitted data.

At S49, the source base station performs error detection on the data received at S48. If an error is detected, the operation proceeds to S50. Otherwise, the operation proceeds to S52.

At S50, the source base station waits for reception of the data yet to be received at the RLC layer with a timer counting down. If the timer has expired, the operation proceeds to S51. Otherwise, the operation returns to S48.

At S51, the source base station drops the data whose resending timer has expired at S50.

At S52, the source base station makes the data from which no error has been detected at S49 into packet data as a PDCP SDU (PDCP SDU construction).

At S53, the source base station sends the HO Instruction signal to the user equipment.

At S54, the source base station determines whether to transfer the packet data to the target base station. If it is to transfer the packet data, the operation proceeds to S55. Otherwise, the operation proceeds to S60.

At S55, the source base station reports the upper limit of the drop timer to the target base station. As mentioned above, the upper limit of the timer is reported to the target base station at any of "3. HO Request", "7. SN State Transfer", and "9. HO Completion" illustrated in FIG. 7. Here, it is assumed that the upper limit is reported by the "7. SN State Transfer" message.

At S56, the source base station determines whether or not the packet data has incurred any loss, meaning, any missing part due to a transmission failure. If the packet data has such a loss, the operation proceeds to S57. Otherwise, the operation jumps to S59.

At S57, the source base station transfers the packet data whose SNs are smaller than that of the packet data lost to the upper station.

At S58, the source base station transfers the packet data whose SNs are bigger than that of the packet data lost to the target base station.

At S59, the upper station forwards the transferred packet data to much upper station. The target base station forwards the packet data transferred to a lower layer.

At S60, the source base station reports the upper limit of the drop timer to the target base station. As mentioned above, the upper limit of the timer is reported to the target base station at any of "3. HO Request", "7. SN State Transfer", and "9. HO Completion" illustrated in FIG. 7. Here, it is assumed that the upper limit is reported by the "7. SN State Transfer" message.

Figure 21:
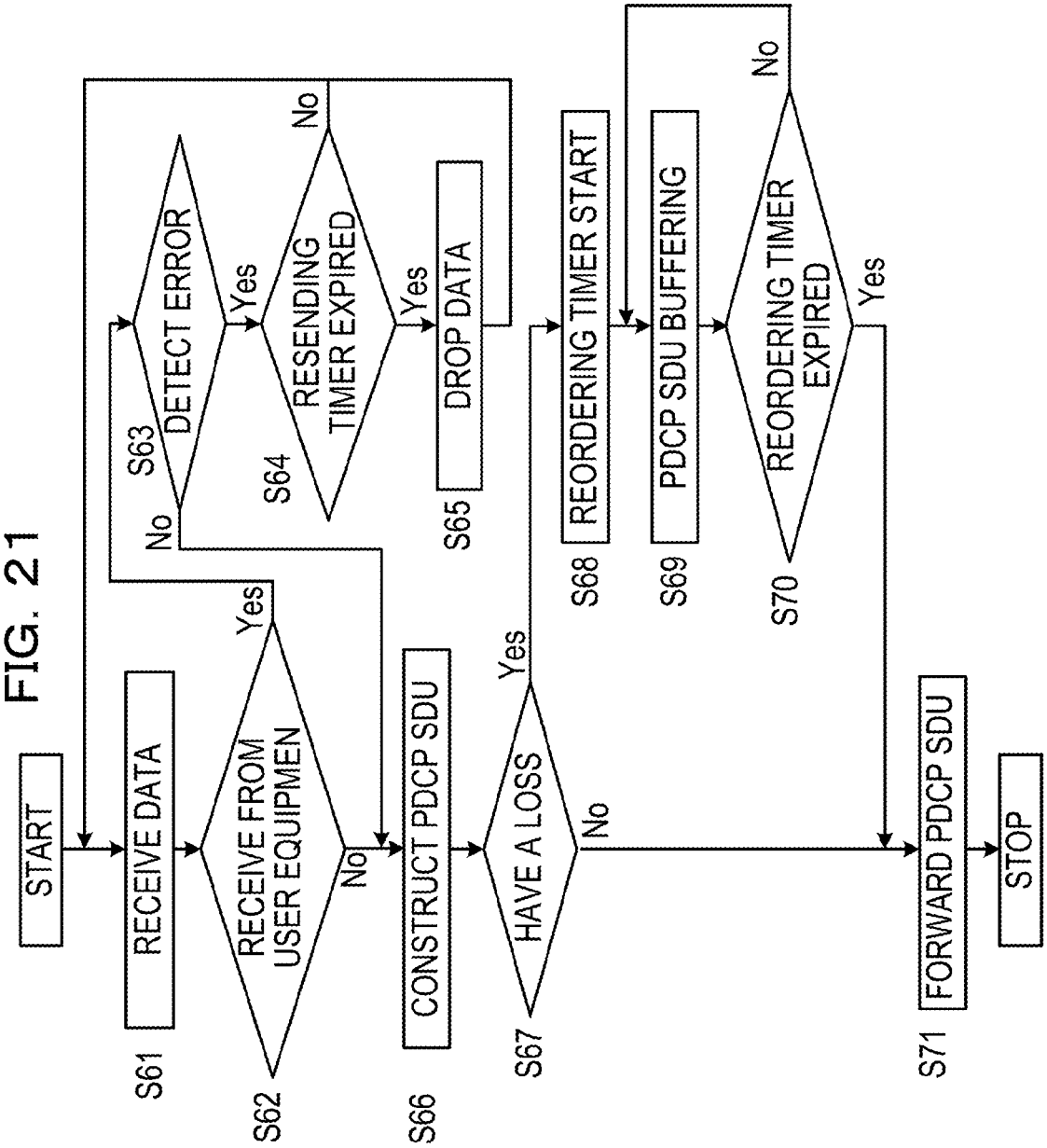
FIG. 21 depicts a flowchart of packet data processing at the target base station (UL) according to the second embodiment.

FIG. 21 is a flowchart of packet data processing in the UL communication at the target base station.

At S61, the target base station receives the data from the sending/receiving unit.

At S62, the target base station determines whether the data received at S61 is the data received from the user equipment. If it is the data received from the user equipment, the operation proceeds to S63. Otherwise, the operation proceeds to S66.

At S63, the target base station performs error detection on the received data in the buffer unit at the MAC layer. If an error is detected, the operation proceeds to S64. Otherwise, the operation proceeds to S66.

At S64, the target base station determines whether the resending timer at the RLC layer for the data from which an error has been detected at S63 has expired. If the resending timer has expired, the operation proceeds to S65. Otherwise, the operation returns to S61.

At S65, the target base station drops the data whose resending timer has expired at S64.

At S66, the target base station makes the received data into packet data as a PDCP SDU (PDCP SDU construction).

At S67, the target base station determines whether the packet data that is constructed at S66 has incurred any loss, meaning, any missing part due to a transmission failure. If the packet data has a loss, the operation proceeds to S68. Otherwise, the operation proceeds to S71.

At S68, when a PDCP SDU yet to be received is detected, the target base station starts the reordering timer.

At S69, the target base station waits for the arrival of the PDCP SDU yet to be received until the reordering timer expires.

At S70, the target base station determines whether the reordering timer has expired. If the reordering timer has not expired, the operation returns to S69. Otherwise, the operation proceeds to S71.

At S71, the buffer unit in the target base station forwards the packet data to a lower layer.

(8) Third Embodiment (a) Overview

In the third embodiment, an example of packet data drop operations in the case where a part of data, or packet data, is not successfully sent in the UL communication from the user equipment to the source base station due to a radio error before the handover, as described in the second embodiment.

FIG. 22A, FIG. 22B, and FIG. 23A, FIG. 23B are diagrams outlining operations of the third embodiment before the handover and after the handover, respectively.

The operations of the buffer units in the user equipment, the source base station, and the target base station before and after the handover shown in FIG. 22 and FIG. 23 are same as those described in FIG. 17A, FIG. 17B and FIG. 18A, FIG. 18B of the second embodiment, respectively.

The exception is that, in FIG. 23A showing the embodiment, the buffer unit 101 in the user equipment takes over the drop timer values.

For example, the drop timers for the packet data 2 and the packet data 3 are 70 and 60 in FIG. 22A, respectively. The values are taken over in FIG. 23A.

(b) Processing Flow

FIG. 24 is a flowchart of packet data processing in the UL communication at the user equipment.

At S72, the buffer unit in the user equipment receives data sent from an upper layer.

At S73, the user equipment makes the data received by the buffer unit at S72 into packet data as a PDCP SDU (PDCP SDU construction).

At S74, the user equipment starts the drop timer for each packet data constructed at S73.

At S75, if the user equipment receives the HO Instruction signal sent from the source base station, the operation proceeds to S76. Otherwise, the operation jumps to S77.

If the user equipment receives the HO Instruction signal at S75, the user equipment maintains the drop timers that are started at S74 and takes over the elapsed times of the packet data.

At S77, the user equipment determines whether the drop timer that is started at S74 has expired for each packet data. If the drop timer has expired, the operation proceeds to S78. Otherwise, the operation proceeds to S79.

If the drop timer has expired at S77, the user equipment drops the packet data that has been forwarded to a lower layer at S78.

If the drop timer has not expired at S77, the user equipment selects the packet data that has not been forwarded to a lower layer from the packet data that is stored in the buffer unit at S79.

At S80, the user equipment determines whether the AQM-based packet data drop is to be applied to the packet data selected at S79. If the AQM-based packet data drop is to be applied, the operation proceeds to S81. Otherwise, the operation jumps to S83.

If it is determined that the AQM-based packet data drop is to be applied at S80, the user equipment selects the packet data to drop at S81.

At S82, the user equipment drops the packet data selected at S81.

At S83, the buffer unit in the user equipment forwards the packet data to a lower layer.

The packet data processing flows for the source base station in the UL and the target base station in the UL in this embodiment are the same as those in the second embodiment illustrated in FIG. 20 and FIG. 21, respectively.

(9) Fourth Embodiment (a) Overview

In the fourth embodiment, an example of packet data drop operations in the case where a part of data, or packet data, is not successfully sent in the DL communication from the source base station to the user equipment due to a radio error before the handover is described.

FIG. 25A and FIG. 25B are diagrams illustrating data transmission from the source base station to the user equipment before the handover.

In FIG. 25A and FIG. 25B, the packet data 1 to 3 has been processed at the PDCP layer of the buffer unit 212a in the source base station, and the packet data 4 to 8 is being processed.

When the data including the packet data 1 to 3 is sent from the source base station, the user equipment receives the data, makes the data into the packet data as PDCP SDUs in the buffer unit 108 of the user equipment, and stores the packet data.

FIG. 25A and FIG. 25B illustrate a case where the packet data 1 and the packet data 3 is successfully sent from the source base station to the user equipment but the packet data 2 has failed in transmission before the radio link switch due to an error. In this embodiment, the user equipment resends, or keeps sending, the packet data 2 but does not resend the packet data 3 that is successfully sent.

FIG. 26A, FIG. 26B, and FIG. 26C and FIG. 27A, FIG. 27B, and FIG. 27C are diagrams illustrating data transfer from the source base station to the target base station and data transmission from the target base station to the user equipment after the handover.

In FIG. 26 and FIG. 27, reference numeral 703 designates the packet drop control unit that is assumed to be included in the control unit 215 illustrated in FIG. 13.

The source base station transfers the packet data 2, which the source base station failed to send to the user equipment before the handover, to the target base station.

The source base station also transfers the packet data 4 to 8, which has not been sent before the handover, to the target base station. Here, the source base station may complete the processing on the packet data that is being processed in the buffer unit 212a of the source base station among the packet data 4 to 8 and transfer the packet data with the SNs added or may suspend the processing and transfer the packet data without the SNs added.

The packet data 9 and 10 to be stored in the buffer unit 212b of the target base station illustrated in FIGS. 26B and 27B is the packet data included in the data received from the upper station.

FIG. 26A and FIG. 26B illustrate a case where the packet data 2 and the packet data 4 to 8 are transferred from the source base station to the target base station at the same timing. When the buffer unit 212b of the target base station receives the packet data 2 and the packet data 4 to 8, the drop timers for all the transferred packet data are reset (set to 0).

FIG. 27A and FIG. 27B illustrate a case where the packet data 2 and the packet data 4 to 8 are transferred from the source base station to the target base station by given intervals, every ten hours for example. When the buffer unit 212b receives the packet data 2 and the packet data 4 to 8, the target base station sets the drop timers with given intervals. For example, when the target base station receives the packet data 8, the drop timers for the packet data 2 and 4 to 8 have the values of 50, 40, . . . , 0, respectively.

As shown in the example illustrated in FIG. 26 and FIG. 27, the target base station is basically adapted to reset, or not to take over, the drop timers; though, it may set the timers at its discretion. In one of the setting methods, the target base station has a fixed value set to the timers in advance. In that case, the target base station uniformly sets 10 for the drop timer values for the transferred packet data in advance. The target base station may also set the drop timer value for each QCI by taking account of the value of the QCI to which each of the transferred packets belongs. The target base station may set the drop timers also by taking account of the traffic load it bears.

In another method, the target base station estimates a transfer delay for the transferred packet data based on delay measurement. If the estimated delay is 15, the target base station uniformly sets 15 to the timer values.

In yet another method, the target base station estimates the transfer amount of the transferred packet data and sets the timer value according to the estimated amount. If the estimated transfer amount of the packet data is 10, the target base station uniformly sets 10 to the drop timer values. If the estimated transfer amount of the packet data is 20, the target base station uniformly sets 20 to the drop timer values. The target base station may decide the transfer amount from the transfer state of the PDCP SDU reported at "7. SN State Transfer", instead of estimating the transfer value. The target base station may also set the drop timer value for each QCI by taking account of the value of the QCI to which each of the transferred packets belongs.

In the fourth embodiment, the target base station may apply the AQM-based packet data drop only to the data received from the upper station, or may apply it to both the data received from the upper station and the data that has not been forwarded to a lower layer among the data received from the source base station.

The buffer unit 108 of the user equipment reorders the packet data included in the data received from the target base station and the already stored packet data, and then forwards the packet data to an upper layer in the order the packet data sent, or in the order of SNs. In FIG. 26C and FIG. 27C, for example, the buffer unit of the user equipment forwards the packet data in the order of the packet data 2 and the packet data 3 to an upper layer.

(b) Processing Flow

FIG. 28 is a flowchart of packet data processing in the DL communication at the source base station.

At S84, the buffer unit in the source base station receives data sent from an upper layer.

At S85, the source base station makes the data received by the buffer unit at S84 into packet data as a PDCP SDU (PDCP SDU construction).

At S86, the source base station starts the drop timer for each packet data constructed at S85.

At S87, the source base station sends the HO Instruction signal to the user equipment.

After sending the HO Instruction signal at S87, the source base station determines whether to transfer the packet data to the target base station at S88. If the packet data is to be transferred, the operation proceeds to S89. Otherwise, the operation proceeds to S91.

If the source base station determines to transfer the packet data at S88, the source base station reports the upper limit of the drop timer for the packet data to transfer to the target base station at S89. As mentioned above, the upper limit of the timer is reported to the target base station at any of "3. HO Request", "7. SN State Transfer" and "9. HO Completion" illustrated in FIG. 7. Here, it is assumed that the upper limit is reported by the "7. SN State Transfer" message.

At S90, the source base station estimates a transfer delay time.

At S91, the source base station reports the upper limit of the drop timer to the target base station. As mentioned above, the upper limit of the timer is reported to the target base station at any of "3. HO Request", "7. SN State Transfer", and "9. HO Completion" illustrated in FIG. 7. Here, it is assumed that the upper limit is reported by the "7. SN State Transfer" message.

At S92, the buffer unit in the source base station forwards the packet data to a lower layer until the radio link is disconnected.

FIG. 29 is a flowchart of packet data processing in the DL communication at the target base station.

At S93, the buffer unit of the target base station receives the data sent from an upper layer.

At S94, the target base station makes the data received by the buffer unit at S93 into packet data as a PDCP SDU (PDCP SDU construction).

At S95, the target base station starts the drop timer for each packet data constructed at S94.

At S96, the target base station determines whether the drop timer that is started at S95 has expired for each packet data. If the drop timer has expired, the operation proceeds to S97. Otherwise, the operation proceeds to S98.

If the drop timer has expired at S96, the target base station drops the packet data that has been forwarded to a lower layer at S97.

At S98, the target base station selects the packet data received from the upper station.

At S99, the target base station determines whether the AQM-based packet data drop is to be applied to the packet data selected at S98. If the AQM-based packet data drop is to be applied, the operation proceeds to S100. Otherwise, the operation jumps to S102.

If it is determined that the AQM-based packet data drop is to be applied at S99, the target base station selects the packet data to drop at S100.

At S101, the target base station drops the packet data selected at S100.

At S102, the buffer unit in the target base station forwards the packet data to a lower layer.

FIG. 30 is a flowchart of packet data processing in the DL communication at the user equipment.

At S103, the user equipment receives data through the sending/receiving unit.

At S104, the user equipment performs error detection on the data at the MAC layer received at S103. If an error is detected, the operation proceeds to S105. Otherwise, the operation proceeds to S107.

At S105, the user equipment determines whether the resending timer at the RLC layer for the data from which an error has been detected at S104 has expired. If the resending timer has expired, the operation proceeds to S106. Otherwise, the operation returns to S103.

At S106, the user equipment drops the data whose resending timer has expired at S105.

At S107, the user equipment makes the received data into packet data as a PDCP SDU (PDCP SDU construction).

At S108, the user equipment determines whether the packet data that is constructed at S107 has incurred any loss, meaning, any missing part due to a transmission failure. If the packet data has a loss, the operation proceeds to S109. Otherwise, the operation proceeds to S112.

At S109, when a PDCP SDU yet to be received is detected, the user equipment starts the reordering timer.

At S110, the user equipment waits for the arrival of the PDCP SDU yet to be received until the reordering timer expires.

At S111, the user equipment determines whether the reordering timer has expired. If the reordering timer has not expired, the operation returns to S110. Otherwise, the operation proceeds to S112.

At S112, the user equipment forwards the packet data to an upper layer.

(10) Fifth Embodiment (a) Overview

In the fifth embodiment, an example of packet data drop operations in the case where a part of data, or packet data is not successfully sent in the DL communication from the source base station to the user equipment due to a radio error before the handover is described as in the fourth embodiment.

The outlined data transmission at the user equipment and the source base station before the handover are same as those described in FIG. 25A and FIG. 25B of the fourth embodiment.

FIG. 31A, FIG. 31B, FIG. 31C and FIG. 31D are diagrams illustrating the data transmission from the source base station to the target base station and the data transmission from the target base station to the user equipment after the handover.

In FIG. 31A, FIG. 31B, FIG. 31C and FIG. 31D, reference numeral 703 designates the packet drop control unit that is assumed to be included in the control unit 215 illustrated in FIG. 13.

In this embodiment, the source base station estimates the transfer delay time, a delay time that occurs when the packet data is transferred from the source base station to the target base station, reflects the estimated transfer delay time on the drop timers for the packet data to be transferred to the target base station in advance, and then performs the packet data transfer.

In FIG. 31A, FIG. 31B, FIG. 31C and FIG. 31D, the drop timers for the packet data 1 to 8 that is stored in the buffer unit 212a of the source base station after the handover have the values of 80, 70, ..., 10, respectively.

Figure 31A:
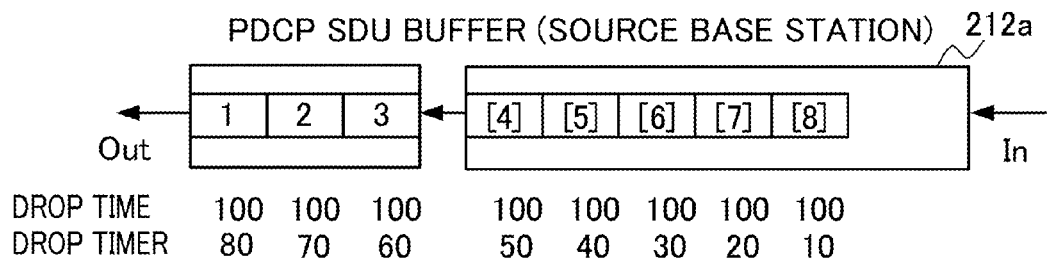
FIG. 31A depicts operations of the source base station before a delay time added according to a fifth described embodiment.
Figure 31B:
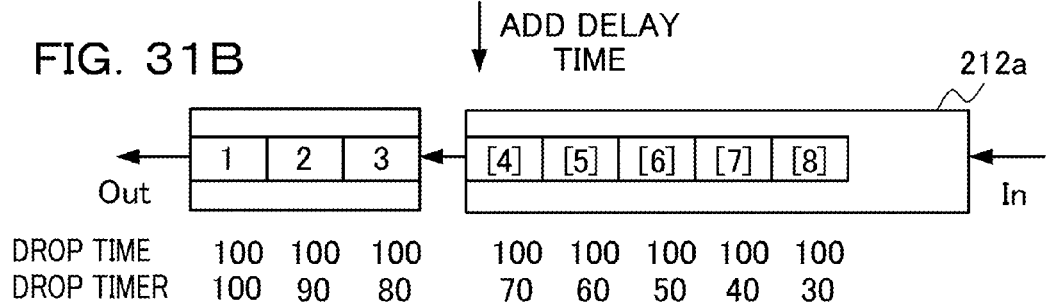
FIG. 31B depicts operations of the source base station after a delay time added according to the fifth embodiment.

The source base station sets the drop timers for the packet data with new values that reflect the estimated transfer delay time, 20 for example in FIG. 31A and FIG. 31B. In FIG. 31A and FIG. 31B, the drop timers for the packet data 1 to 8 have the new values of 100, 90, ..., 30, respectively.

The source base station transfers the packet data 2, which was failed in transmission to the user equipment before the handover, to the target base station.

The source base station also transfers the packet data 4 to 8, which has not been sent before the handover, to the target base station. Here, the source base station may complete the processing on the packet data that is being processed in the buffer unit 212a among the packet data 4 to 8 and transfer the packet data with the SNs added or may suspend the processing and transfer the packet data without the SNs added.

Figure 31C:
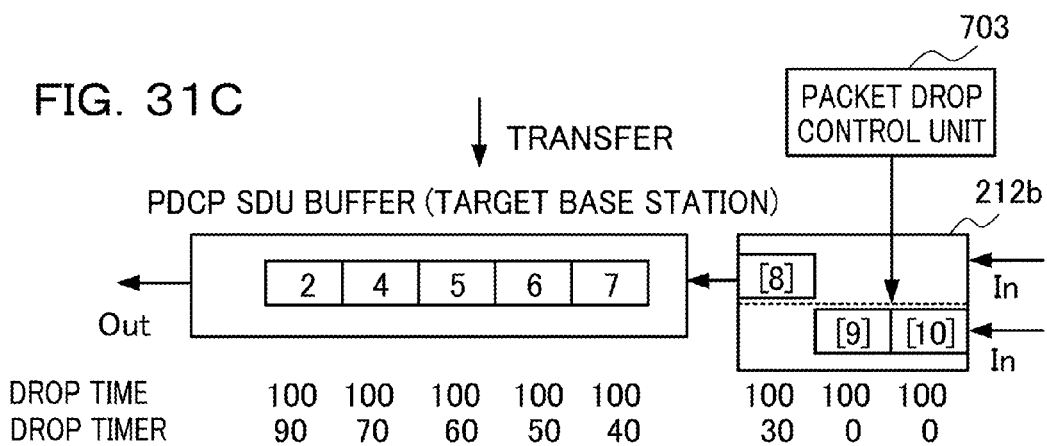
FIG. 31C depicts operations of the target base station according to the fifth embodiment.

The packet data 9 and 10 to be stored in the buffer unit 212b of the target base station illustrated in FIG. 31C is the packet data included in the data received from the upper station.

The target base station takes over the drop timers for the packet data set in the source base station. Specifically, the drop timers for the packet data 2 and the packet data 4 to 8 that are stored in the buffer unit 212b of the target base station have the values of 90, 70, 60, ..., 30, respectively.

In the fifth embodiment, the target base station may apply the AQM-based packet data drop only to the data received from the upper station, or may apply it to both the data received from the upper station and the data that has not been forwarded to a lower layer among the data received from the source base station.

Figure 31D:
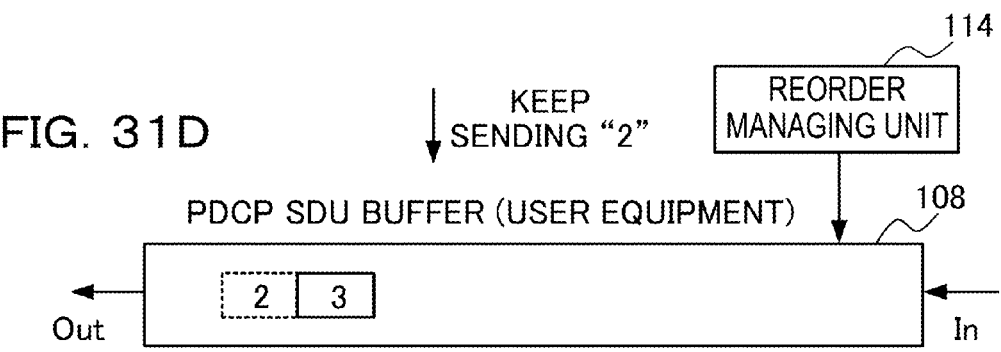
FIG. 31D depicts operations of the user equipment according to the fifth embodiment.

The buffer unit 108 of the user equipment reorders the packet data included in the data received from the target base station and the already stored packet data, and then forwards the packet data to an upper layer in the order the packet data sent, or in the order of SNs. In FIG. 31D, for example, the buffer unit of the user equipment forwards the packet data in the order of the packet data 2 and the packet data 3 to an upper layer.

(b) Takeover of Drop Timer

The drop timer is taken over at a time stamp field in a packet data transfer protocol header.

Figure 32:
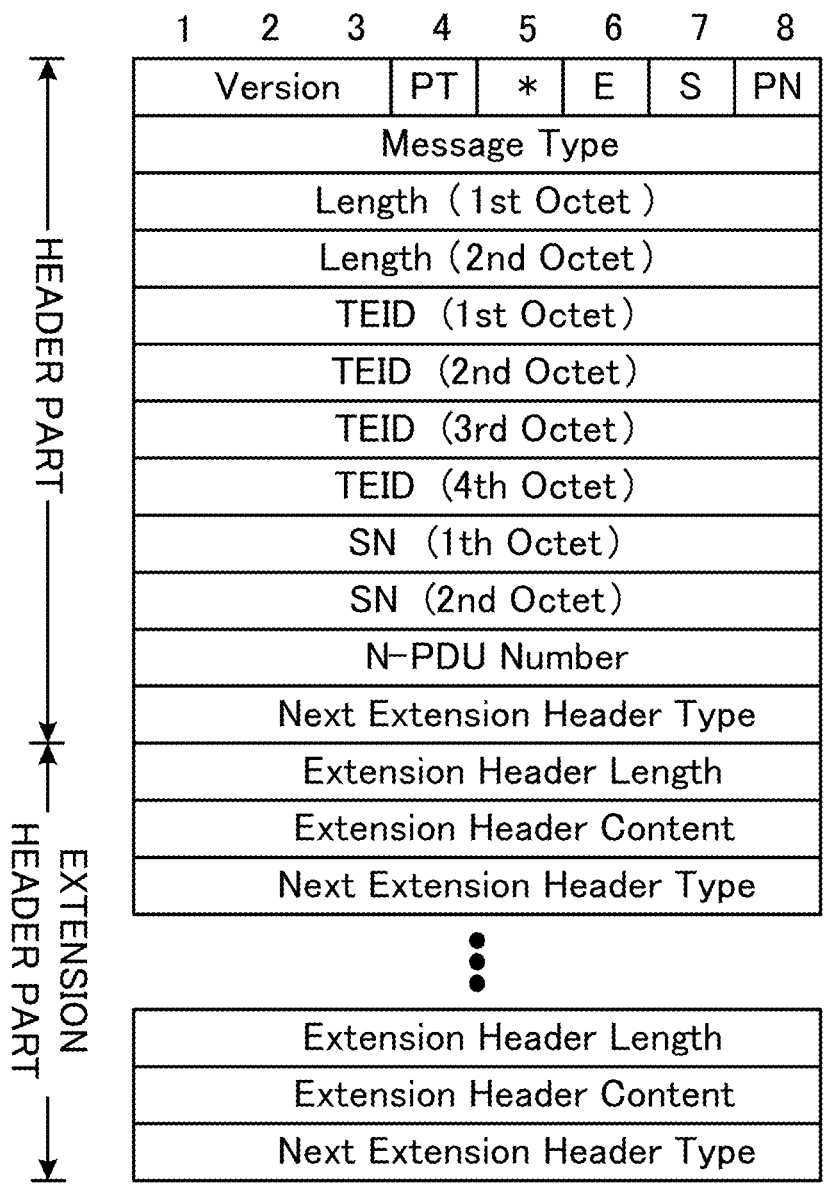
FIG. 32 depicts a GTP header structure.

The packet data transfer protocol header is the GTP header illustrated in FIG. 32 defined by 3GGP.

In the header part illustrated in FIG. 32: the Version field represents a GTP protocol version; the Protocol Type (PT) represents protocol identification; the Extension Header flag (E) represents information on the Next Extension Header field; the Sequence number flag (S) represents information on the SN field; the N-PDU Number flag (PN) represents information on the N-PDU Number field; the Message Type represents the GTP message type; the Length shows the payload length; the Tunnel Endpoint Identifier (TEID) represents information for clarifying the endpoint of the tunnel; the Sequence Number (SN) represents the sequence number used for identifying data; the N-PDU Number represents identification used in adjusting the data transfer; and the Next Extension Header Type represents identification of the extension header.

The Extension Header part in the figure includes information on the extension header such as the Extension Header Length, the Extension Header Content, and the Next Extension Header Type.

Figure 33:
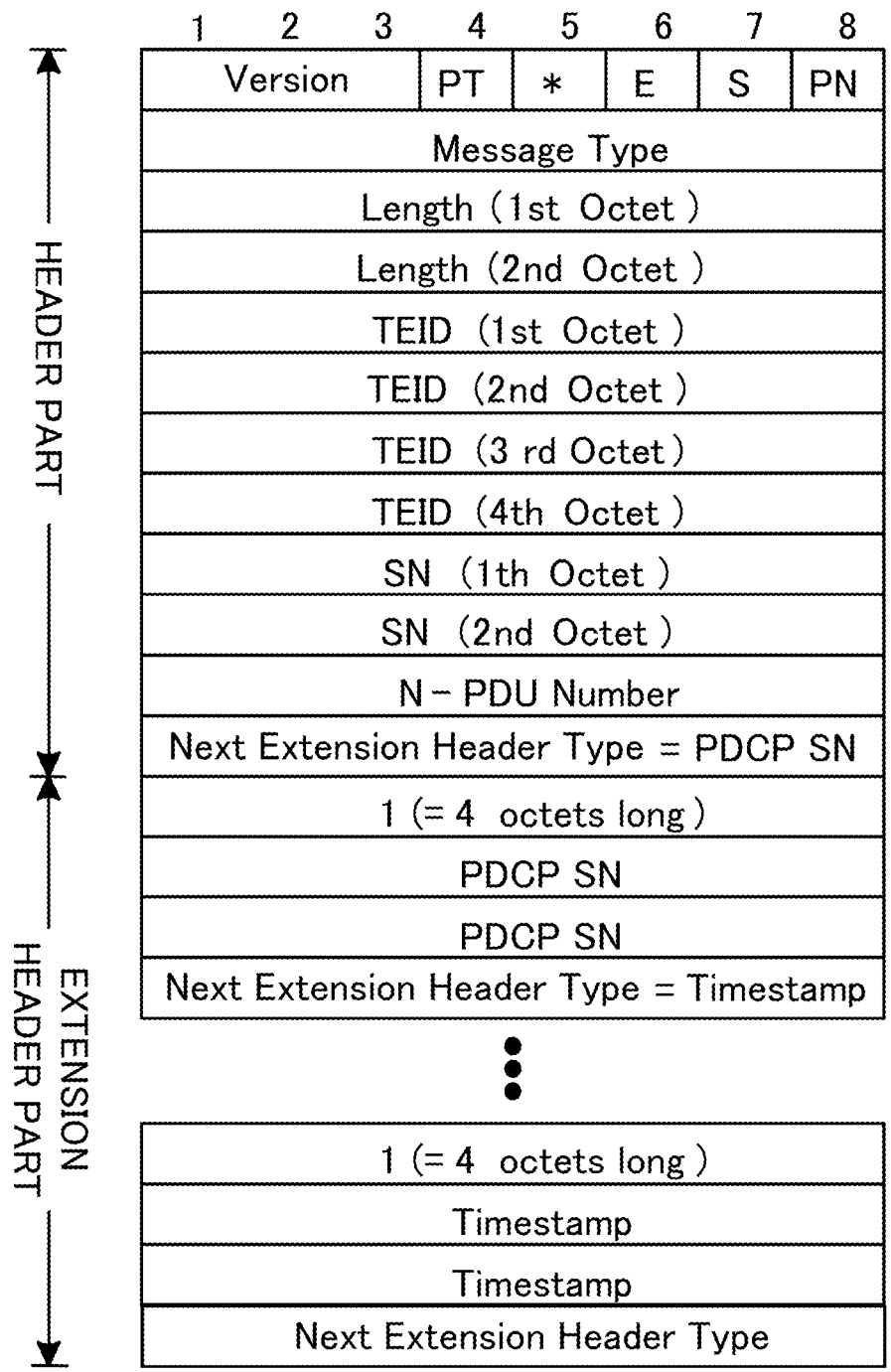
FIG. 33 depicts a time stamp.

FIG. 33 is a diagram illustrating an example of a header used in the packet data transfer in the embodiment.

The Next Extension Header Type in the header part defines that the PDCP SN is sent in the extension header. The source base station sends information on the drop timers for the transfer packet data included in the time stamp by defining the Timestamp field in the extension header part.

The source base station can also send the above-mentioned time stamp on the SN State Transfer message, for example.

Figure 34:
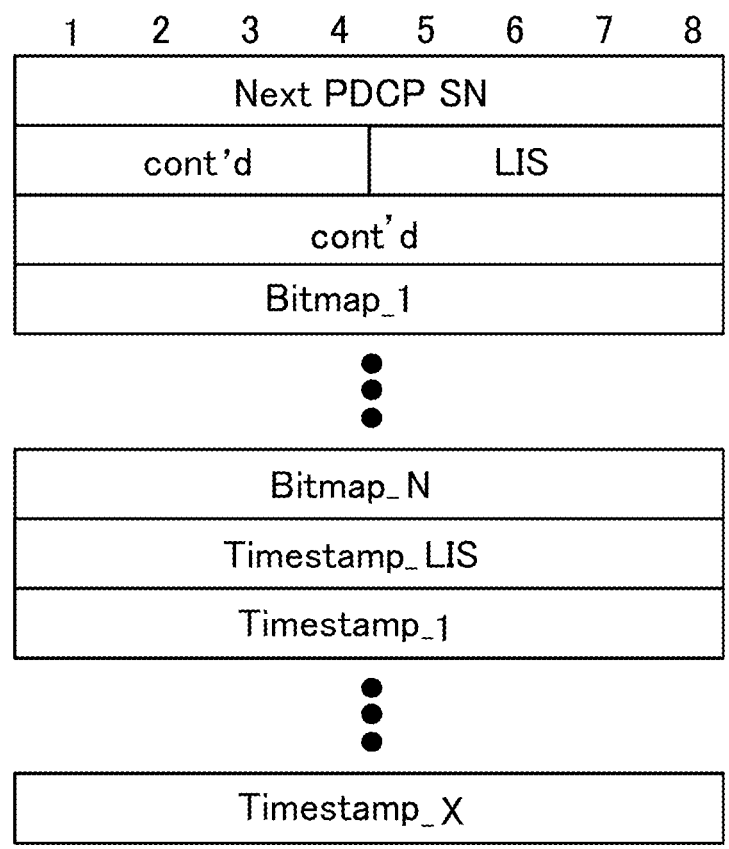
FIG. 34 depicts an example of a case where a time stamp is sent on a Sequence Number (SN) State Transfer message.

FIG. 34 is a diagram illustrating an example of a case where the source base station sends a time stamp on the SN State Transfer message.

In FIG. 34, the Last-In-Sequence (LIS) is the last PDCP SDU SN number that the source base station received in order.

The Bitmap_N field represents whether the source base station has sent the PDCP SDU whose SN follows the LIS to the user equipment by one bit.

The Timestamp_LIS represents the value of the drop timer for the PDCP SN of the LIS.

Likewise, the Timestamp_X represents the value of the drop timer for the PDCP SDU that the source base station has not correctly sent.

Figure 35:
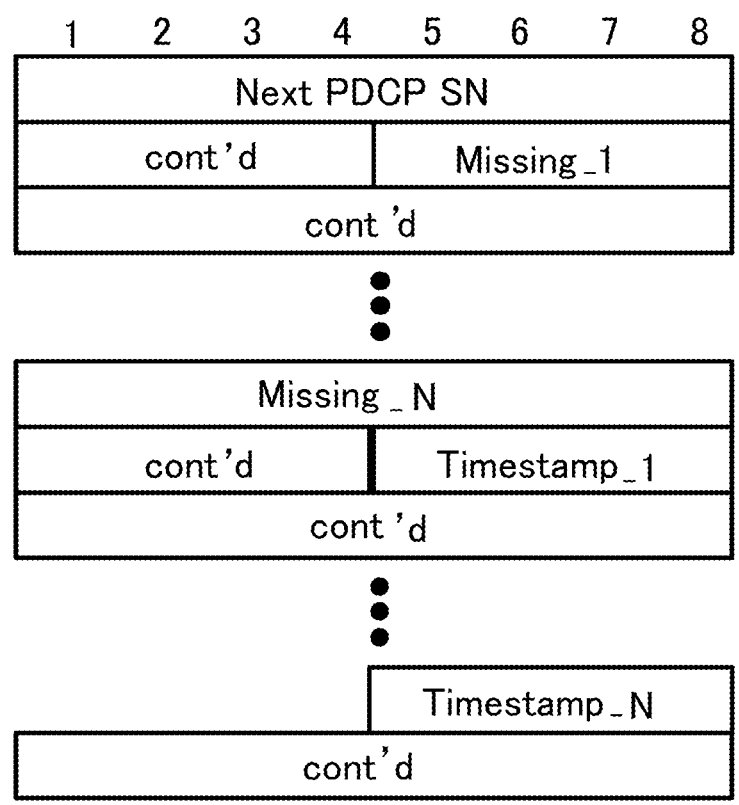
FIG. 35 depicts another example of a case where a time stamp is sent on the SN State Transfer message.

FIG. 35 is a diagram illustrating another example of a case where the source base station sends a time stamp on the SN State Transfer message.

In FIG. 35, the Missing_N represents the PDCP SN that the source base station is not successfully sent to the user equipment.

The Timestamp_N represents the value of the drop timer for the PDCP SDU that the source base station has not correctly sent.

The source base station may limitedly take over the timer for an only arbitrarily selected packet instead of taking over the timer for each packet. For example, the source base station may transfer only the value of the drop timer corresponding to the packet that is to be transferred first. In that case, the target base station may set its own timer values for the drop timers corresponding to the other packets as shown in the fourth embodiment with reference to the drop timer values that are transferred by the source base station.

(c) Drop Timer Setting

Drop timers may be set by the methods below.

1) Timer Value Designating Method

The source base station describes the drop timer value corrected with the transfer delay time in the Timestamp field.

When the source base station is to transfer the packet data whose drop timer has the value set to 40 to the target base station, for example, the source base station describes the value "40+transfer delay time" (=T0) in the Timestamp field. For the transfer delay time, the value estimated by the source base station is used here.

The target base station sets the value described in the Timestamp field to the value of the drop timer for the corresponding packet data.

The present embodiments may be adapted not to need the source base station to transfer the packet data in the case where T0≥the upper limit of the drop timer.

2) Absolute Time Designating Method

The source base station describes the time to drop the packet data in the Timestamp field.

When the source base station is to transfer the packet data whose drop timer has the value set to 40 and the upper limit set to 100 to the target base station, for example, the source base station describes the value "the current time at the source base station+(100−40)" (=T1) in the Timestamp field.

The target base station compares the time described in the Timestamp field T1 and the current time at the target base station when the corresponding packet data is transferred thereto T2. When T1≥T2, the target base station sets T1 to the value of the drop timer for the corresponding packet data. When T1 T2, the target base station drops the corresponding packet data.

The present embodiments may be adapted not to need the source base station to transfer the packet data in the case where T1≤T2 is known at the source base station.

For the absolute time, the time synchronized between the base stations by means of the Global Positioning System (GPS) or the time calculated by both of the base stations that recognize the difference between the time at the source base station and the time at the target base station may be used.

3) Relative Time Designating Method

The source base station describes the time interval between the current time and the time to drop the packet data corrected with the transfer delay time in the Timestamp field.

When the source base station is to transfer the packet data whose drop timer has the value set to 40 and the upper limit set to 100 to the target base station, for example, the source base station describes the value "(100−40)−transfer delay time" (=T3) in the Timestamp field. For the transfer delay time, the value estimated by the source base station is used here.

When the time T3 described in the Timestamp field≥0, the target base station sets the value "100−T3" to the value of the drop timer for the corresponding packet data. When T3≤0, the target base station drops the packet data. The present embodiments may be adapted not to need the source base station to transfer the packet data in the case where T3≤0.

(d) Another Example of Drop Timer Setting

The drop timers may be set by means of a sub-frame number in (c) 1) through 3), instead of the Timestamp field.

In LTE, the base station can identify the sub-frame number for each Transmission Time Interval (TTI). Thus, the value of the drop timer may be described by means of the sub-frames in such a manner of expressing the time 40 by 40 sub-frames, for example.

For the sub-frame number, the number synchronized between the base stations or the number calculated by the source base station and the target base station that recognize the difference between the sub-frame numbers may be used.

(d) Processing Flow

FIG. 36 is a flowchart of packet data processing in the DL communication at the source base station.

At S113, the buffer unit in the source base station receives data sent from an upper layer.

At S114, the source base station makes the data received by the buffer unit at S113 into packet data as a PDCP SDU (PDCP SDU construction).

At S115, the source base station starts the drop timer for each packet data constructed at S114.

At S116, the source base station sends the HO Instruction signal to the user equipment.

After sending the HO Instruction signal at S116, the source base station determines whether to transfer the packet data to the target base station at S117. If the packet data is to be transferred, the operation proceeds to S118. Otherwise, the operation proceeds to S121.

If the source base station determines to transfer the packet data at S117, the source base station reports the upper limit of the drop timer for the packet data to transfer to the target base station at S118. As mentioned above, the upper limit of the timer is reported to the target base station at any of "3. HO Request", "7. SN State Transfer" and "9. HO Completion" illustrated in FIG. 7. Here, it is assumed that the upper limit is reported by the "7. SN State Transfer" message.

At S119, the source base station estimates the transfer delay time.

At S120, the source base station takes over the drop timer for the packet data to transfer.

If the source base station determines not to transfer the packet data at S117, the source base station reports the upper limit of the drop timer to the target base station at S121. As mentioned above, the upper limit of the timer is reported to the target base station at any of "3. HO Request", "7. SN State Transfer" and "9. HO Completion" illustrated in FIG. 7. Here, it is assumed that the upper limit is reported by the "7. SN State Transfer" message.

At S122, the buffer unit in the source base station forwards the packet data to a lower layer until the radio link is disconnected.

FIG. 37 is a flowchart of packet data processing in the DL communication at the target base station.

At S123, the buffer unit of the target base station receives the data sent from an upper layer.

At S124, the target base station determines whether the data received at S123 is the data sent from the upper station. If it is the data sent from the upper station, the operation proceeds to S125. Otherwise, the operation proceeds to S126.

If the target base station determines that the data received at S124 is the data transferred from the source base station, instead of the data sent from the upper station, the target base station obtains the value of the drop timer to be set for the packet data included in the data at S125.

At S126, the target base station makes the data received at S123 into packet data as a PDCP SDU (PDCP SDU construction).

At S127, the target base station starts the drop timer for the packet data constructed at S126. For the data received from the upper station, the target base station sets the upper limit of the drop timer. The upper limit of the drop timer is set to 100, for example. For the data received from the source base station, the target base station sets the value of the drop timer obtained at S125.

At S128, the target base station determines whether the drop timer that is started at S127 has expired for each packet data. If the drop timer has expired, the operation proceeds to S129. Otherwise, the operation proceeds to S130.

If the drop timer has expired at S128, the target base station drops the packet data that has been forwarded to a lower layer at S129.

At S130, the target base station selects the packet data received from the upper station.

At S131, the target base station determines whether the AQM-based packet data drop is to be applied to the packet data selected at S130. If the AQM-based packet data drop is to be applied, the operation proceeds to S132. Otherwise, the operation jumps to S134.

If it is determined that the AQM-based packet data drop is to be applied at S131, the target base station selects the packet data to drop at S132.

At S133, the target base station drops the packet data selected at S132.

At S134, the buffer unit in the target base station forwards the packet data to a lower layer.

The packet data processing flow in the DL communication at the user equipment is the same as that of the fourth embodiment.

(11) Sixth Embodiment

In the sixth embodiment, as in the fourth embodiment, an example of packet data drop operations in the case where a part of data, or packet data, is not successfully sent in the DL communication from the source base station to the user equipment due to a radio error before the handover is described.

The outlined data transmission at the user equipment and the source base station before the handover are same as those described in FIG. 25A and FIG. 25B of the fourth embodiment.

FIG. 38A, FIG. 38B, FIG. 38C and FIG. 38D are diagrams illustrating the data transmission from the source base station to the target base station and the data transmission from the target base station to the user equipment after the handover.

Figure 38A:
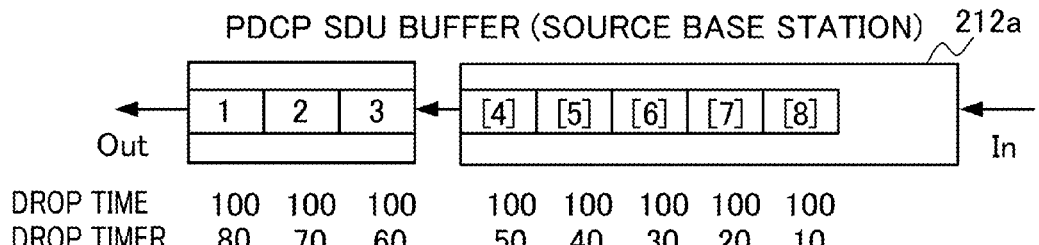
FIG. 38A depicts operations of the source base station according to a sixth described embodiment.
Figure 38B:
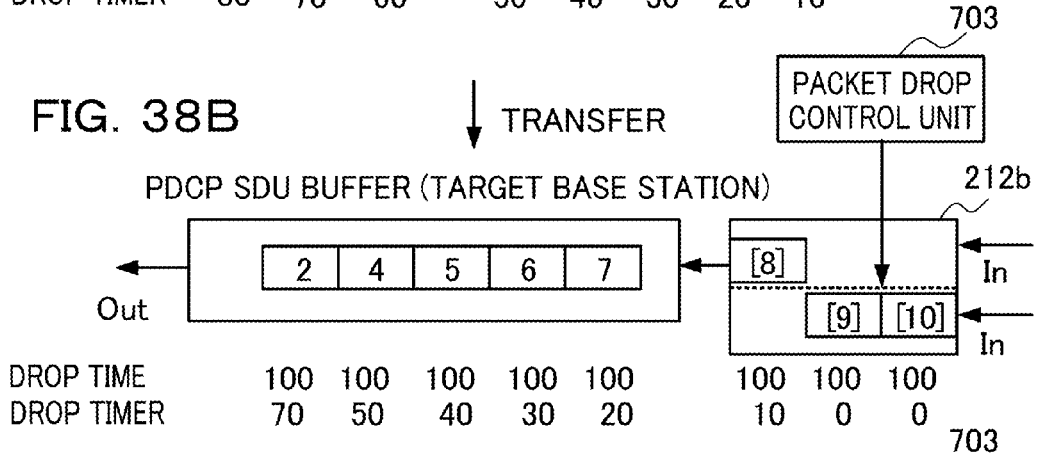
FIG. 38B depicts operations of the target base station before a delay time added according to the sixth embodiment.
Figure 38C:
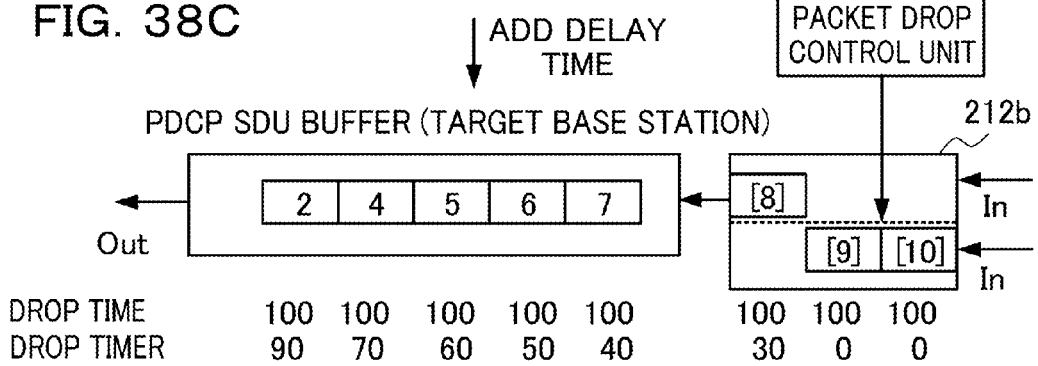
FIG. 38C depicts operations of the target base station after a delay time added according to the sixth embodiment.

In FIG. 38B and FIG. 38C, reference numeral 703 designates the packet drop control unit that is assumed to be included in the control unit 215 illustrated in FIG. 13.

In this embodiment, the drop timers for the packet data to be transferred from the source base station to the target base station are taken over as they are. The target base station measures/calculates the transfer delay time, a delay time that occurs when the packet data is transferred from the source base station to the target base station, reflects the estimated transfer delay time on the drop timers for the packet data received from the source base station, and newly sets the drop timers.

In FIG. 38A, the drop timers for the packet data 1 to 8 that is stored in the buffer unit 212a of the source base station after the handover have the values of 80, 70, . . . , 10, respectively.

The source base station transfers the packet data 2, which the source base station failed to send to the user equipment before the handover, to the target base station.

The source base station also transfers the packet data 4 to 8, which has not been sent before the handover, to the target base station. Here, the source base station may complete the processing on the packet data that is being processed in the buffer unit 212*a* among the packet data 4 to 8 and transfer the packet data with the SNs added or may suspend the processing and transfer the packet data without the SNs added.

The packet data 9 and 10 to be stored in the buffer unit 212*b* of the target base station illustrated in FIGS. 38B and 38C is the packet data included in the data received from the upper station.

The target base station takes over the drop timers for the packet data set in the source base station. Specifically, the target base station sets the drop timers for the packet data 2 and the packet data 4 to 8 that are stored in the buffer unit 212*b* to 70, 50, 40, . . . , 10, respectively.

The target base station measures/calculates the transfer delay time, 20 for example, in the figure, adds the transfer delay time to the drop timers for the packet data that are taken over from the source base station, and sets the drop timers as the new drop timers. In FIG. 38C, for example, the target base station sets the drop timers for the packet data 2 and the packet data 4 to 8 to 90, 70, 60, . . . , 30, respectively.

In the sixth embodiment, the target base station may apply the AQM-based packet data drop only to the data received from the upper station, or may apply it to both the data received from the upper station and the data that has not been forwarded to a lower layer among the data received from the source base station.

Figure 38D:
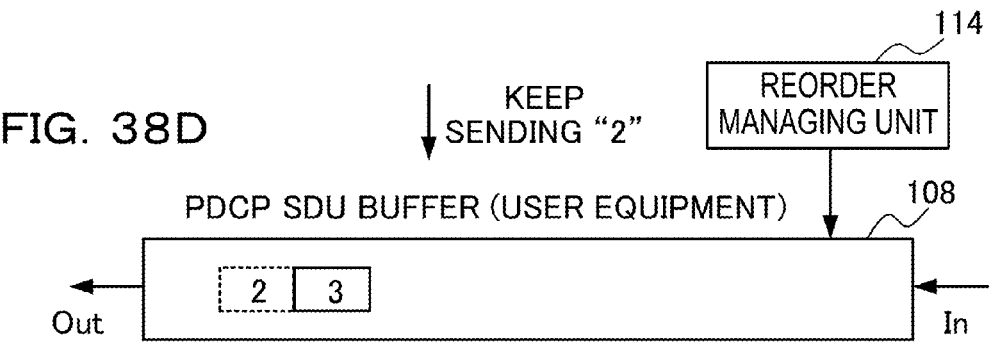
FIG. 38D depicts operations of the user equipment according to the sixth embodiment.

The buffer unit 108 of the user equipment reorders the packet data included in the data received from the target base station and the already stored packet data, and then forwards the packet data to an upper layer in the order the packet data sent, or in the order of SNs. In FIG. 38D, for example, the buffer unit 108 of the user equipment forwards the packet data in the order of the packet data 2 and the packet data 3 to an upper layer.

The takeover of the drop timers for the packet data transferred from the source base station to the target base station and the setting of the taken over drop timers at the target base station may be performed by means of the time stamp and the sub-frame number as described in the fifth embodiment by the timer value designating method, the absolute time designating method, and the relative time designating method.

The source base station, however, does not perform correction with the transfer delay time in the timer value designating method and the relative time designating method described in the fifth embodiment. In those cases, the target base station corrects the values of the drop timers with the transfer delay time measured by itself and sets the values.

The source base station may limitedly take over the timer for an only arbitrarily selected packet instead of taking over the timer for each packet. For example, the source base station may transfer only the value of the drop timer corresponding to the packet that is to be transferred first. In that case, the target base station may set its own timer values for the drop timers corresponding to the other packets as shown in the fourth embodiment with reference to the drop timer values that are transferred by the source base station.

(12) Others

The value of the drop timer that is taken over from the source base station to the target base station upon packet data transmission may be a value corresponding to the SN of the packet data or a time as described in the first to sixth embodiments. For example, the value of the drop timer is reported from the source base station to the target base station as PDCP SDU SN i×Ni, where Ni is the coefficient for the PDCP SDU SN i.

Accordingly, it is possible to reduce the transmission delay by providing an effective method for dropping packet data during handover for the user equipment and the base station.

According to an aspect of the invention a radio communication device includes a control unit configured for dropping packet data, the data with identification for dropping added, based on the identification for dropping or a method for dropping packet data without based on the identification according to the state of the data, wherein the data is dropped based on the identification or not based on the identification for dropping according to an interface through which the data is transmitted.

According to an aspect of the invention a radio communication device includes a control unit configured for dropping packet data, the data with identification for dropping added, based on the identification for dropping or a method for dropping packet data without based on the identification according to the state of the data, wherein the identification for dropping is distinguished before and after a handover, if required, and the dropping is kept when the handover occurs.

According to an aspect of the invention a control method includes performing a method for dropping packet data, the data with identification for dropping added, based on the identification for dropping or a method for dropping packet data without based on the identification for dropping according to the state of the data, wherein a drop time is taken over by any of means for taking over a timer value, means for taking over a time to perform the dropping, and means for taking over a time left until the dropping, and the drop time is set by further taking account of an estimated transfer delay time for the data when the handover occurs.

According to an aspect of the invention a control method includes performing a method for dropping packet data, the data with identification for dropping added, based on the identification for dropping or a method for dropping packet data without based on the identification for dropping according to the state of the data, wherein if a drop time is earlier than the current time, the data is dropped without being transferred, or the data is dropped immediately after the data is transferred when the handover occurs.

According to an aspect of the invention a control method includes performing a method for dropping packet data, the data with identification for dropping added, based on the identification for dropping or a method for dropping packet data without based on the identification for dropping according to the state of the data, wherein a drop time or a time left until the dropping is taken over as described in a data transfer protocol header when the handover occurs.

According to an aspect of the invention a control method includes performing a method for dropping packet data, the data with identification for dropping added, based on the identification for dropping or a method for dropping packet data without based on the identification for dropping according to the state of the data, wherein if a station to manage the dropping is changed, the upper limit of a timer is taken over by a control signal from an upper station or directly taking over by a control signal exchanged between stations when the handover occurs.

According to an aspect of the invention a control method includes performing a method for dropping packet data, the data with identification for dropping added, based on the identification for dropping or a method for dropping packet data without based on the identification for dropping according to the state of the data, wherein if a station to manage the dropping is changed, the upper limit of a timer is taken over by a control signal from an upper station or directly taking over by a control signal exchanged between stations when the handover occurs, and if the identification for dropping is distinguished when the handover occurs, sending/receiving a control signal for sharing the distinction by a base station and a user equipment between the base station and the user equipment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control method in a mobile communication system, comprising:
   configuring a timer corresponding to packet data for discarding the packet data according to a value of the timer;
   taking over the value of the timer corresponding to the packet data when a handover is performed; and
   discarding the corresponding packet data when the maintained value of the timer, starting at reception of the packet data, reaches a given value.

2. The control method as defined in claim 1, wherein the packet data is a service data unit (SDU) in a Packet Data Convergence Protocol (PDCP).

3. The control method as defined in claim 1, further comprising:
   storing the packet data to be sent.

4. The control method as defined in claim 1, wherein the reception of the packet data is reception from an upper layer to a layer of a Packet Data Convergence Protocol (PDCP).

5. The control method as defined in claim 1, wherein the reception is reception of the packet data in a buffer that stores the packet data.

6. A control method in a mobile communication system, comprising:
   storing packet data to be sent;
   discarding the packet data according to a value of a timer corresponding to the packet data;
   transferring the packet data from a source base station to a target base station and transferring the value of the timer corresponding to the packet data to be transferred when a handover is performed;
   wherein the target base station sets a new value of the timer for the transferred packet data with the transferred value of the timer or the transferred value of the timer corrected with a transfer delay time, and when the new value of the timer, starting at handover from the new value, reaches a given value, discards the corresponding packet data.

7. The control method according to claim 6, wherein the source base station transfers the value of the timer by using a packet data reception state reporting protocol or a time stamp field included in a packet data transfer protocol header.

8. The control method as defined in claim 6, wherein the packet data is a service data unit (SDU) in a Packet Data Convergence Protocol (PDCP).

9. A control method in a mobile communication system, comprising:
   storing packet data to be sent;
   discarding the packet data according to a value of a timer corresponding to the packet data;
   transferring the packet data from a source base station to a target base station, and correcting the value of the timer corresponding to the packet data to be transferred with a transfer delay time and then transferring the value of the timer when a handover is performed,
   wherein the target base station sets a new value of the timer for the corresponding packet data with the corrected value of the timer transferred thereto, and when the value of the timer, starting at handover from the new value, reaches a given value, discards the corresponding packet data.

10. The control method as defined in claim 9, wherein the packet data is a service data unit (SDU) in a Packet Data Convergence Protocol (PDCP).

11. A radio communication device comprising:
    a buffer configured to store packet data to be sent; and
    a controller configured to take over a value of a timer corresponding to the packet data when a handover is performed, and to discard the corresponding packet data when the value of the timer, starting at reception of the packet data, reaches a given value, wherein the radio communication device discards the packet data stored in the buffer according to the value of the timer corresponding to the packet data.

12. The radio communication device as defined in claim 11, wherein the packet data is a service data unit (SDU) in a Packet Data Convergence Protocol (PDCP).

13. The radio communication device as defined in claim 11, wherein the radio communication device is a user equipment or a mobile terminal.

14. The radio communication device as defined in claim 11, wherein the reception of the packet data is reception from an upper layer to a layer of a Packet Data Convergence Protocol (PDCP).

15. The radio communication device as defined in claim 11, wherein the reception is reception of the packet data in the buffer.

16. A base station comprising:
    a transmitter configured to transmit control information relating to a timer for discarding packet data stored in a radio communication device; and
    a controller configured to control the timer for the radio communication device by transmitting the control information, the radio communication device including
    a buffer configured to store the packet data to be sent to the base station, and
    a controller configured to take over a value of the timer corresponding to the packet data when a handover is performed, and to discard the corresponding packet data when the value of the timer, starting at reception of the packet data, reaches a given value, wherein the radio communication device discards the packet data stored in the buffer according to the value of the timer corresponding to the packet data.

17. The base station as defined in claim 16, wherein the reception of the packet data is reception from an upper layer to a layer of a Packet Data Convergence Protocol (PDCP).

18. The base station as defined in claim 16, wherein the reception is reception of the packet data in the buffer.

* * * * *

UNITED STATES PATENT AND TRADEMARK OFFICE
CERTIFICATE OF CORRECTION

PATENT NO.         : 8,711,810 B2                                       Page 1 of 1
APPLICATION NO.    : 13/558808
DATED              : April 29, 2014
INVENTOR(S)        : Ohta et al.

It is certified that error appears in the above-identified patent and that said Letters Patent is hereby corrected as shown below:

On the title page, Item (75) please add: Inventor "Katsumasa Sugiyama, Kawasaki (JP)"

Signed and Sealed this
Twenty-eighth Day of October, 2014

Michelle K. Lee
*Deputy Director of the United States Patent and Trademark Office*